United States Patent

[11] 3,626,112

[72] Inventor Andre Jean Henquet
Boulogne, Seine, France
[21] Appl. No. 718,577
[22] Filed Apr. 3, 1968
[45] Patented Dec. 7, 1971
[73] Assignee International Standard Electric Corporation
New York, N.Y.
[32] Priority Apr. 12, 1967
[33] France
[31] 102 503

[54] AUTOMATIC MOBILE RADIOTELEPHONE NETWORKS

1 Claim, 22 Drawing Figs.

[52] U.S. Cl. .......... 179/41 A, 325/55, 325/57
[51] Int. Cl. .......... H04m 3/06, H04q 7/04
[50] Field of Search .......... 179/41 A; 325/55, 57

[56] References Cited

UNITED STATES PATENTS

| | | | |
|---|---|---|---|
| 3,268,664 | 8/1966 | Fleissner et al. .............. | 325/55 |
| 3,377,435 | 4/1968 | Lippert.......................... | 325/55 |
| 3,173,996 | 3/1965 | Rypinski, Jr.................. | 179/41 |
| 3,351,714 | 11/1967 | Kunzelman et al. .......... | 179/41 |

*Primary Examiner*—Kathleen H. Claffy
*Assistant Examiner*—Thomas L. Kundert
*Attorneys*—C. Cornell Remsen, Jr., Rayson P. Morris, Percy P. Lantzy, J. Warren Whitesel and Delbert P. Warner

ABSTRACT: A switching scheme is provided for a telephone exchange having an attached switching section for serving mobile sets. Subscriber-line circuits are provided in the said section, each allotted to a mobile subscriber. A "Y" switching group in said section is equipped with twin cross-points, one branch of the "Y" leading to the radio circuits, the other to the mobile-suscriber circuits through a terminal switching group. The mobile-subscriber circuits are tested as to the class of service, busy condition etc., before a through-connection is established between a calling line in the exchange and a radio channel to reach the called mobile, or vice versa.

Figure 1A:
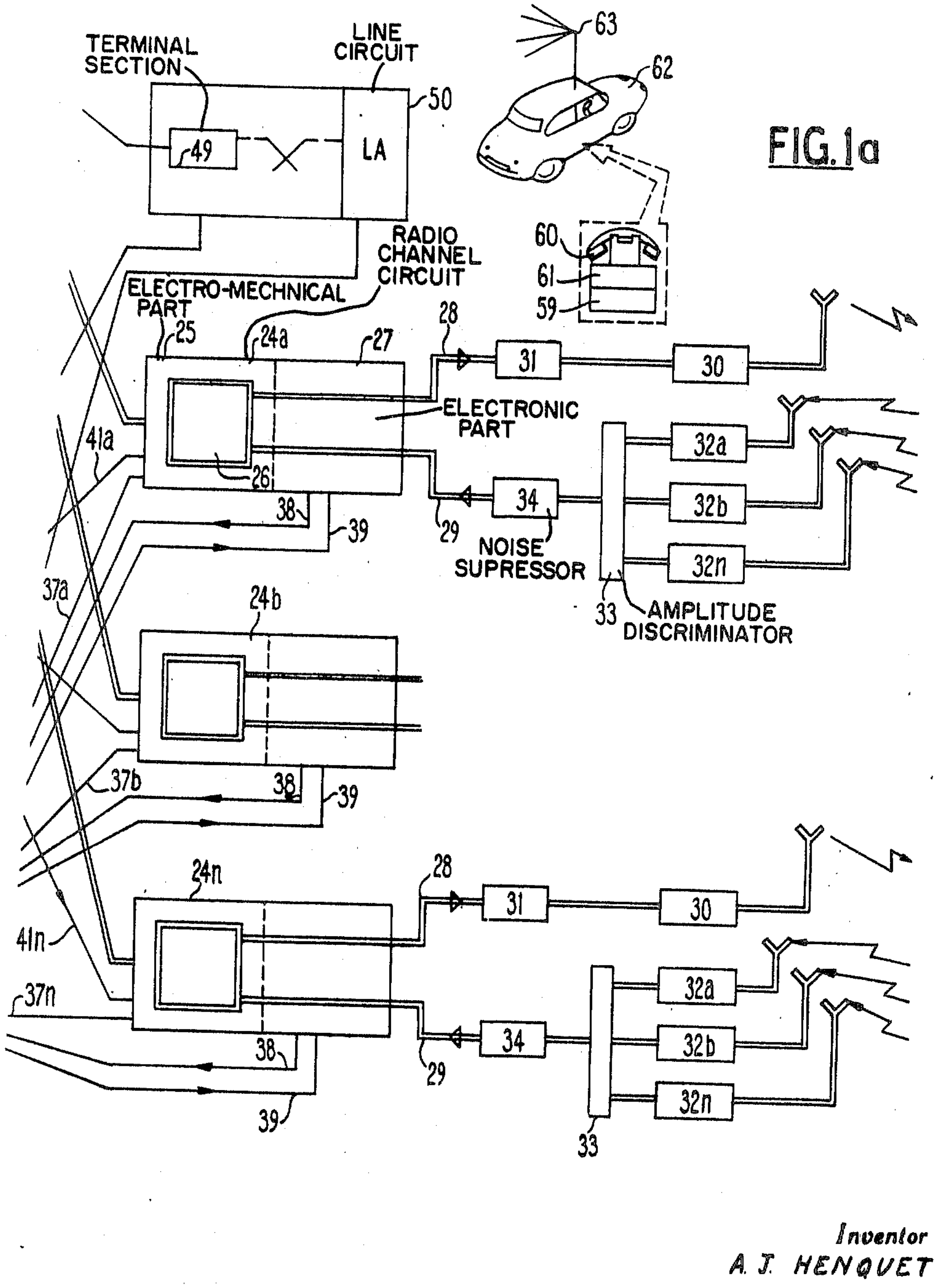

Inventor
A. J. HENQUET
By D. P. Warner
Attorney

PATENTED DEC 7 1971

3,626,112

SHEET 08 OF 21

AUTOMATIC MOBILE RADIOTELEPHONE NETWORKS

The invention relates to a radiotelephone system with multiple radio channels allowing telephone communications to be automatically established between a certain number of mobile radiotelephone stations and a public telephone network through a certain number of radio channels by using a device with automatic choice of radio channels to establish each new communication. By radiotelephone station there is designated a telephone station associated with a transmitter-receiver radio, for example installed in an automobile.

In radiotelephone systems of this type already known, each subscriber holder of a radiotelephone station is represented at the telephone exchange linked to the radiotelephone network by a subscriber's circuit like that of the ordinary subscribers of this exchange. Thus, the telephone selection of a mobile subscriber requires first the complete selection of its associated subscriber circuit, then the establishment of the connection between the associated subscriber circuit and the mobile station through the radiotelephone network. In another form, the selection of the mobile station comprises starting from the group selection stages of the exchange, a deconcentration towards the subscribers circuits, then a concentration of the subscribers circuits towards the radio channels and lastly, a deconcentration of the radio channels towards the mobile stations.

In the radiotelephone system described in the application for a U.S. Pat. No. 640,612 filed on May 23, 1967, in the names of B. Audic, M. G. M. Bruley, A. J. Henquet and J. J. Muller and entitled "Automatic Mobile Radiotelephone System" and assigned to the same assignee as the present invention, there was proposed a radiotelephone network attached to an exchange by which, starting from the group selection stages, a direct deconcentration towards the mobile stations is established. In this latter system it is not possible to distinguish the following states of the mobile subscriber: subscriber engaged, subscriber not in use, subscriber absent. In each case, a radio channel is engaged and uselessly used, before the exchange sends back towards the calling fixed subscriber a busy tone. This is why, it has appeared desirable to make recognition of these states before engaging the radio channel.

According to the present invention, there is provided a radiotelephone network linked to an exchange of the public telephone network in which, starting from the group selection stages, there is a deconcentration on the one hand directly towards the mobile stations by the radio channels and, on the other hand, towards the subscribers line circuits representing mobile stations.

The connection established in such a radiotelephone network between a mobile subscriber and a fixed subscriber comprises a derivation towards the subscriber line circuit corresponding to the mobile subscriber which allows of the normal administrative use, the charging for communications.

This derivation which is established before the establishment of the properly called communication between mobile subscriber and fixed subscriber obtains the following advantages: if the mobile subscriber asked for by a fixed subscriber is engaged, this state is recognized by the line circuit and the busy tone is sent back towards the fixed calling subscriber, without having uselessly engaged a radio channel. If there is no mobile subscriber corresponding to the number asked for, the connection is then returned to a talking machine which informs the calling subscriber of this, thus avoiding his recommencing his call uselessly. A mobile subscriber can have access to the absent subscriber service, exactly in the same conditions as a normal fixed subscriber of the exchange.

In a radiotelephone network such as that considered, the establishment of the connection between an outgoing junction of the group selection stages and one of the radio channels requires a mixed switching between the group selection stages and the radio channel circuit. This mixed switching is carried out in a primary selection stage as is described in the patent application already referred to. According to the present invention the primary selectors are modified in such a way as to establish in addition to the connection between the outgoing junction of the group selector stage and the designated radio channel, a second derived connection between the outgoing junction towards the terminal selectors having access to the line circuit corresponding to the mobile subscriber considered.

The multiselectors of the primary selection stage comprise, on the one hand horizontal bars giving access to the radio channel circuit, and on the other hand horizontal bars giving access to the terminal selectors. When a connection is to be established, the circuits of a horizontal bar having access to the radio channel circuits and of a horizontal bar having access to the terminal selector of the corresponding line circuit, are prepared, the operation of a vertical bar having access to the outgoing junction of the group selection stages proceeding to the switching of the connections considered.

According to a characteristic of the invention, before carrying out the switching properly so called, and in order to prepare the setting into final place of the different apparatus required, there are established a first auxiliary connection between a register of the exchange and the service circuit of the radio channel through the primary section and the marker assigned to the radio channels, a second auxiliary connection between the marker and the station of the mobile subscriber implicated in the call through the radio service channel, this second connection being intended for the transmission of the coded number of the said mobile subscriber, and a third auxiliary connection between the marker and the line circuit corresponding to the mobile subscriber considered.

According to another characteristic of the invention, in the case of a call for a fixed subscriber by a mobile subscriber, the second auxiliary connection preliminarily connects the station of the mobile subscriber involved in the call to the marker through the circuit of the service radio channel, then the number of the said mobile subscriber being registered in the marker, the third auxiliary connection is established to know the nature of the said mobile subscriber, before returning to the said station through the said radio channel circuit, the second connection allowing the coded number to be sent to the marker and its control at the return to the station of the mobile subscriber.

The essential phases of the establishment of the radiotelephone connection in one direction or the other are the following: a call causes the seizure of a register at the exchange; the register tests the primary section assigned to the radio channels in order to verify that its connection with the said primary section is available; the section tests the marker assigned to the radio channels in order to verify that it is also available; the marker is connected to the circuit of the service radio channel; the coded number of the mobile subscriber involved in the call is transmitted to the marker; the marker verifies the code of the number, the marker tests the existence and eventually the category of the line circuit corresponding to the mobile subscriber considered; according to the result of the test, the marker sends or does not send the number by the service radio channel to all stations of mobile subscribers; in each station in service, the number received is compared with the number belonging to the corresponding mobile station; the station which recognizes its number sends a signal "acknowledgment of receipt" which causes the seizure of the marker and that of the service radio channel to be confirmed; this confirmation is transmitted to the register and starts the placing of the bars of the multiselector of the primary section giving access to the said radio channel circuit and those giving access to one of the terminal selectors giving access to the line circuit corresponding to the mobile subscriber; a ringing signal is sent by the exchange towards the station of the called subscriber; and lastly the final establishment of the metallic connection is produced between the group selection stage involved in the call and the terminal of the service radio channel circuit.

Figures 1B, 12:
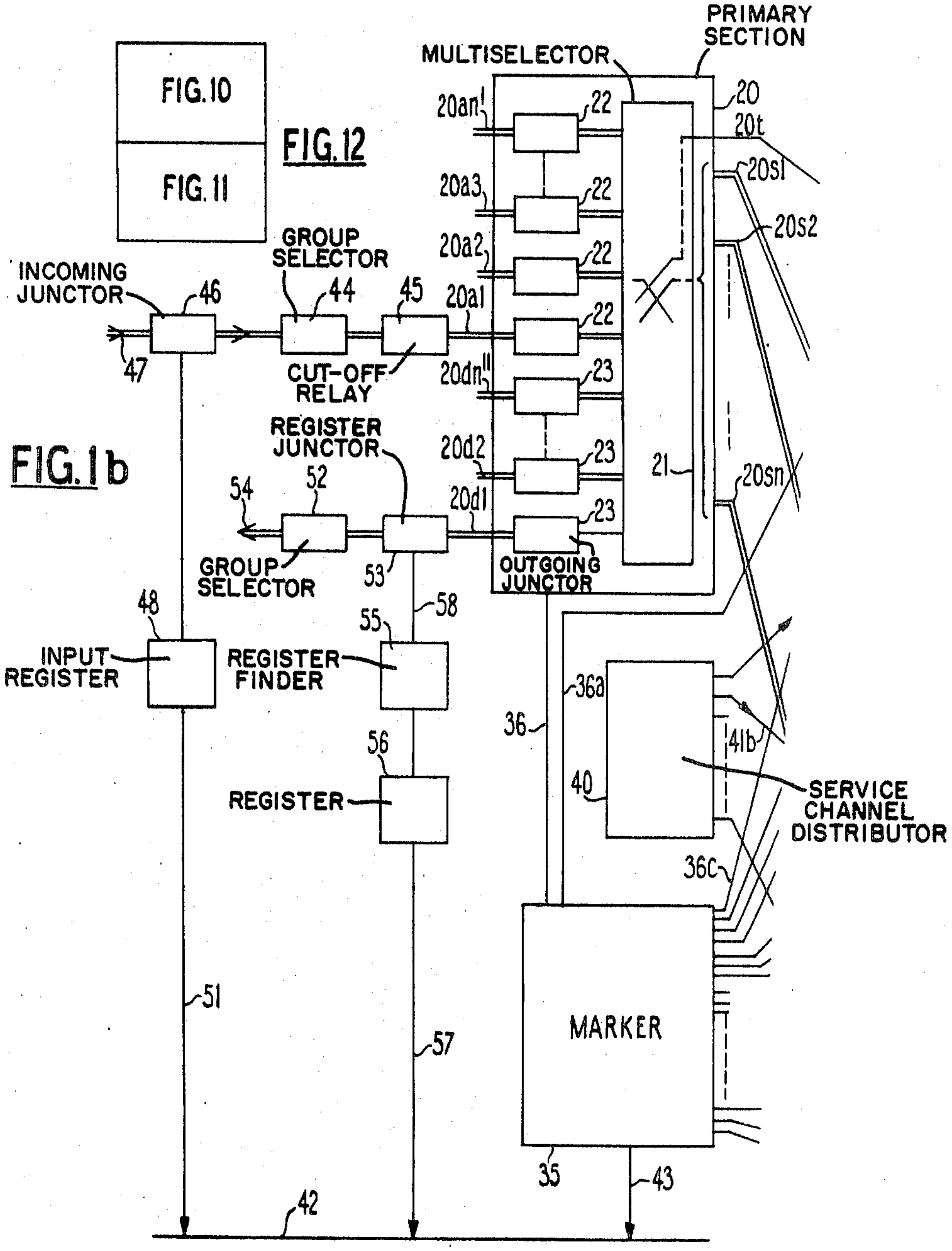
Figure 2:
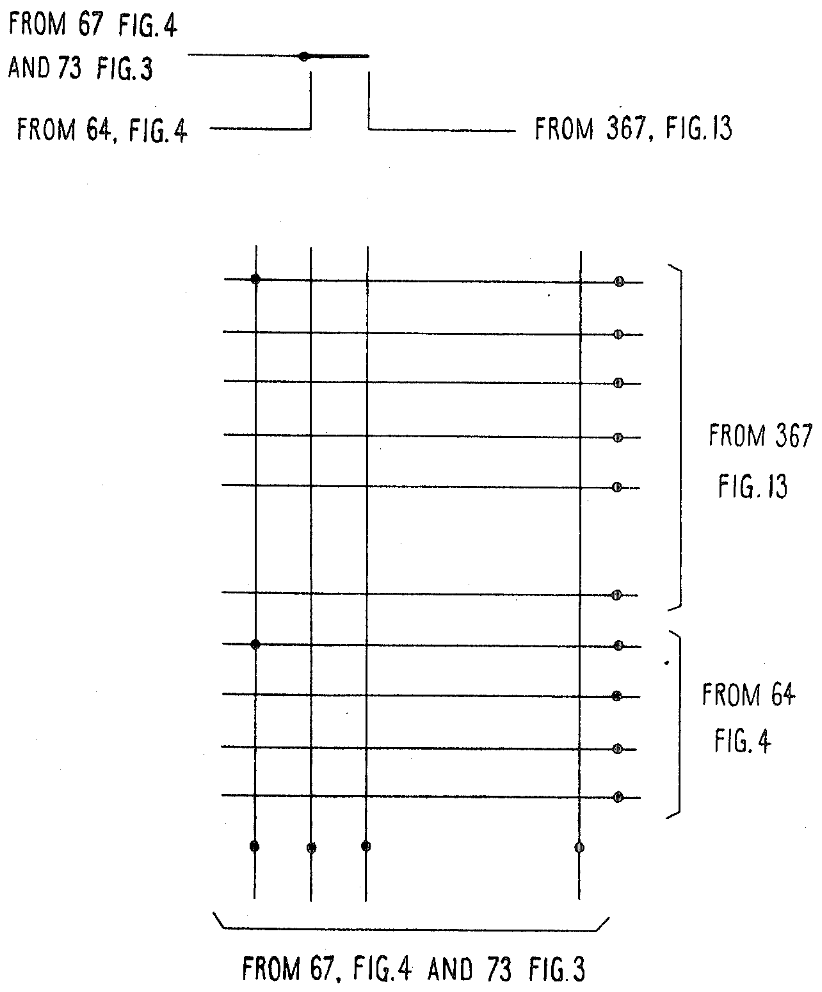
Figure 3:
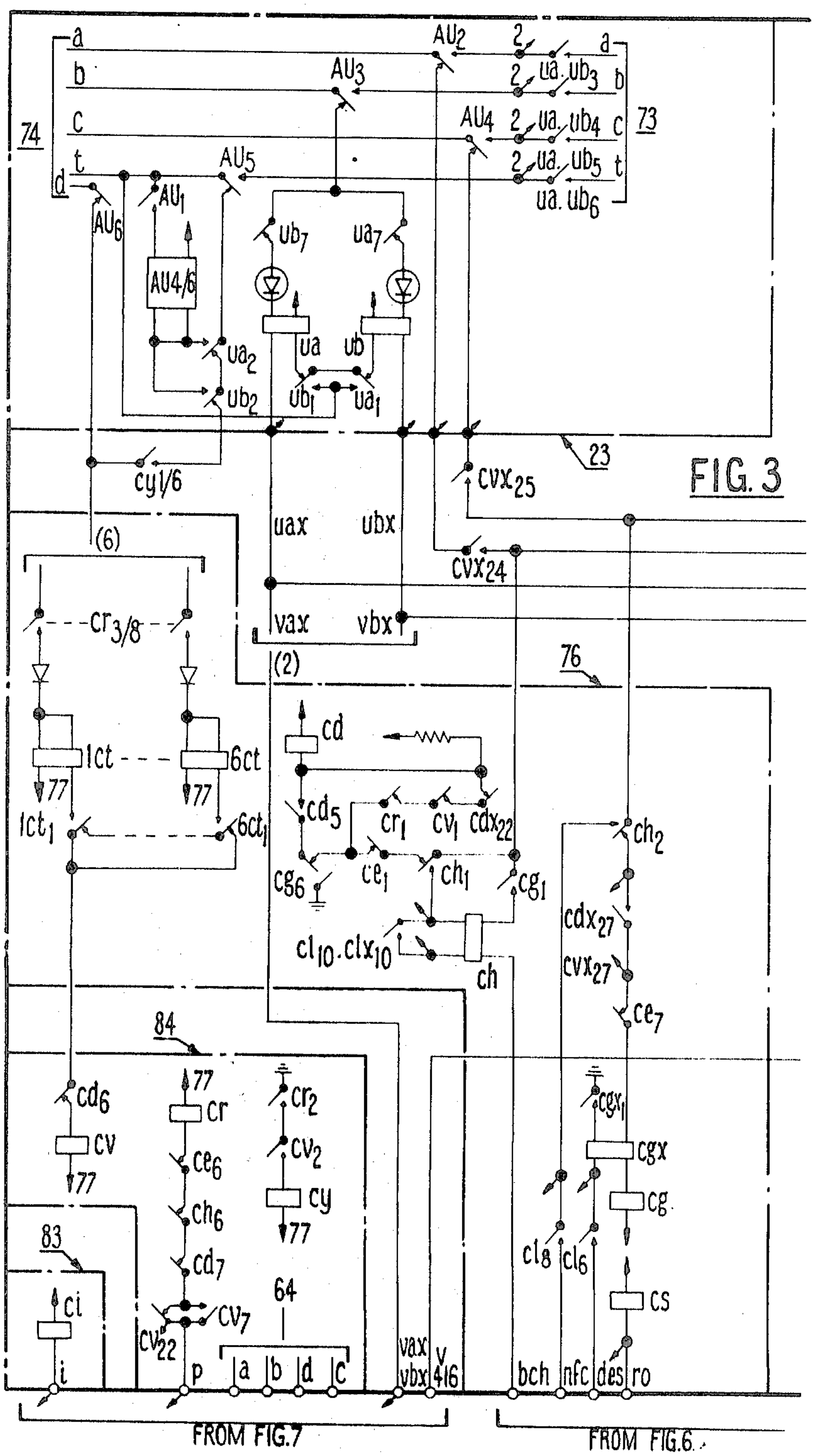
Figure 4:
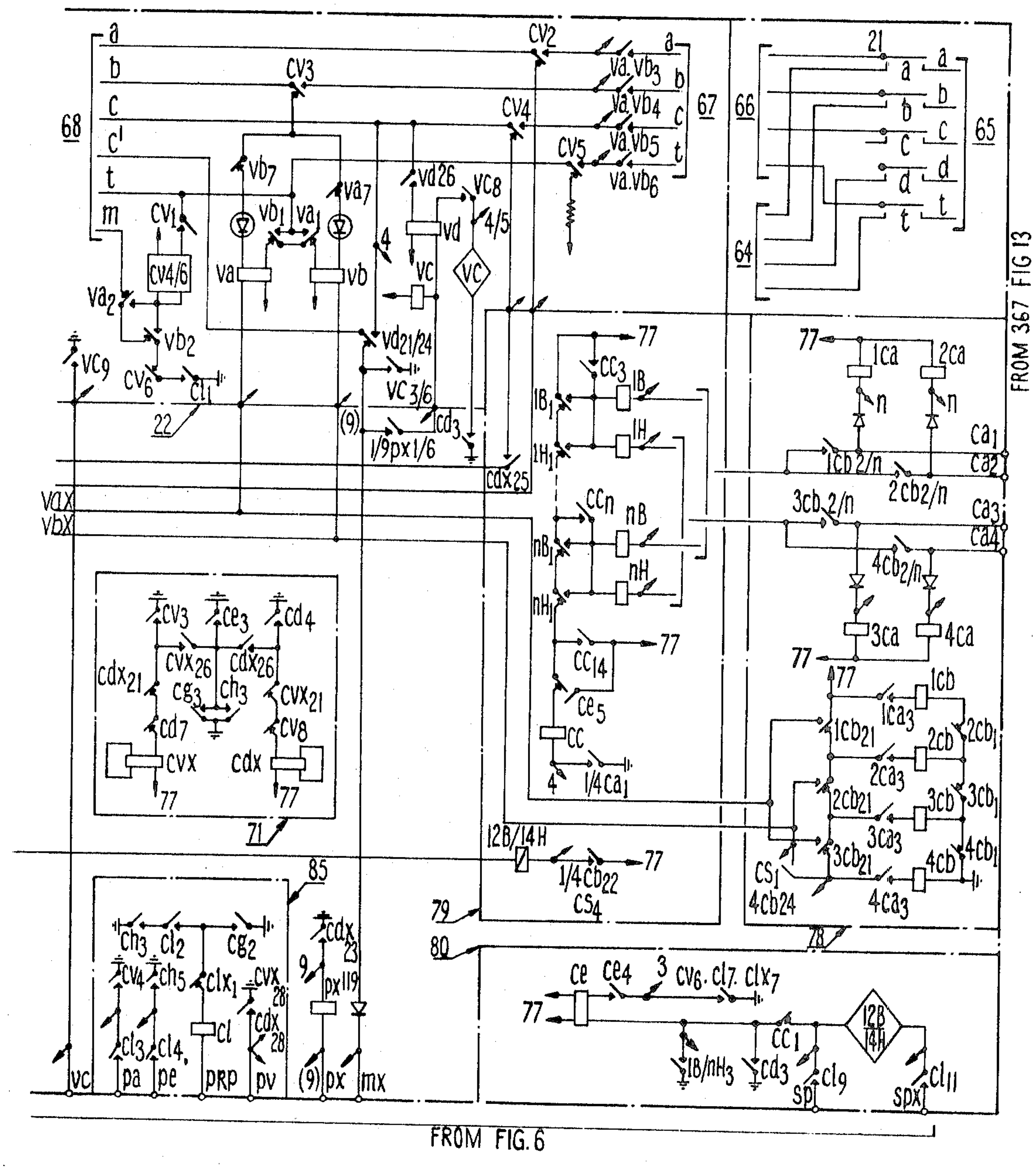
Figure 5:
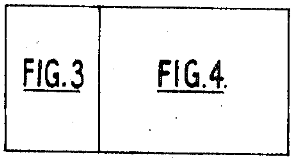
Figure 6A:
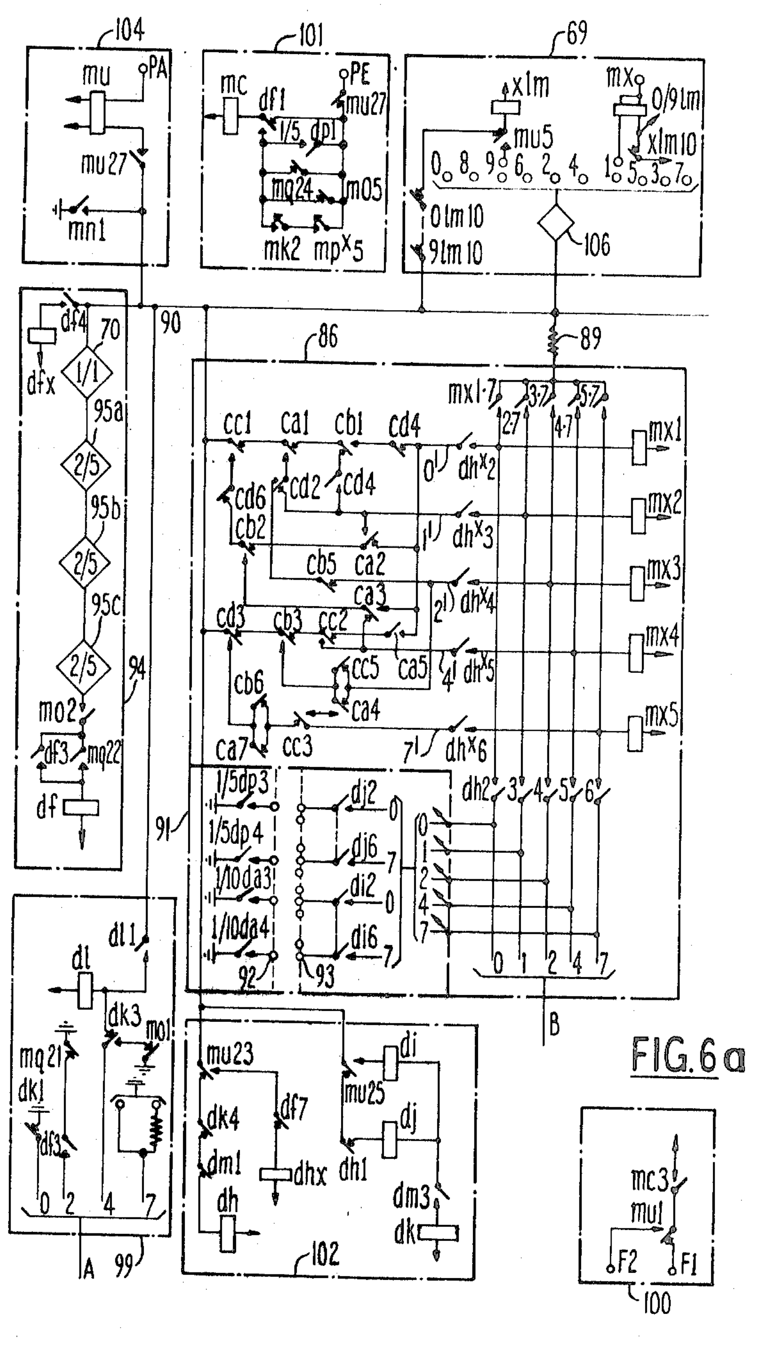
Figure 6B:
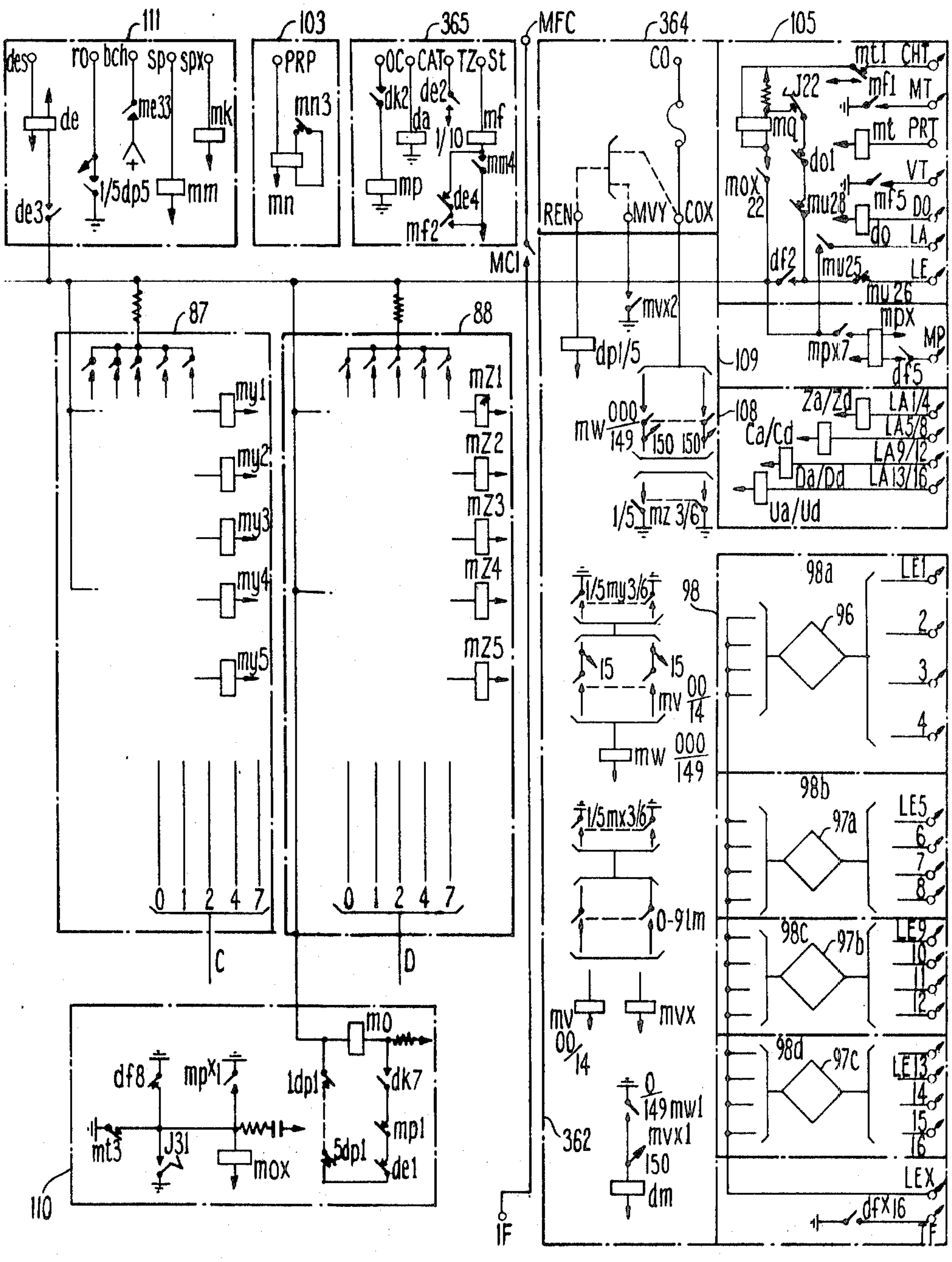
Figure 7A:
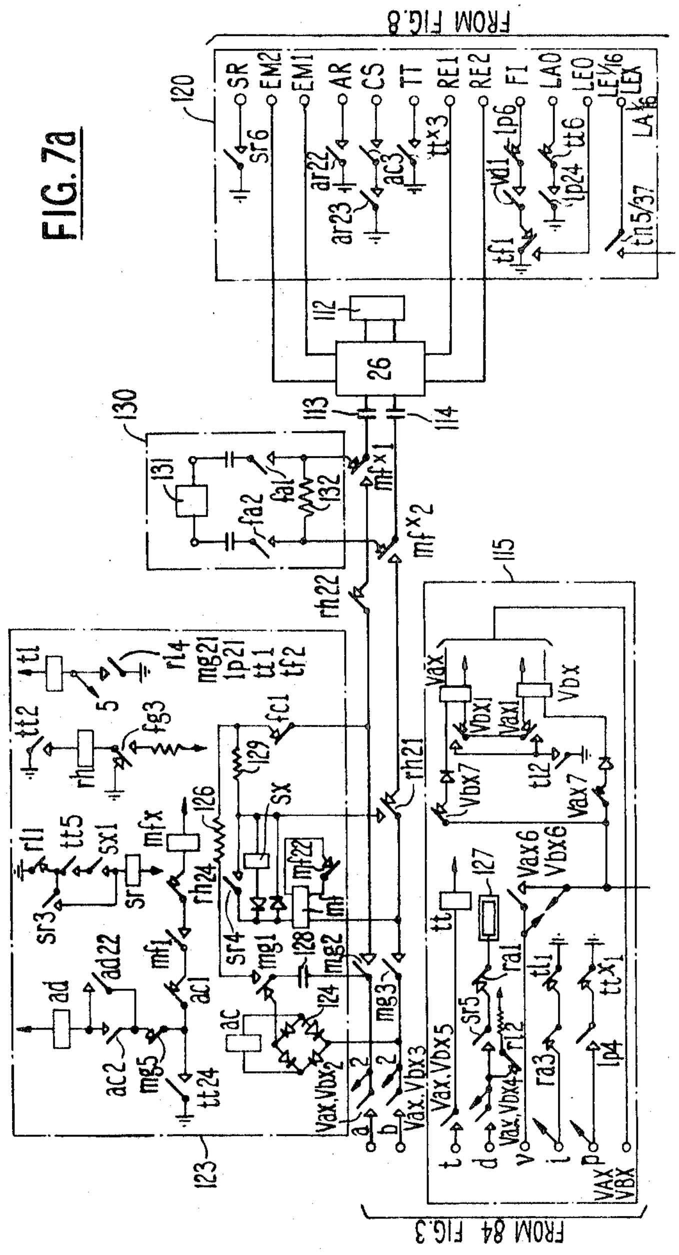
Figure 7B:
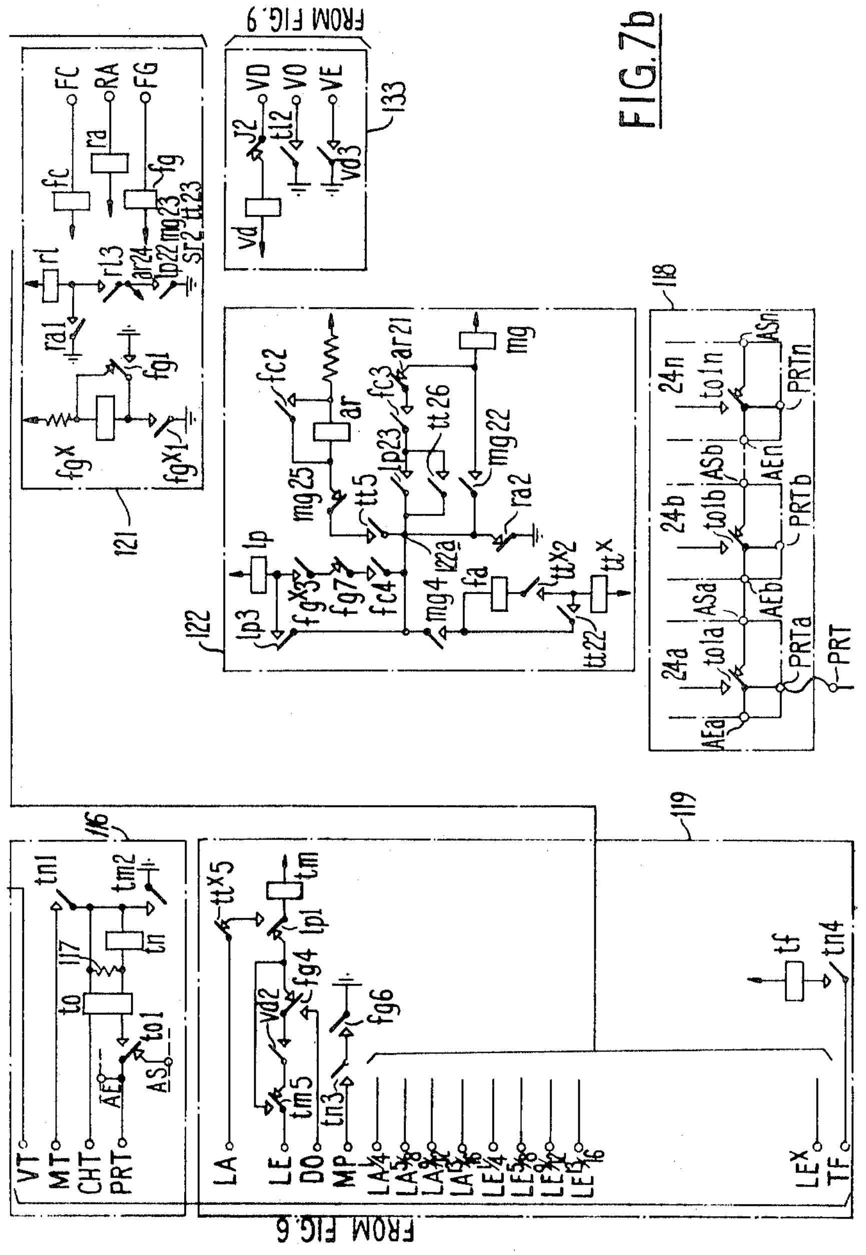
Figure 8A:
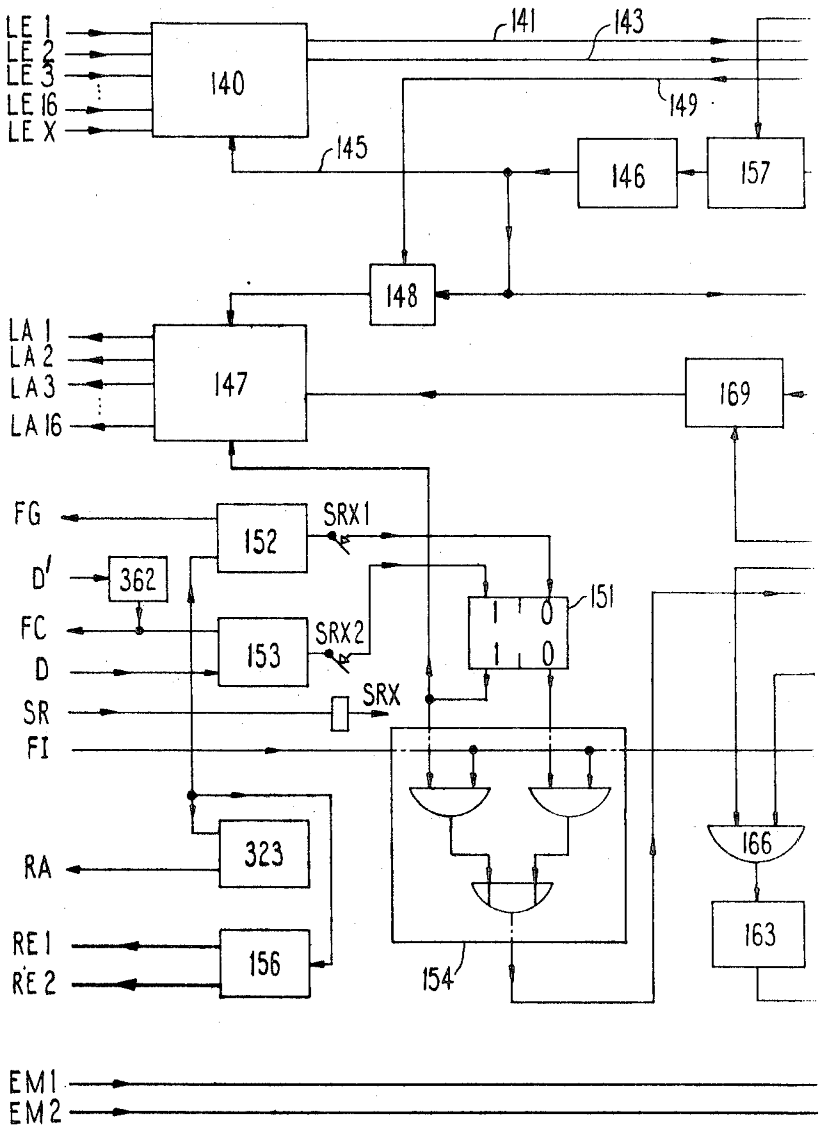
Figure 8B:
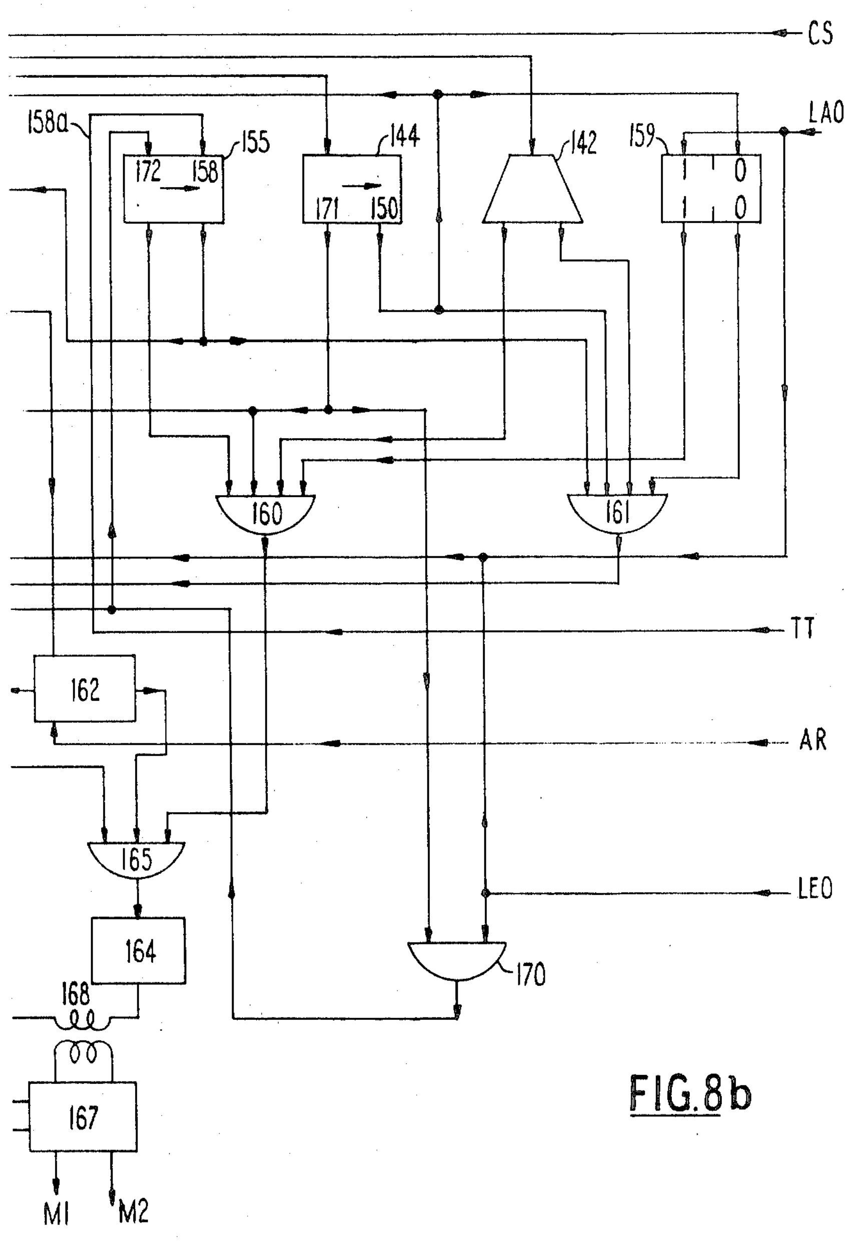
Figure 9A:
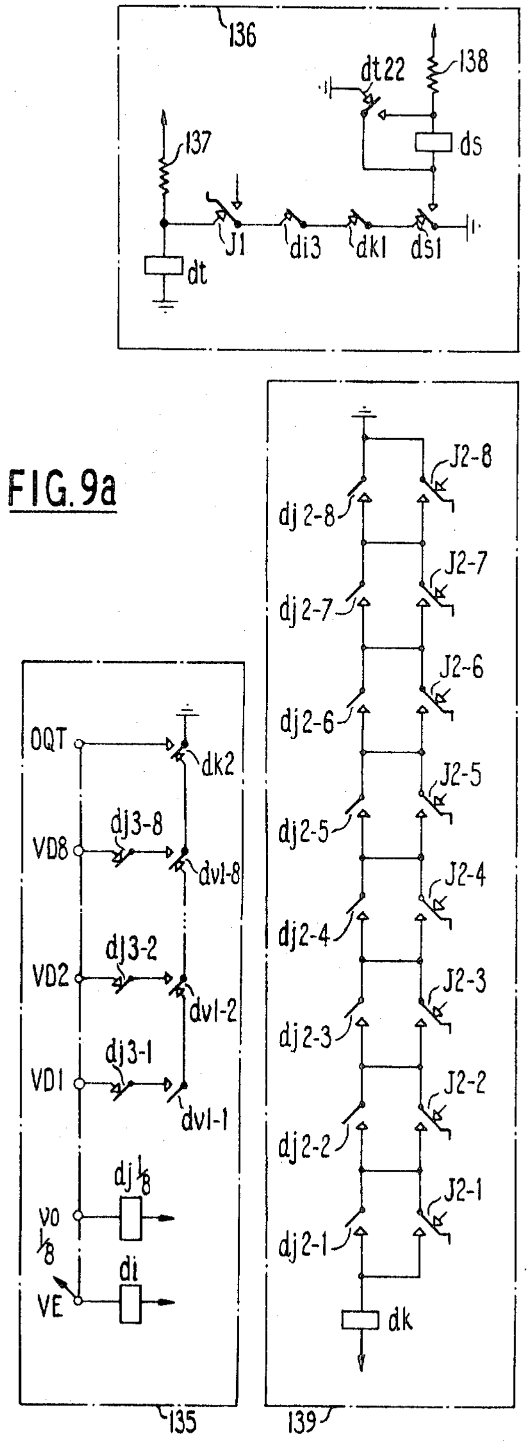
Figure 9B:
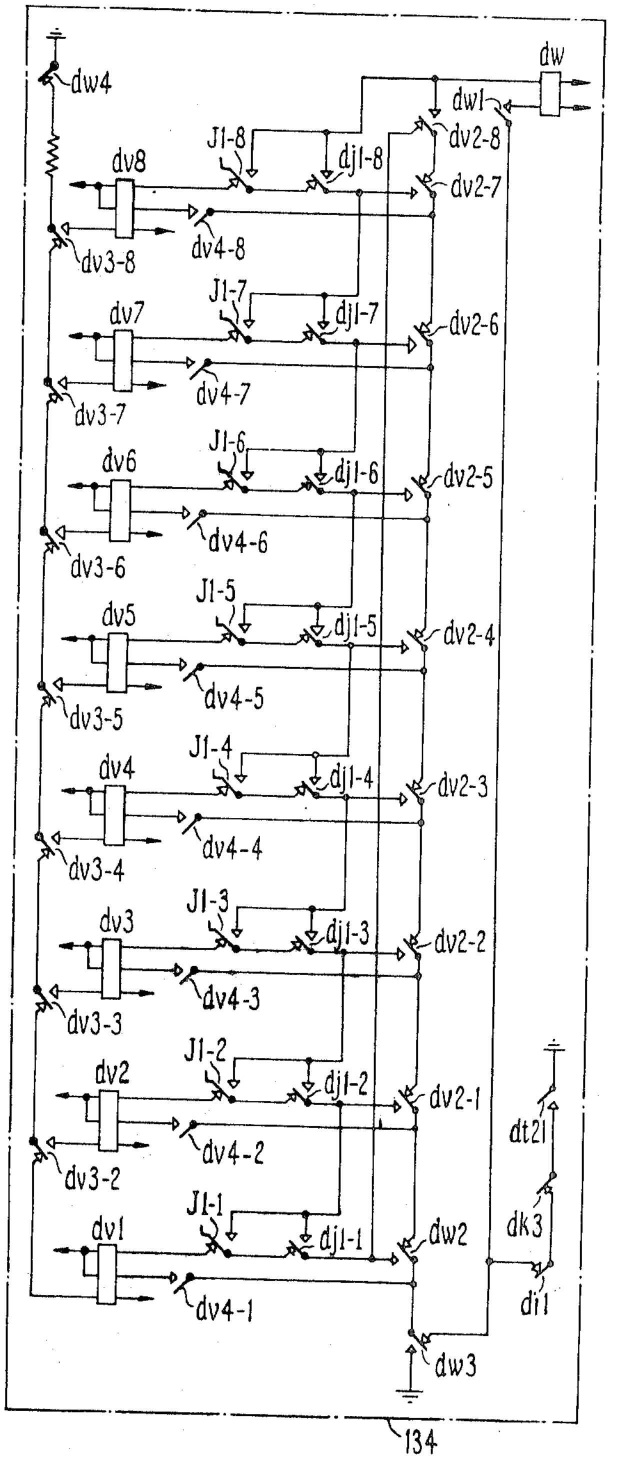
Figure 10A:
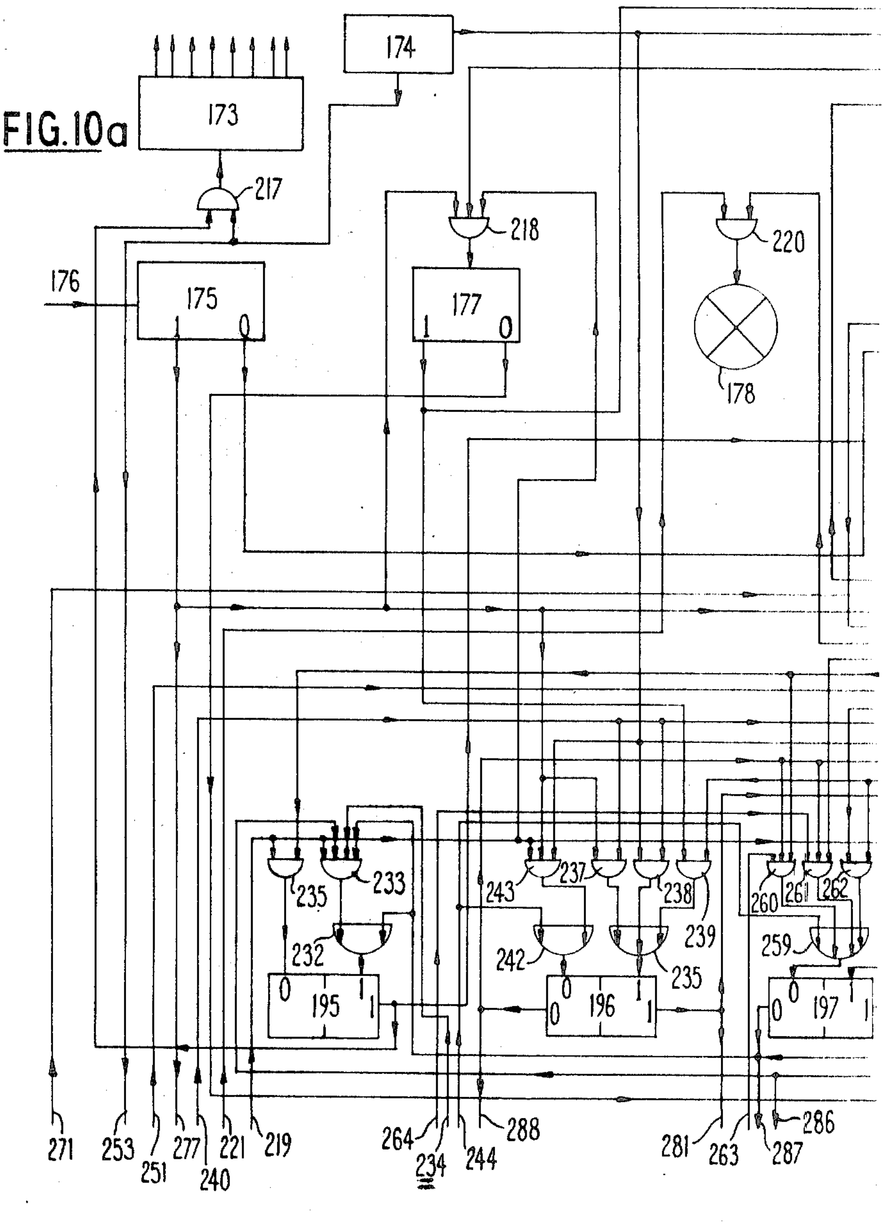
Figure 10B:
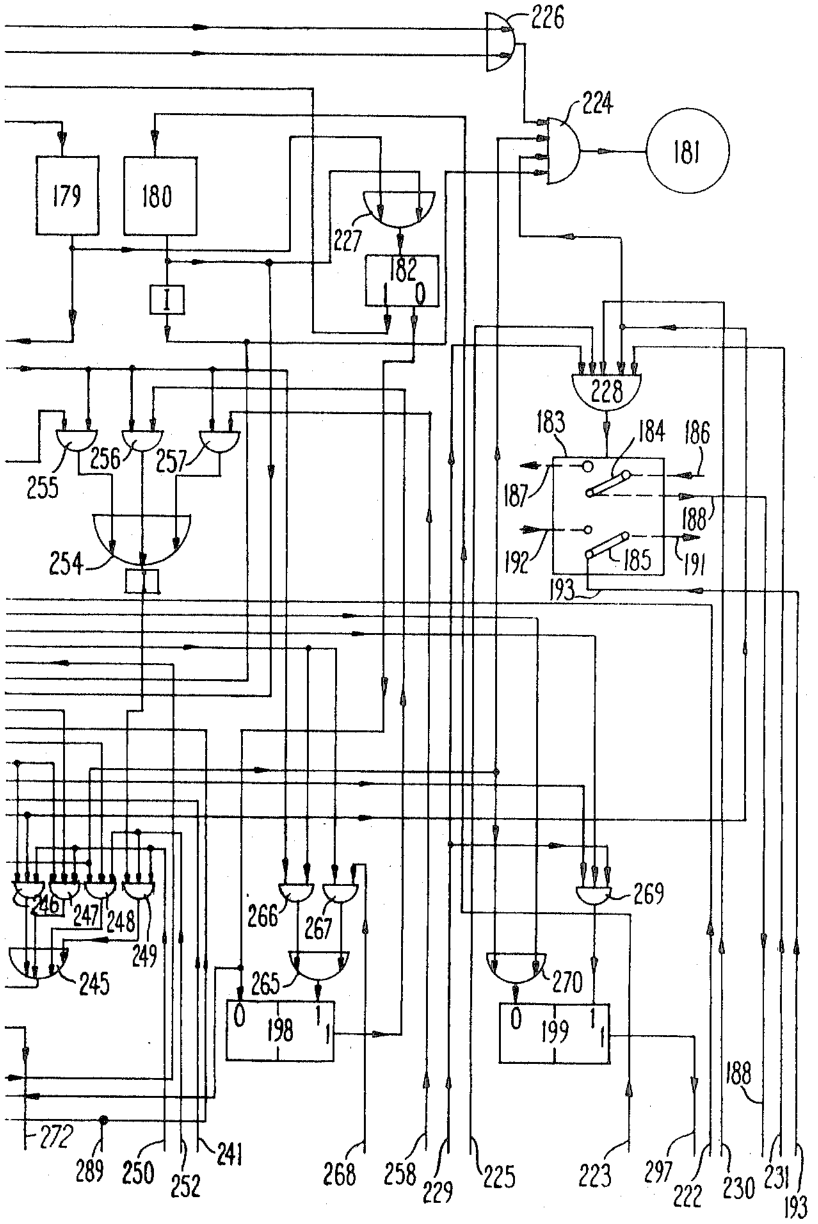
Figure 13A:
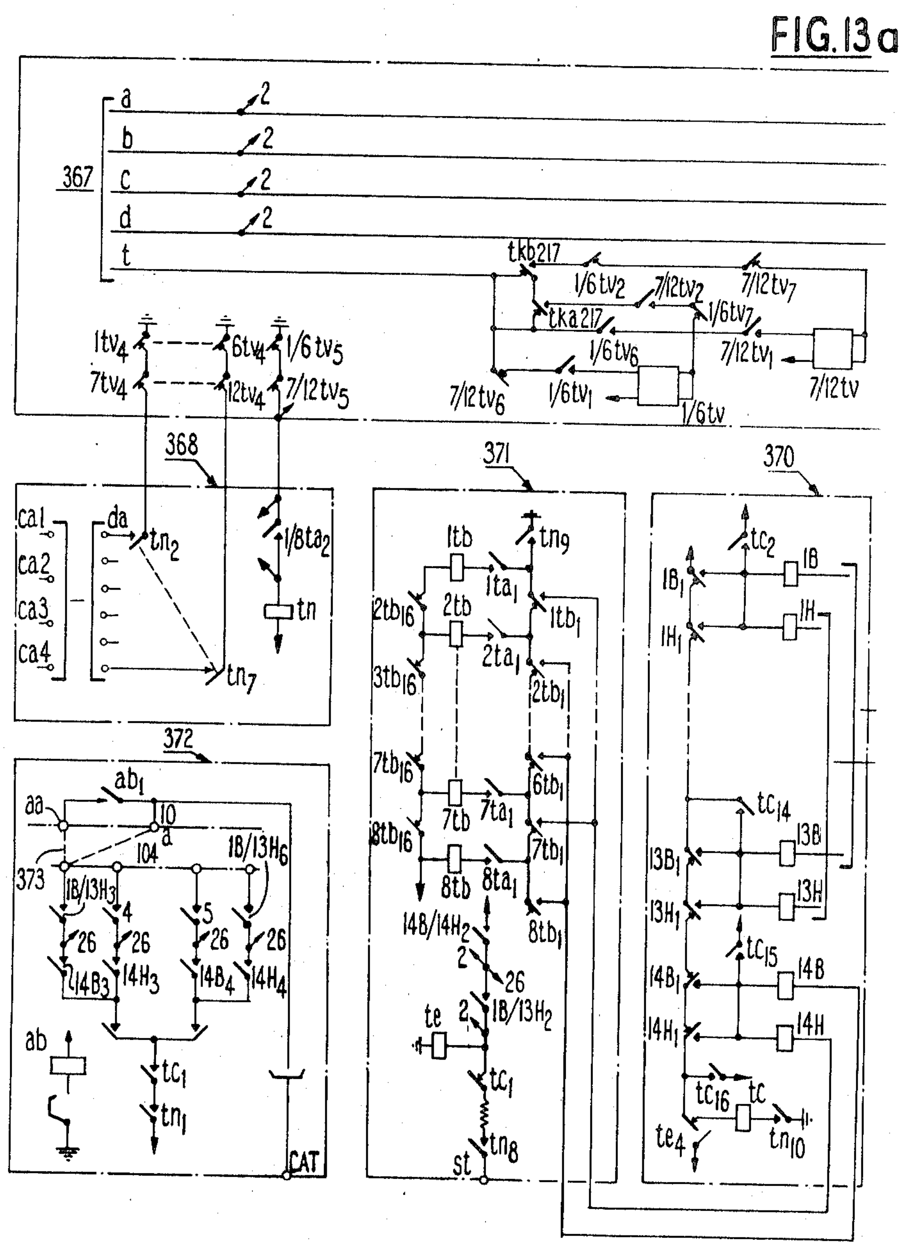
Figure 13B:
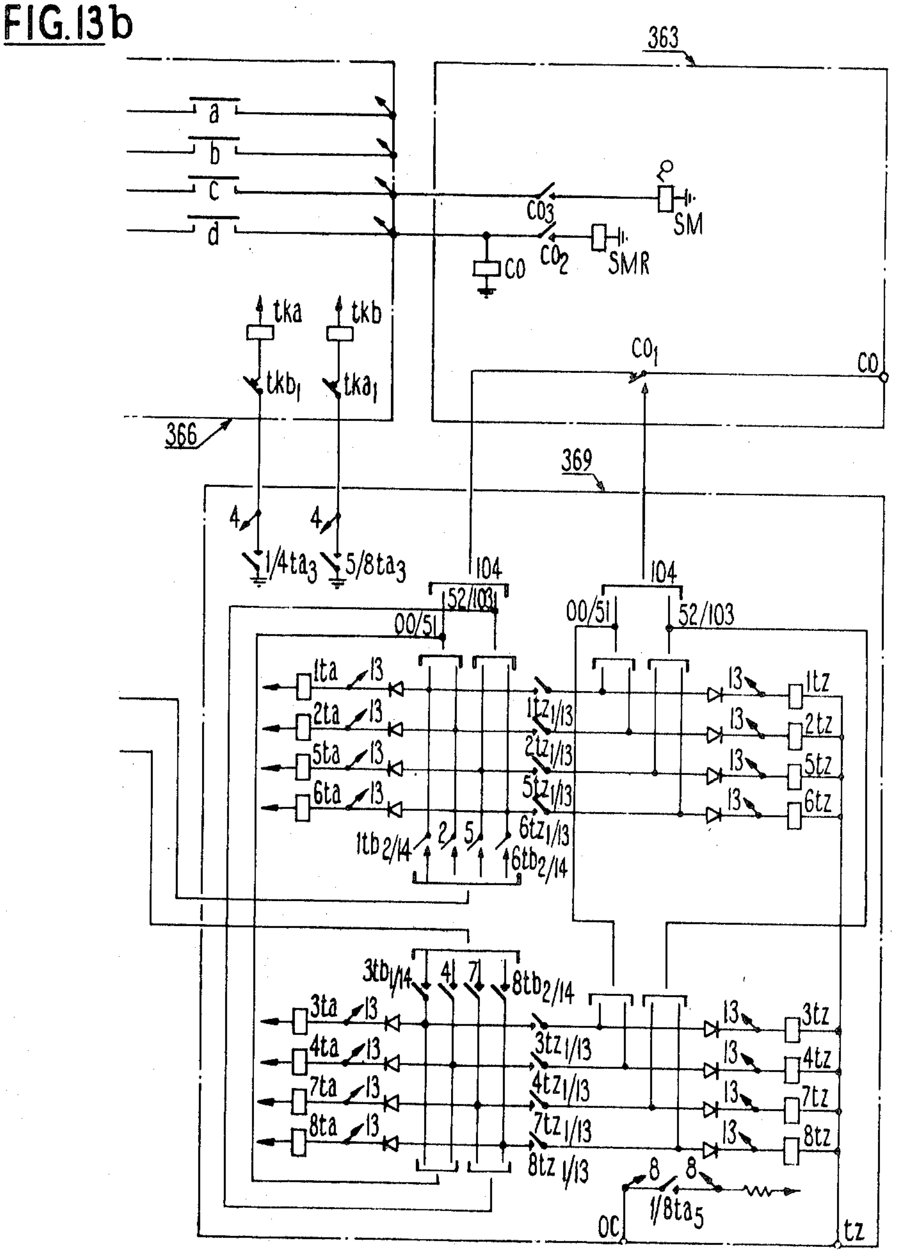
Figure 14:
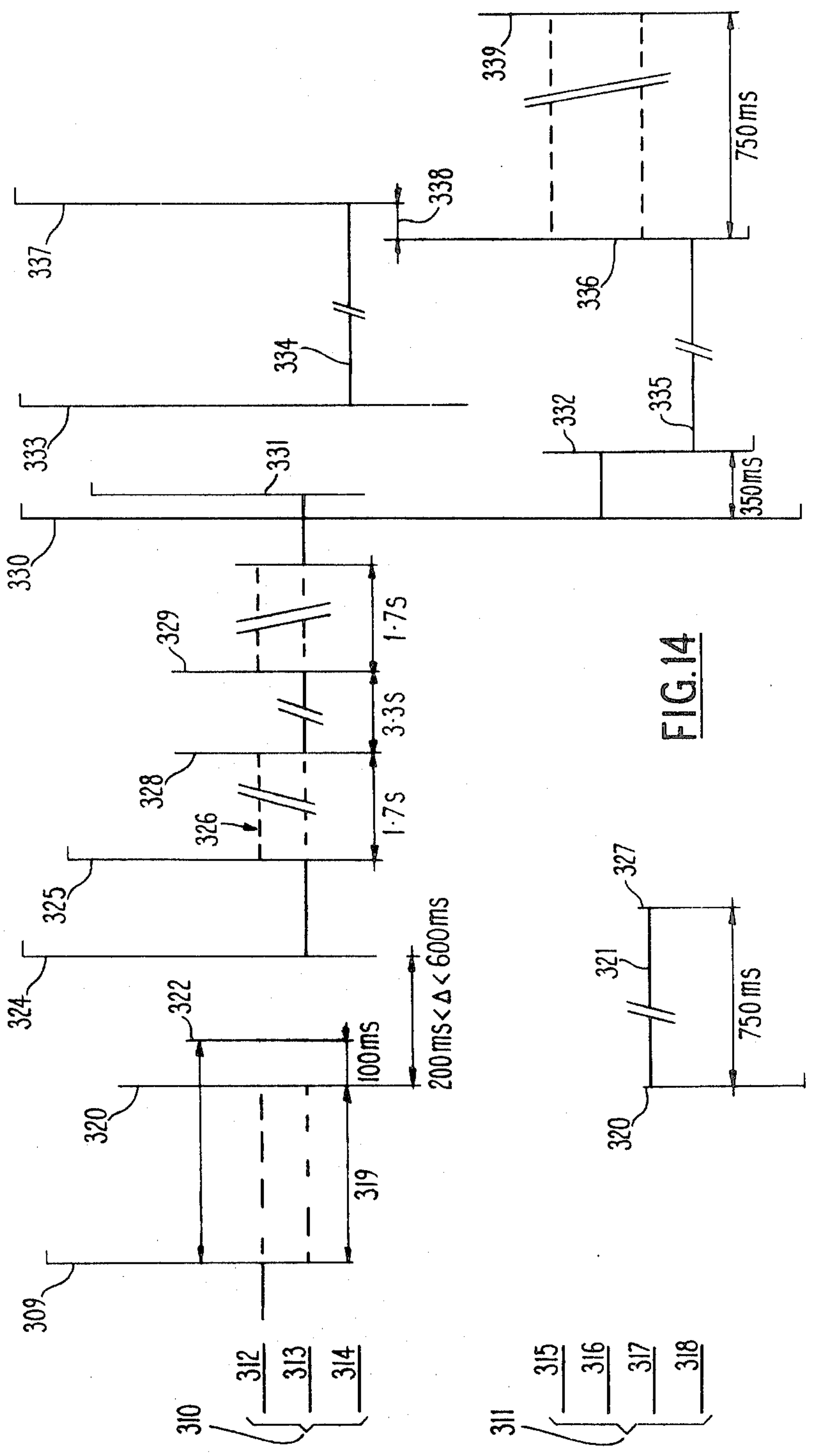
Figure 15:
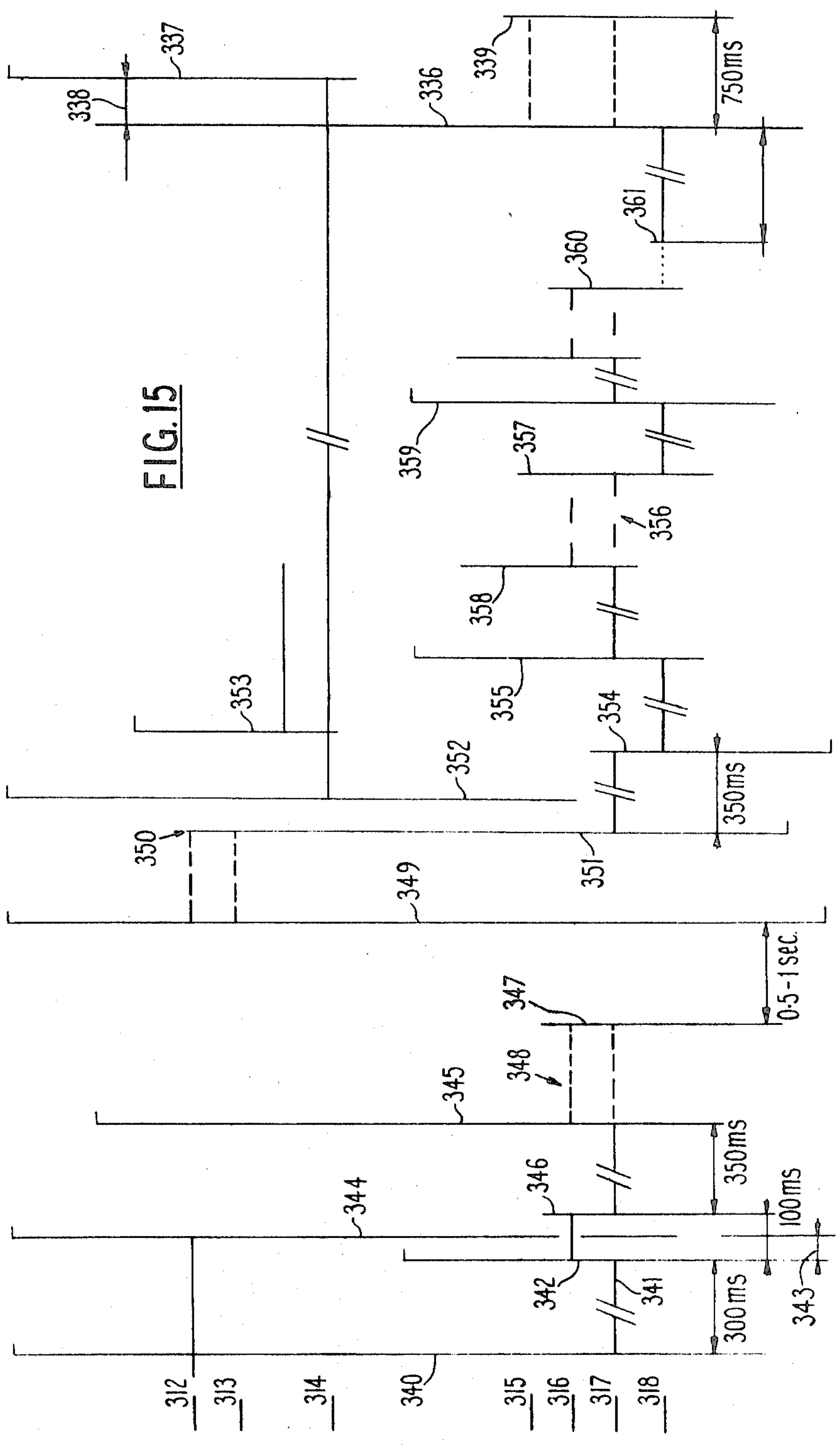

The objects and characteristics of the present invention will best appear from the reading of the following description of implementation examples of carrying it out, the said description being made in relation with the drawings hereto annexed in which:

FIGS. 1*a* and 1*b* show in summary manner an example of carrying out a radiotelephone network according to the invention, FIG. 2 shows schematically the arrangement of the horizontal and vertical bars of the primary section, FIGS. 3 and 4 show an example of carrying out the primary section assigned to the radio channels, FIG. 5 shows the assembly of FIGS. 3 and 4, FIGS. 6*a* and 6*b* show an example of carrying out the marker assigned to the radio channels, FIGS. 7*a* and 7*b* show an example of carrying out the electromechanical part of a radio channel circuit, FIGS. 8*a* and 8*b* show in summary manner the electronic part of a radio channel, FIGS. 9*a* and 9*b* show an example of carrying out a circuit assigned to the radio channels and called distributor of service channels, FIGS. 10*a*, 10*b*, 11*a* and 11*b* show in summary manner an example of carrying out an equipment of a mobile station, FIG. 12 shows the assembly of FIGS. 10 and 11, FIGS. 13*a* and 13*b* show the terminal section and a subscriber line circuit according to the invention, FIG. 14 shows the timing diagram of the establishment of the communication for a call coming from a fixed subscriber and directed towards a mobile subscriber, FIG. 15 shows the timing diagram of the establishment of communication for a call coming from a mobile subscriber directed towards a fixed subscriber.

The radiotelephone network such as is shown in FIGS. 1*a* and 1*b* is composed of a fixed part called unit of attachment which is attached to a public telephone exchange of usual type and of a mobile part which is made up of the assembly of mobile subscriber stations. There is described below an embodiment example in which the attachment telephone exchange uses a cross bar telephone system known under the name of Pentaconta system; however, this does not limit the invention to the use of this system. The attachment unit comprises a primary section 20 the number of outputs 20*s*1, 20*s*2 etc...20*sn* of which is equal to the number of radio channels assigned to the zone in which the exchange considered is found. The number of inputs of this primary section should be at least equal to the number of outputs. Each input can serve an incoming call as well as an outgoing call. Thus the primary section 20 comprises a first group of inputs 20*a*1, 20*a*2, 20*a*3 etc...20*an'* this group treating incoming calls. The second group of inputs 20*d*1, 20*d*2, etc...20*dn''* allows on the other hand outgoing calls to be treated.

The primary section 20 is essentially made up of a multiselector 21 of usual crossbar type, of arrival junctions 22 inserted respectively between the multiselector 21 and each of the inputs 20*a*1, 20*a*2 etc...20*an'*, and outgoing junctions 23 inserted respectively between the said multiselector and each of the inputs 20*d*1, etc...20*dn''*. The number of incoming junctions 22 and the number of outgoing junctions are preferably equal to the number *n* of outputs of the multiselector 21 but can be greater.

The outputs 20*s*1, 20*s*2 etc...20*sn* are connected respectively to the radio channel circuits 24*a*, 24*b* etc...24*n*. Each radio channel circuit is made up of an electromechanical part 25 which comprises a termination 26 allowing for two wire-four wire transformation, and of an electronic part 27. The outputs 20*t* of which one only is shown are connected to the selection terminal element 49 giving access to the mobile subscriber line circuits 50.

Each radio channel circuit comprises a transmission output 28 and a receiving output 29. The output 28 is connected to a transmitter 30 through a circuit 31, of known type, intended to keep at constant level the modulation level of the transmitter 30. The latter is of the frequency modulation type in the VHF or UHF ranges, for example at 80 megacycles per second of 160 or 450 megacycles per second, according to the frequency ranges allocated in the zone considered.

If a single fixed transmitter is sufficient, it is necessary in practice to provide several fixed receivers, for the mobile transmitters have a limited power and range for reasons of space, feed and consumption. This is why, to each output 29 there correspond several fixed receivers 32*a*, 32*b*, etc...32*n* which are geographically spaced in the zone to be covered. However, a single fixed receiver should be used at any one time and the choice is carried out by a circuit 33, of known type, comprising essentially an amplitude discriminator. This circuit 33 is connected to the output 29 through a circuit 34 of known type, called "noise suppressor" and essentially intended to suppress the noise level during periods of conversation in which the mobile subscriber does not speak.

The frequency of sending and the frequency of receiving of each radio channel are fixed and separated by a certain interval sufficient to allow of duplex operation.

The operation of the attachment unit is directed and controlled by a marker 35 which is associated, on the one hand, with the primary section 20, with the terminal section 49 and with the line circuits 50 as the connections 36, 36*a* and 36*c* respectively take place and on the other hand to each of the radio channel circuits as the connections 37*a*, 37*b*...37*n* respectively appear. The marker 35 comprises besides two connections 38 and 39 with each electronic part of the radio channel circuits. The connection 38 allows of the sending of the called subscriber number by a mobile subscriber, whilst the connection 39 allows of the transmission of the number of the called mobile subscriber by another subscriber whether fixed or mobile.

The attachment unit also comprises a circuit 40 called "service channel distributor," which is connected to each radio channel circuit as the connections 41*a*, 41*b*etc...41*n* appear. This circuit allows of designating amongst the unoccupied channels that which will serve the first call which will present itself.

The connections of the attachment unit to the corresponding exchange are described hereafter. Each incoming junction 22 is connected to a level of an incoming group selector stage 44 of the exchange through an availability cutoff relay 45. The stage 44 is itself connected to an incoming junction 46 like the other junctions of the exchange. This junction receives the "arrival calls" by the input 47.

Each outgoing junction 23 is connected to a level of the stage 52 of outgoing group selection of the exchange through a register junction 53, like the other register junctions of the exchange. The stage 52 allows the transmission of "outgoing calls" by the output 54. The register junction 53 can be connected (connection 58) to one of the registers 56 of the exchange by an ordinary register finder 55. The register 56 can be connected in known manner (connection 57) to the connector bundle 42 of the exchange when information is to be exchanged with other apparatus of the exchange.

For convenience of description the incoming junction 46, which is able to receive calls coming from another exchange, is connected to a preselection chain 48, comprising an input register. The register 48 can also be connected to the connector bundle 42 (connection 51) to exchange information.

These different circuits which are connected to the primary section 20 form part of the exchange and are of usual type.

A mobile subscriber has been shown in summary in FIGS. 1*a* and 1*b*. Its equipment is essentially made up of a sender-receiver 59, of a hand set 60 and of a switching and signalling unit 61, the assembly being connected inside a vehicle 62. The antenna 63 mounted on the vehicle 62 is suitable to send and receive the different signals sent or received by the antennae of the fixed transmitters and receivers of the attachment unit.

When the network operates, the distributor 40 designates amongst the unused radio channels one of them called service channel and intended to serve the first call which will present itself. If a call comes from a fixed subscriber, the number or indication of the called subscriber is sent to the marker 35 by the connector bundle 42. It is there stored, the marker verifies the availability of the terminal section 49 and of the wanted line circuit 50, then the indication is translated in the said marker and sent by the connection 39, corresponding to the circuit of the service radio channel to the corresponding fixed transmitter 30, from which it is broadcast to all the mobile subscribers. As soon as the called station of the mobile subscriber has sent an "acknowledgement of reception," the metallic connection is finally established between the group selection stage 44 and the circuit of the service radio channel through the primary section 20.

In the same way, a call coming from a mobile subscriber will be detected by a fixed receiver of the service radio channel circuit to be sent to the marker 35 by the connection 38. The marker verifies the availability of the terminal section 49 and of the calling line circuit 50. And, as soon as the called subscriber station has sent an "acknowledgement of reception," the metallic connection between the group selection stage 52 and the circuit of the service radio channel is finally established through the primary section 20.

Thus, in both cases, before effecting the direct connection between the circuit of the service radio channel and the output of the group selector concerned in the call, there are established two auxiliary connection tracks which are intended to prepare the final setting into place of different apparatus required.

In the embodiment example of the primary section shown in FIGS. 3 and 4 assembled according to FIG. 5 there will be recognized, shown summarily, the multiselector 21 an incoming junction 22 and an outgoing junction 23.

In the multiselector 21, *a* and *b* are the line wires, *c* is a metering wire, *t* a holding wire by the corresponding feeder situated in the exchange, *d* a holding wire of the radio channel selector. These wires are connected, on the side of the bracket 64, to the radio channel circuit, on the side of the bracket 65 to the terminal selectors, whilst on the side of the bracket 66 they are connected to the outgoing or incoming junction.

The incoming junction 22 comprises moreover the wires *a*, *b*, *c*, *c'*, *t*, previously defined, a wire *m* which is connected to the stage 44 and which allows the setting into place of the "incoming" group selection, this wire being cut as soon as the group selection is made and the availability cutoff relay 45 is seized.

These wires are connected, on the side of the bracket 67, to the selector 21 and, on the side of the bracket 68, to the corresponding availability cutoff relay 45.

Two relays V*a* and V*b* each with two windings have their first winding branched on one side of the wire *b* through their rest contacts *va*7 and *vb*7(arranged to be mutually excluded), and on the other respectively to the radio channel by the wires *vax* and *vbx*, and their second winding on the one hand to battery and on the other to the holding wire *t* by their contacts *va*1 and *vb*1 respectively.

The other contacts of these relays, i.e. the contacts *va*2, *va*3, *va*4, *va*5, *va*6 and *vb*2, *vb*3, *vb*4, *vb*5, *vb*6, are connected respectively to the wires *m*, *a*, *b*, *c*, *t*.

A relay *cv* with two windings, has its first winding branched on one side to the work contacts *va*2 and *vb*2 in parallel, to earth through work contact *ci*1 and its rest contact *cv*6, and on the other hand to battery; its second winding is branched to the same contacts *va*2 and *vb*2 and on the other hand, to the holding wire *t* through its work contact *cv*1.

The contacts *cv*2, *FIG. 3*, *cv*4, *cv*5 are connected respectively to the wires *a*, *b*, *c*, *t*.

The wire *t*, side 67, is connected to the wire *t*, side 68, by a work contact *cv*5.

In junction 23, FIG. 3, two relays *ua* and *ub* with two windings, have their first winding branched, on one side to the wire *b* by the contacts *ua*7 and *ub*7 connected in mutual exclusion and, on the other, towards the radio channel circuits by the wires *uax* and *ubx*, connected to the wires *vax* and *vbx*, and their second winding on one side to battery and on the other to the holding wire *t* by their contacts *ual* and *ubl* respectively.

The other contacts *ua*3, *ua*4, *ua*5, *ua*6 of this relay are connected respectively to the wires *a*, *b*, *c*, *t*.

A relay *Au* with two windings, has its first winding branched on one side to the wire *t* by the work contacts *ua*2 and *ub*2 in parallel and a rest contact *Au*5 in series, and on the other to battery, and has its second winding on one side branched to the same contacts *ua*2 and *ub*2 and on the other to the wire *t* through its work contact *au*1. The contacts *Au*2, *Au*3, *Au*4, *Au*5 are connected to the wires *a*, *b*, *c*, *t*.

The outgoing junction 23 comprises, in addition to the wires *a*, *b*, *c*, *t*, a wire *d* connected to the availability earth of the corresponding register finder 55. These wires are connected on the side of the bracket 73 to the multiselector 21 and on the side of the bracket 74 to the corresponding register junction 53.

The outgoing junctions 23 and incoming junctions 22 are connected to a circuit 76 called test and double test circuit of the primary section, intended to verify that the latter is not already seized by a register or rather that it is seized by a single register at a time.

In this circuit, the wire *nfc* coming from the marker is connected on the one hand to the contact *Au*4 by the work contacts *cl*8, *ch*2 and *cvx*25 and on the other hand to the contact *cv*4 by the work contact *cdx*25 (FIG. 4); the wire *bch* coming from the marker is connected on the one hand to the contact *Au*2 by the two windings of the relay ch, the work contacts *cl*10 and *clx*10 in parallel, *cq*1 and *cvx*24, and on the other hand to the contact *cv*2 (FIG. 4).

The circuit 76 comprises six relays l*ct* to 6*ct* with two windings, connected by a decoupling diode and a rest contact *Au*6 to the six wires *d* of the respective six outgoing junctions 23, and on the other hand to battery. The relays 1*ct* to 6*ct* are on the other hand connected, in a manner well known to one skilled in the art, in such a way that one only can be held in series with the relay *cv* connected to the contacts l*ct*1 and 6*ct*1 by the rest contact *cd*6. These latter form a well known priority chain.

This circuit 76 also comprises a relay *cd* called test and double test relay of the primary section and connected on the one hand to a battery and on the other hand to the contact *cv*2 through successive contacts *cdx*22, *cr*1, *ce*1, *cv*1, *ch*1. A resistance is branched in parallel to the relay *cd* through a contact *cd*5. The presence of this resistance allows of obtaining the double test potential on the wire *a*.

A relay *ch* with two windings, intended to indicate the presence of a register and of a marker, has its two windings connected on one side to the contact *ch*1, one directly, the other by the contacts *cl*10 and *clx*10 in parallel, and on the other, respectively to a battery and to the contact *ch*1 through a contact *cg*1. The circuit 76 also comprises two relays *cg* and *cgx* in series. The relay *cg* is called relay of seizure of the primary section by a register finder or a coupler. This relay is connected by a contact *ch*2 through the contact *ce*7 and a set of contacts *cdx*27 and *cvx*27 connected in parallel the contact *ch*2 itself connecting the contact *cv*4 side 68 to a terminal *nfc* intended to be connected to the markers.

The second winding of *cgx* is connected on the one hand to earth by *cgx*1 and on the other hand to a marker relay by *c*16 by the terminal *des* to allow the offer of a communication (well-known characteristic) by an operator.

The circuit 76 contains also a relay *cs* connected to the markers by the wire *ro*. This relay characterizes a calling mobile, without agreement in the zone considered.

To the multiselector 21 and to the incoming junctions 22 and outgoing 23 is associated a circuit 78 intended for the selective control of the electromagnets of the multiselector bars. This circuit comprises four relays 1*ca* to 4*ca* connected on the one hand to battery and on the other hand multipled on the terminal selectors such as shown in FIGS. 13*a* and 13*b*. Decoupling diodes are provided.

The circuit 78 also comprises four relays 1cb to 4cb connected in an exclusion circuit. The relay 1cb is connected between battery through a work contact 1ca3 and to earth through rest contact 2cb1, 3cb1, 4cb1. The relay 2cb is connected on the one hand between battery through the changeover 1cb21 and the work contact 2ca3 and on the other hand to earth by 3cb1 and 4cb1 and so on for 3cb and 4cb.

The work contacts of the changeover contacts 1cb21 and 3cb21 are connected in parallel to the first windings of the relays va of the finder 22 and ua of the incoming junction 23. The winding of va is on the other hand connected by a decoupling diode to the wire b (side 68) by rest contacts vb7 and cv3. The winding of ua is in the same way connected to the wire b (side 74) by a diode ub7 and Au3. The work contacts of the changeovers 2cb21 and 4cb24 are connected in parallel to the first windings of the relays vb and ub. The winding of vb is on the other hand connected to the wire b side 68 by a diode va7 and cv3, while the winding of ub is connected to the wire b side 74 by a diode, ua7 and Au3. The second windings of the relays ua and ub, va and vb are connected to the holding wire t by groups of changeovers ua1 and ub1 and vb1 in exclusion connection. A work contact cs1 is connected in parallel with the contact 4cb24.

The relays 1ca to 4ca are pilot relay of the level markers, while the relays 1cb to 4cb are intended for the connection of the marking wires to the selection electromagnets and to be mutually exclusive.

With the circuit 78 is associated a circuit 79 called verification of the placing of the bars. This circuit comprises a first group of horizontal bar electromagnets: 1B, 2B,...nB, then 13B to 14B, and a second group of horizontal bar electromagnets: 1H, 2H,...nH, then 12H to 14H. Each of the electromagnets 1B...nB is connected to the relay 1ca through one of the contacts 1cb from 2 to n. In the same way, each electromagnet 1H...14H is connected to the relay 2ca through one of the contacts of the group 2cb from 2 to n.

The electromagnets 1B, 1H...14B, 14H are connected to battery through respectively contacts 1B1, 1H1...14B1, 14H1, all these contacts being connected in series. The outputs of the electromagnets 1B, 1H are both connected to battery through a contact cc3. It is the same for each group of electromagnets B and H assigned to the same number. It is thus that the outputs of the electromagnets nB and nH are both connected to the contact line 1B1, 1H1...nB1, nH1, and more precisely between the contact nB1 and the contact (n−1)H1, through a contact ccn.

The contact line 1B1...nH1 is connected by ce5 to a relay cc called relay of presentation of the horizontal bar electromagnets. This relay is connected to earth through four contacts 1ca1 to 4ca1 connected in parallel. The relay cc is moreover connected to battery by a holding contact cc14. The bar electromagnets 12B to 14H are connected on the one hand to battery by the contacts 1 to 4 cb22 and cs4 and on the other hand to the wires v towards the radio channel circuits, electromechanical part 24a.

The primary section shown in FIG. 4, also comprises a circuit 80 called bar locking circuit. This circuit 80 comprises a relay ce which is intended to confirm the placing of a horizontal bar. This relay has two windings and has one of these connected on one side to battery and on the other to earth through a group of contacts 1B3, 1H3, 2B3,...nH3 and cd3 connected in parallel. The other winding of this relay is connected, on the one side to battery and on the other through a contact ce4 and contacts cl, clx and cv6 to earth.

The output of the first winding of the relay ce is connected to a terminal SP of the output of the primary section, marker side, through a contact cc1 and a connection contact cl9 towards the marker; this output is also connected to the output Spx towards the marker by a well known control circuit of the bars 12B to 14H and a contact cl11.

The primary section comprises also a circuit 83 called circuit of availability of the radio channels. This circuit comprises essentially a relay ci which is intended to indicate that there is at least one radio channel not busy. This relay is connected on the one hand to battery and on the other hand to an output terminal i of the primary section, this terminal being multiplied on the different radio channel circuits.

With the test and double test circuit 76 is associated a circuit 84 called pilotage call circuit of the radio channels. This circuit comprises a relay cr called call relay of the primary section for an outgoing call. This relay cr is connected on one side to battery and on the other to a terminal P outgoing from the primary section on the radio channel side through successive contacts ce6, ch6, cd1 and the rest contact cvx22 or the contact co7 in parallel. The terminal P is multipled on the radio channel circuits. A relay cv intended to indicate that the primary section can serve an outgoing call is connected on one side to battery and on the other to the contacts 1ct to 6ct of the circuit 76.

The circuit 84 moreover comprises a relay cy which is an auxiliary of cv. The relay cy is connected on one side to a battery 77. This battery, like all those bearing the reference 77 is furnished by the connection contacts of the markers. To simplify the drawing, they have been shown directly but denoted by the same reference 77. On the other side the relay cv is connected to earth by the contacts cv2 and cr2.

The primary section comprises also a circuit 85 called seizure control circuit of the marker. The circuit 85 is made up of contacts controlled by relays found in the primary section and intended to apply earths on to certain marker circuits when the relays cl or clx (this latter not shown), each corresponding to a marker among the two possible, is energized. cl and clx are mutually excluded by cl1 and clx1.

Circuit 85 comprises mainly: a contact cv4 inserted between earth and a terminal PA of the marker by cl3, a contact ch5 inserted between earth and a terminal PE of the marker by cl4 and a contact cg4 inserted between earth and one end of cl2. The terminal PRP is connected to the relay cl. The contact clx1 is on the one hand connected to cg2 and on the other hand to earth by cl2 and ch3. A terminal PV is connected to earth by the contacts cvx28 and cdx28 in parallel. The incoming junction circuit 22 lastly contains a relay vc which registers the acknowledgement of receipt of the thousands digit by the marker and a relay vd which changes over by these changeovers vd21 to vd24 the 4c wires provided for subscribers without local contract towards the normal c wire (side 68). The relay vc is connected on the one hand to battery and on the other hand to the input of the first winding of the relay vd and to the contact 1/9PX1/6 of the relay PX corresponding to the incoming junction 22. The output of the first winding of the relay vd is connected to earth by a work contact cd3, a well known verification circuit vc indicating that there is only one relay vc energized and a work contact vc8. The first winding of vd is connected on the one hand to battery and on the other hand to the wire c (side 68) by its own work contact vd26.

As is shown in FIGS. 6a and 6b, the marker comprises a circuit 69 called circuit of receipt of the thousands and three identical circuits 86, 87 and 88, called circuits of receipt from the connector bundle 42 and of registering the indication of the mobile subscriber in the "two out of five" code.

The circuit 69 comprises a decoder 106 which receives on four wires the binary code information concerning the thousands of the calling mobile subscriber coming from the radio channel circuits by the relays za to zd. This decoder puts an earth at its output on one wire out of 10 representing the thousands. Ten relays olm to 9lm are connected to these wires of which one, xlm comprised between 0 and 9 is chosen to designate the thousand of the local subscribers, the others designating those of wandering subscribers. The relay xlm is connected to earth by the rest contact of the changeover mu5 and a contact chain olm10 to 9lm10 (xlm10 being excluded). The relays olm to 9lm carry two windings one of which is connected directly to the decoder and the other to battery by a rest contact xlm10. On the other hand the two windings are connected in parallel to terminal mx towards the primary section.

The circuit 86 is intended more particularly for the reception and the registering of the hundreds digit of this indication, while the circuits 87 and 88 are intended for the reception and registering, of the tens and units digits respectively of this indication. The circuit 86 will alone be described by way of example.

Circuit 86 comprises five wires carrying the indices 0, 1, 2, 4 and 7 connected to the connector bundle 42. These wires are respectively connected to relays *mx*1, *mx*2, *mx*3, *mx*4 and *mx*5. They are moreover connected through the respective contacts *mx*1–7, *mx*2–7, *mx*3–7, *mx*4–7, *mx*5–7 and through a resistance 89 to the general earth terminal 90 of the marker.

With the wires 0, 1, 2, 4, 7 are respectively associated wires 0′, 1′, 2′, 4′, 7′ connected to the wires 0, 1, 2, 4, 7 through respective contacts *dhx*2, *dhx*3, *dhx*4, *dhx*5 and *dhx*6.

The wire 1′ is connected to the general marker terminal 90 through successive contacts *cd*4, *cb*1, *ca*1 and *cc*1. The wire 1′ is also connected to the contact *ca*1 which acts as changeover through another changeover carrying the reference *cd*2. The wire 0′ is connected to the contact *cb*1 acting as changeover through successive changeover contacts *ca*2, *cb*2 and contact *cd*6. The wire 0′ is also connected to the general terminal 90 through successive contact *ca*5 and the changeovers *cc*2, *cb*3 and *cd*3.

The wire 1′ is connected to changeover contacts *ca*2 through a contact *cb*5. The wire 2′ is also connected to the changeover contacts *cb*3 through two contacts *ca*4 and *ac*5 connected in parallel. The wire 4′ is connected to the changeover contacts *cb*2 through changeover contacts *ca*3 themselves connected to the wire 0′. The wire 4′ is also connected to the changeover contacts *cc*2. The wire 7′ is connected to the changeover *cd*3 through successively a changeover *cc*3 connected to the contact *ca*4 acting as changeover, and through two contacts *ca*7 and *cb*6 connected in parallel.

At the output of the circuit 86 on the side of the connector bundle 42 contacts *dh*2, *dh*3, *dh*4, *dh*5, *dh*6 are inserted respectively in the wires 0, 1, 2, 4, 7.

With the circuit 86 is associated a circuit 91 to give the indication of the category of the call considered. This circuit 91 comprises essentially a distributor shown schematically by its input terminals 92 and its output terminals 93. The output terminals 93 are connected to the wires 0, 1, 2, 4, 7 of the circuit 86, side of the connector bundle 42 through respective contacts *dj*2 to *dj*6 on the one hand and *di*2 to *di*6 on the other hand. The input terminals of the distributor are connected to earth through respectively the third and fourth contacts of the relay 1 to 5*dp*. In the same way the terminals 92 are connected to the first, second, third and fourth contacts of the relays 1 to 10*da*.

The marker comprises a circuit 94 called circuit of verification of the "two out of five" code. This circuit is essentially composed of four cells 70, 95*a*, 95*b* and 95*c* of usual type, intended respectively to verify the code of the thousands digit of the mobile subscriber's number delivered by the circuit 69, the hundreds of the mobile subscriber's number delivered by the circuit 86, the tens digit of the said number delivered by the circuit 87, and the units digit of the number delivered by the circuit 88. The cells 70, 95*a*, 95*b* and 95*c* are connected in series between the general terminal 90 and a relay *df* called relay of verification of the "two out of five" code of the number of the mobile, this relay being connected to battery. Two contacts *df*3 and *mg*22 connected in parallel and a contact *mo* in series are inserted between the relay *df* and the cell 95*c*. For practical necessities the relay *df* comprises an auxiliary *dfx* connected on the one hand to battery and on the other hand to the general terminal 90 through a contact *df*4.

In the embodiment example of the radiotelephone network considered the transmission of the signals to the mobile subscribers is carried out according to a binary code. Thus, the marker comprises a circuit 98 intended to transform the "two out of five" code of the mobile subscriber's number into a binary code. This circuit 98 is essentially made up of four identical cells 98*a*, 98*b*, 98*c*, 98*d*, intended to carry out the translation respectively of the thousands digit, of the hundreds digit, of the tens digit and of the units digit of the mobile subscriber's number.

The cell 98*a* comprises a decimal binary translator 96 made up in known manner of the contacts of the relays 0*lm* to 9*lm* and which translates the identity of the thousands into binary code for the radio channels. The terminals LE1 to LE4 transmit this binary code to the radio channels.

The cell 98*b* consists of a translator 97*a* of the "two out of five" code into binary code, made up of contacts of the relays 1*mx* to 5*mx* and the output terminals LE5 to LE8. In the same way the cell 98*c* comprises a translator 97*b* and output terminals LE9 to LE12 and the cell 98*d* comprises a translator 97*c* and the output terminals LE13 to LE16. These output terminals LE1, LE2...LE16 are multipled on all the radio channel circuits.

The input terminals of the cells 98*a*, 98*b*, 98*c*, 98*d* are all connected to a general output terminal LE*x*. The circuit 98 lastly comprises a contact *dfx*16 connected on the one hand to earth and on the other hand to an output terminal TF also multipled on all the radio channel circuits.

The marker comprises a circuit 99 called transmission circuit of the signals towards the connector bundle 42. This circuit essentially comprises four wires 0, 2, 4, 7. The wire 0 is connected to earth through a contact *dk*1. This wire characterizes the sending to the coupler of the indication of a first seizure of the connector bundle. The wire 2 is connected to a contact *mg*21 by *df*3 and characterizes the sending of the busy indication. The wire 4 is connected to the general terminal 90 through successively a contact *dk*3 and a contact *dl*1. The wire 4 characterizes the receipt of the indication that the first seizure of the connector bundle has been carried out. The relay *dk* is intended to prepare the marker for a second seizure of the connector bundle in the case of an incoming call. The common terminal of the contacts *dk*3 and *dl*1 is connected to a relay *dl*, itself connected to battery. The relay *dl* is intended to register the fact that the connector bundle has already been taken once in the case of an incoming call. The wire 7 can be connected to one of the contacts 1/5 *dp*2 directly or through a resistance to furnish to the register the indication of the quality of the mobile subscriber reached.

The outputs of the circuits 99, 86, 87 and 88 form, respectively bundles of wires A, B, C, D, which are connected directly to the connector bundle 42. The choice of the connector bundle is carried out by a circuit 100 made up of changeover *mu*1 connected in series with a contact *mc*3 between battery and a terminal F1 connected to the connector bundle. The circuit 100 comprises a second terminal F2 connected to the connector bundle and also to the changeover *mu*1.

The seizure of the connector bundle is carried out by a circuit 101 connected to the terminal PE of the primary section and essentially made up of a relay *mc* called seizure relay of the connector bundle. This relay *mc* is connected on one side to battery and on the other to a changeover *df*1. The latter is connected to the terminal PE through a changeover *mu*27 and two contacts *mpx*5 and *mk*2, or through *mg*24 or lastly through 1/5 *dp*1.

The marker comprises a circuit 102 intended for control of the receipt from the connector bundle of the number of the called mobile subscriber. This circuit comprises a relay *dh* called connection relay of the groups of wires B, C, D, towards the connector bundle for the receipt of the indication of the called mobile subscriber in "two out of five" code. This relay is connected to the general terminal 90 of the marker through successive contacts *dk*4, *dm*1 and a changeover *mu*23.

Circuit 102 comprises a relay *dk* called connection relay of the group of wires B towards the connector bundle for the sending of the category of the mobile. This relay is connected to the general terminal 90 through successively contact *dm*3, relays *di* or *dj* and contacts *mu*25 and *dh*1.

Circuit 102 comprises lastly a third relay *dhx*, connected through a contact *df*7 to the changeover *mu*23.

The seizure of the marker is carried out by a circuit 103 connected to the terminal PRP of the primary section and essentially made up of a relay mn with two windings. One of these windings is connected on the one side to the terminal PRP and on the other to battery, while the other winding has its two terminals connected to a contact *mn*3.

In the case of an outgoing call the indication of the seizure of the marker is carried out by a circuit 104 essentially made up of a relay *mu* with two windings. One of these windings is connected on one side to battery, and on the other to the terminal PA of the primary section. The other winding is connected on one side to battery and on the other to the general terminal 90 through a contact *mu*27. The general terminal 90 is also connected to earth through a contact *mn*1.

The marker comprises a circuit 105 which characterizes the connection to a radio channel circuit. This connection is more particularly characterized by a relay *mt* branched between battery and an output terminal of the marker, on the side of the radio channel, this terminal being connected more particularly to the circuit for choosing the radio channel as FIG. 7*b* shows.

A contact *mf*5 is inserted between earth and a terminal VT which allows the energization of a radio channel selector. Another contact *mf*1 is inserted between earth and a terminal MT which allows the holding in connection of the radio channel circuit after the setting of a horizontal bar of the selector of the primary section. A changeover *mt*1 is inserted between battery and a terminal CHT which characterizes the availability of the marker. A relay *do* is inserted between battery and a terminal DO. This relay indicates in the case of an incoming call the seizure of the radio channel circuit marked "available" by an outgoing call.

The circuit 105 also comprises a relay *mq* intended to indicate the busy state of all the radio channel circuits. This relay has two windings. One of the windings is connected on one side to battery through a resistance, and on the other side to the general terminal 90 of the marker through a contact *mox*22. The other winding is connected on one side to the changeover *mt*1 and on the other to the contact *mox*22. The general terminal 90 of the marker is connected to an output terminal LE through successively a contact *df*2 and a contact *mu*26. The terminal LE characterizes the call of the radio channel circuit for an incoming call.

The common terminal of the contacts *df*2 and *mu*26 is connected to the common terminal of the relay *mq* and the resistance through successively a contact *mu*28, another contact *do*1 and a manual interrupter J22. The output terminal LA is connected to the general earth terminal 90 through a contact *mu*25. The terminal LA characterizes the call of the radio channel for an outgoing call.

The terminals MT, CHT, VT, MA and DO are multiplied on all the radio channel circuits, while the output terminal PRT of the marker is single and is intended to be connected to an input terminal PRT of a radio channel circuit according to a process which will be indicated later.

The receipt of the coded indication of a calling mobile subscriber is carried out through a circuit 108. This circuit comprises four groups of relays connected on one side to battery and on the other to the output terminals. The first group comprises relays *Za*, *Zb*, *Zc*, *Zd*, connected respectively to output terminals LA1, LA2, LA3, LA4. This first group of relays is intended to receive and to register the thousands digit of the calling subscriber's number. This connection is repeated three times with the relays *ca* to *cd*, *da* to *dd* and *ua* to *ud* for the hundreds, tens and units digits.

The marker comprises a circuit 109 intended to note the receipt of the "acknowledgement of receipt" from the mobile subscriber by the radio channel circuit. This circuit essentially comprises a relay *mpx* with two windings. One of these windings is connected on one side to battery and on the other to the terminal common to contacts *df*2 and *mu*26 through a contact *mpx*7. The other winding is connected on one side to battery and on the other to a output terminal MP through a contact *df*5, this terminal MP being multipled on the radio channel circuits.

The marker also comprises a circuit 110 essentially in service when the wanted mobile subscriber does not reply. This circuit 110 essentially comprises a relay *mox* intended to control the timing of the wait for the "acknowledgement of receipt" by a radio channel circuit. This relay is connected on one side to battery and on the other side, on the one hand to earth through contacts *mpx*1, *df*8, *mt*3 and a manual interrupter J31, the contacts *mp*1, *df*8, *mt*3 and the manual interrupter J31 being connected in parallel and on the other hand to battery through a resistance 107 and a condenser 125 connected in series.

In the circuit 110 there is also found the relay *mo* of availability of the mobile subscriber concerned. It is connected between the general earth 90 and battery through a resistance. It can be short-circuited by a chain of contacts 1*dp*1 to 5*dp*1, *de*1, *mp*1 and *dk*7.

The marker comprises lastly a circuit 111 intended to control the setting of a horizontal bar of the multiselector of the primary section. This circuit 111 essentially comprises a relay *mm* connected on one side to a terminal SP of the primary section and on the other to battery. This circuit also comprises relay MK between a terminal SPX and battery and six contacts *me*33 and 1/5 *dp*5 between earth and terminal RO, positive battery and terminal BCH respectively.

This circuit 111 comprises lastly a relay *de* with two windings indicating to the marker that the call is sent by an operator and that the latter wishes to listen in on a busy subscriber. The first winding of the relay *de* is connected between battery and a terminal *des* of the primary section; the second winding is connected on the one hand to battery and on the other hand to the general earth terminal 90 by a work contact *de*3.

The marker also comprises a terminal MFC, on the side of the primary section, connected to a terminal IF on the side of the connector bundle, which characterizes the identification of the connector bundle channel chosen. The connection between the terminals MFC and IF is carried out through a contact *mc*1.

The marker comprises another circuit 362 of marking the subscriber line circuits. In this circuit, the relays 0*mv* to 14*mv* are connected on one side to battery and on the other to a first set of contacts of thousands relays 0*lm* to 9*lm*, then to a second set of contacts 3 to 6 of the hundreds relays 1*mx* to 5*mx*, the two sets being connected in known manner so that each relay *mv* designates one hundred used among 15 hundred line circuits. On the other hand, a relay *mvx* is connected between battery and the first said set in such a manner as to be energized when the number received forms part of an unused hundred.

The relays 0*mw* to 149*mw* are connected between battery by a third set of contacts *mv* to a fourth set made up of contacts of tens relays 1*my* to 5*my*. Each relay *mw* represents a ten of the line circuits.

The 1500 terminals COX are connected to a fifth set of contacts of the relays *mw* and to sixth set of contacts of the units relays 1*mz* to 5*mz*. To the 1500 terminals COX there can correspond 1500 line circuits. A distributor 364 allows the terminals COX to be connected to the terminals CO which correspond to effectively equipped line circuits. Moreover, terminals COX not connected to CO are connected to 5 terminals REN. A terminal *mvy* allows a contact *mvx*2 to be connected to one of the terminals REN. The terminals REN are connected to the 5 relays 1*dp* to 5*dp* which characterize the operator's tables towards which are sent calls for numbers not equipped in the exchange.

The terminals CO are connected to the line circuits 363.

A circuit 365 of category of call comprises relays 1*da* to 10*da* connected between earth and the category terminals CAT. A contact *de*2 is connected between battery and a terminal TZ. The circuit 365 comprises also a relay *mp* indicating the availability of the marked level of the terminal section.

This relay is connected on the one side to earth and on the other to a terminal OC by a contact *dk*2. The circuit 365 comprises also a relay *mf* indicating the end of the terminal selection. This relay is connected on one side to a terminal S*t* and on the other side to a group of 3 contacts. The first of these contacts *mm*4 is connected to battery, the two others, *de*4 and *mf*2 are connected in series, the contact *mf*2 itself being connected to battery.

The embodiment example of the electromechanical part of the radio channel circuit shown in FIGS. 7*a* and 7*b*, can be directly connected to the primary section and to the marker which have just been described. In this embodiment example the termination 26 appears which allows of carrying out the passage from two wires to four wires. The termination is connected on one side to the wires *a* and *b* of the primary section which constitutes the two wires connection and on the other side to the electronic part of the radio channel circuit through a couple of wires EM1 and EM2 for sending towards the radio channel and another couple of wires RE1 and RE2 for receipt from the radio channel.

The termination 26 is moreover connected to a balancing circuit 112, through two wires symmetrical with the wires *a* and *b*. The connection of the termination 26 to the wire *a* is realized through successively a condenser 113 and contacts *mfx*1, *rh*22, *mg*2 and *vax* or *vbx*2. In the same way the connection of the termination 26 to the wire *b* is realized through successively a condenser 114, identical to the condenser 113, and contacts *mfx*2, *rh*21, *mg*3 and *vax* or *vbx*3.

The radio channel circuit is connected to the primary section by means of a circuit 115. This circuit comprises a relay *tt* called holding relay and connected on one side to battery and on the other to the wire *t* of the multiselector of the primary section by a contact *vax* or *vbx*5. The terminal *d* is connected by contacts *vax* or *vbx*4 connected in series with a work contact *sr*5 and a rest contact *vax*1 to a generator of meter impulses. The terminal *d* is moreover connected to battery by a resistance and a rest contact *rl*2. It is well understood that the generator 127 can be common to the whole installation.

The unoccupation of the radio channel circuit and thus its availability is characterized by two contacts *ra*3 and *tl*1 connected in series and connecting earth to the terminal *i* of the primary section. The start of the seeking of the primary section by the radio channel circuit is characterized by two contacts *lp*4 and *ttx*1 connected in series and connected on one side to earth and on the other to the terminal P of the primary section.

The indication of the order of connection to the high or low part of the horizontal bar of the primary section involved is given by the relays *vax* or *vbx* connected on the one hand to the wire *vax* or to the wire *vbx* and on the other hand to a cell with contacts *vax*7 or *vbx*7 connected in exclusion, contacts *vax*6 and *vbx*6 connected in parallel and the wire *v* towards the electromagnet of the horizontal bar of the primary section to battery.

The order for energization of the multiselector of the primary section is transmitted to the wire *v* of the primary section through a contact *vax*6 or *vbx*6 from the terminal VT of the marker which is found in the circuit 116 of connection of the radio channel circuit to the marker. This connection circuit comprises a relay *to* called marker call relay. This relay shows two windings of which one is connected on one side to the terminal CHT and on the other side to earth through a contact *tm*2. The other winding of the relay *to* is connected on one side to a changeover *to* 1 and on the other side to the contact *tm*2 through a relay *tn* called marker connection relay. The outputs of the two windings of the relay *to* are connected on the side of the contact *tm*2 by a resistance 117. The contact *tm*2 is, besides, connected to the terminal MT of the marker, which characterizes the holding of the radio channel, through a contact *tn*1.

The changeover *to*1 is connected to the terminal PRT of the marker, this terminal characterizing the availability of the marker. This connection is more precisely carried out by means of a circuit 118 called circuit of choice of the radio channel circuit. This circuit shows the terminal PRT of the marker connected to the terminal PRT*a* of the radio channel circuit 24*a*. The terminal PRT*a* is connected to the moving contact of the changeover *to*1 *a*. For the position shown in the figure, the moving contact of the changeover *to*1 *a* is connected to a terminal AS*a* whilst in the other position the moving contact is connected to the corresponding relay *to*. Besides, the moving contact is connected to an input terminal AE*a* opposite the output terminal AS*a*.

Each radio channel circuit comprises the elementary circuit that has just been described. The different elementary circuits are connected in series by connecting the output terminal AS of one radio channel circuit to the input terminal AE of the following radio channel circuit. Thus the output terminal AS*a* of the radio channel circuit 24*a* is connected to the input terminal AE*b* of the radio channel circuit 24*b* and so on up to the radio channel circuit 24*n* the output terminal AS*n* of which is connected to the input terminal AE*a* of the radio channel circuit 24*a*.

As soon as one of the relays *to* of the radio channel circuits is energized the moving contact of the corresponding changeover *to*1 passes from the position shown in the figure to the other position, which establishes the metallic connection between the terminal PRT of the marker and the relay *to* considered. Thus, if the relay *to* of the radio channel circuit 24*a* is first energized the terminal PRT of the marker is connected to this relay *to* through the terminal PRT*a* and the changeover *to*1*a*. On the other hand, if it is the relay *to* of the radio channel circuit 24*b* which has been first energized, the metallic connection between the marker terminal PRT and the relay *to* considered is established through the terminal PRT*a*, the changeover *to*1*a*, the terminal AS*a*, the terminal AS*b* and the changeover *to*1*d* which is in work position.

The transfer of the coded number of the mobile subscriber involved in the call is effected by means of a circuit 119. This circuit comprises a relay *tm* connected on one side to battery and on the other to the terminal LE of the markers through successive changeovers *lp*1, *fg*4, contact *vd*2 and the changeover *tm*5, the common terminal of the changeovers *lp*1 and *fg*4 being connected to the changeover *tm*5. In addition, the changeover *lp*1 is connected to the terminal LA of the marker through a contact *ttx*5, whilst the changeover *fg*4 is connected to the terminal DO of the marker, this terminal characterizing the wait for a radio channel.

Two contacts *fg*6 and *tn*3 are connected in series between earth and the terminal MP of the marker, this terminal characterizing the receipt of the "acknowledgement of receipt" from the mobile.

The circuit 119 also comprises a group of wires connected to the terminals LA from 1 to 16 of the marker for the transmission of the coded indicative of the mobile subscriber from the radio channel towards the marker. The circuit 119 comprises a second group of wires connected to the terminals LE from 1 to 16 of the marker and intended for the transmission of the coded indicative of the mobile subscriber involved in the call from the marker towards the radio channel. With this second group of wires is associated another wire connected to the terminal LEX of the marker.

The circuit 119 lastly comprises a relay *tf* called relay of verification and of transmission of the coded indicative by the marker. This relay is connected on one side to battery and on the other to the terminal TF of the marker through a contact *tm*4.

These two groups of wires of the circuit 119 are directed towards the electronic part of the radio channel circuit through a circuit 120 of control of sending signalling towards the radio channel. Each wire coming from the circuit 119 is connected to a corresponding terminal of the electronic part of the radio channel circuit, through a contact *tn* the index of which is comprised between 5 and 37, according to the rank of the wire considered.

The circuit 120 comprises different other output terminals intended to apply earths to different elements of the electronic part of the radio channel circuit for their control. Thus a changeover *t*1 is connected in series with two contacts *vd*1 and *lp*6 between earth and a terminal FI of the said electronic part, this terminal corresponding to the control of the oscillator intended to deliver the service frequency also called frequency of availability. The changeover *tf*1 is also connected to a terminal LEO of the electronic part, this terminal corresponding to the position of called mobile. Two contacts *lp*24 and *tt*6 are connected in series between earth and a terminal LAO of the said electronic part, this terminal corresponding to the position of calling mobile.

A contact *ar*22 is connected between earth and a terminal AR of the said electronic part, this terminal characterizing the waiting for reply. Two contacts *ar*23 and *ac*3 are connected in series between earth and a terminal CS of the said electronic part, this terminal corresponding to the control of ringing cadence. A contact *ttx*3 connects earth to a terminal TT of the electronic part, this terminal characterizing the establishment of the connection between subscribers. A contact *sc*6 connects earth to the terminal SR.

The electromechanical part of the radio channel circuit shown in FIG. 7*b* comprises a circuit 121 intended for the receipt of the signalling from the electronic part of the radio channel. This circuit 121 comprises a relay *fg* controlled by the detector of the guard frequency, a relay *fc* controlled by the detector of the connection frequency and a relay *ra* controlled by the detector of the signal of replacement of the hand set, these three detectors being situated in the electronic part of the radio channel circuit. The circuit 121 also comprises a relay *fgx* which is an auxiliary relay of the relay *fg* and which is connected on one side to battery and on the other to earth through a contact *fgx*1, the output terminals of the relay *fgx* being connected to a changeover *fg*1, itself connected to earth. Moreover, a relay *r*1 connected on the one side to battery and on the other, for its energization to the contact *ra*1 and for its holding by a contact *rl*3 to the contacts *lp*22, *mg*23, *sr*2, *tt*23 and *ar*24 in parallel.

The electromechanical part of the radio channel circuit shown in FIG. 7*b*, comprises a circuit 122 intended for the marking of the phases of establishment of the communication. This circuit 122 comprises a relay *lp* characterizing the calling mobile. This relay is connected on one side to battery and on the other to a general terminal 122*a*, on the one hand through a contact *lp*3 and on the other through contacts *fgx*3, *fg*7, *fc*4 connected in series.

The circuit 122 comprises a relay *ar* called relay for waiting for the reply of the mobile. This relay is connected on one side to battery through a resistance and on the other to the terminal 122*a* through two contacts *mg*25 and *tt*5, the output terminals of the relay *ar* being shunted through a contact *fc*2.

The circuit 122 comprises a relay *mgc* intended to indicate that the mobile has lifted the handset. This relay is connected on one side to battery and on the other to the terminal 122*a* through, on the one hand, a contact *mg*22 and on the other hand through contacts *lp*23, *fc*3 and *ar*21 connected in series, a contact *tt*26 being connected to the terminals of the contact *lp*23. The circuit 122 comprises a relay *ttx* which is an auxiliary of the relays *tt* and *mg*. This relay is connected on one side to battery and on the other to a contact *mg*4 through, on the one hand, a contact *tt*22 and on the other hand, through a contact *ttx*2 connected in series with a relay *fa* called combination relay of lack of a radio channel. The contact *mg*4 is connected to the terminal 122*a*, itself connected to earth through a contact *ra*2.

The electromechanical part of the radio channel circuit comprises also a circuit 123 called simulation circuit of the subscriber's station. The circuit 123 comprises a relay *ac* called relay of rythmic ringing. This relay is connected to a diagonal of a rectifier bridge 124 the other diagonal of which is connected on the one hand to the wire *b*, side of the primary section and on the other hand to the wire *a*, primary section side, through a changeover *mg*1 in series with a condenser 128.

The changeover *mg*1 is connected to the common terminal of the contacts *mg*2 and *rh*22 through a resistance 126 connected in series with a contact *fc*1.

A relay *mf* called loop relay towards the exchange, comprises two windings. One of the windings is connected on one side to the common terminals of the contacts *mg*3 and *rh*21 and on the other, on the one hand to the changeover *rh*21 by a rectifier cell and on the other hand to the common terminal of the resistance 126 and the contact *fc*1 through a resistance 129 and a contact *sr*4. Bridged between the output of the first winding of the relay *mf* and the contact *sc*4 on the one hand and the work contact of the changeover *rh*21 on the other hand, is connected a relay *sx* in series with a rectifier cell wired in opposite direction to the cell previously mentioned.

The other winding of the relay *mf* has its terminals shunted through a contact *mf*22.

The circuit 123 comprises a relay *ad* connected on the one side to battery and on the other to earth through successively contacts *ac*2, *mg*5 and *tt*24, a contact *ad*22 being connected to the terminals of the contact *ac*2. A relay *mfx* which is an auxiliary of the relay *mf* in order to ensure the continuity of the speech circuit is connected on one side to battery and on the other to the common terminal of the contacts *tt*24 and *mg*5 through contacts *ac*1, *mf*1 and *rh*24.

The circuit 123 comprises a relay *sr* called reply relay and auxiliary of *sx*. It is connected between battery on the one hand and on the other hand earth through contacts *sx*1, *tt*5 and *rl*1. A contact *sr*3 is bridged across contacts *sx*1 and *tt*5.

Circuit 123 comprises a relay *rh* called relay in course of the numbering phase. This relay is connected on one side to earth through a contact *tt*2, and on the other, through a changeover *fg*3 on one hand to battery and on the other hand to earth. The circuit 123 lastly comprises a relay *t*1 called guard relay and connected on one side to battery and on the other to earth through contacts *rl*4, *mg*21, *lp*21, *tt*1 and *tf*2, these contacts being connected in parallel.

The electromechanical part of the radio channel circuit comprises a circuit 130 combination circuit of lack of a radio channel. This circuit comprises essentially a generator 131 intended to deliver a busy tone, radio channel side. This generator 131 is connected on one side to the changeover *mfx*1 through a contact *fa*1 and on the other side to a changeover *mfx*2 through a contact *fa*2, the homologous terminals of the changeovers *mfx*1 and *mfx*2 being connected by a resistance 132.

The electromechanical part of the radio channel circuit shown in FIG. 7*b* comprises lastly a circuit 133 intended for control and advancing of the distributor 40.

This circuit 133 comprises a relay *vd* called relay of channel marked available or in service. This relay is connected on one side to battery and on the other side to a terminal VD of the distributor 40 through a manual interrupter J2. A contact *tl*2 connects earth to a terminal VO of the distributor, this terminal allowing the indication of busy channel. A contact *vd*3 connects earth to a terminal VE of the distributor which allows the indication of reply of the channel marked "in service."

An embodiment example of service channel of available channel distributor is shown in FIGS. 9*a* and 9*b*.

By way of example and to illustrate the invention, the distributor is arranged for a radio telephone network comprising eight radio channels, this number being well understood as in no way limiting.

The distributor comprises a circuit 134 intended to effect, amongst the radio channels of the network, the choice of the future radio channel which will serve the call following the call in process.

The circuit 134 comprises relays *dv* called position relays of the distributor the number of these relays being equal to the number of radio channels of the network. Each relay *dv* comprises three windings. Thus the relay *dv*1 assigned to the first radio channel has its first winding connected to earth successively through, a manual changeover J1—1, and automatic changeovers *dj*1—1, *du*2 and *du*3 connected in series. The second winding of the relay *dv*1 is connected to the common terminal of the changeovers *du*2 and *dw*3 through a contact *dv*4–1. The third winding of the relay *dv*1 is connected to earth through successively changeovers *dv*3–2, *dv*3—3, etc... *dv*3–8 and the contact *dw*4, these changeovers and this contact being connected in series.

The relay *dv*2 comprises, like the relay *dv*1, three windings connected in the same manner as are those of the relay *dv*1, a changeover *dv*2—2 being the homologous of the changeover *dw*2. It is the same for each of the relays *dv* of the circuit 134, the references of the changeovers being deduced from those of their homologous corresponding to the preceding relays, by increasing the said references by one unit.

At the end of the chain, the changeover *dv*2–8 is connected on the one hand to the common terminal of the changeovers *dj*1—1 and *dw*2, and on the other hand to a winding of the relay *dw*. This relay is called relay of return to zero and comprises a second winding connected to the changeover *dw*3 through a contact *dw*1. The common terminal of the contacts *dw*1 and the changeover *dw*3 is connected to earth through contacts *di*1, *dk*3 and *dt*21 connected in series.

The distributor comprises a memory circuit 135 to mark the busy or unavailable radio channels. This circuit 135 comprises relays *dj* called busy or blocking channel relays. These relays are in number equal to the number of radio channels and are connected respectively to the terminals VO of the radio channel circuits. If the network is equipped with eight radio channels these relays are eight in number.

The circuit 135 comprises a relay *di* intended to indicate that a channel is marked in service. This relay *di* is multiplied on the terminals VE of the radio channel circuits.

The circuit 135 comprises contacts *dj*3–1, *dj*3–2, etc.. *dj*3–8 connected respectively on one side to changeovers *dv*1—1, *dv*1–2, etc...*dv*1–8 and on the other side to terminals VD1, VD2, etc...VD8. The changeovers *dv*1—1, *dv*1–2, etc...*dv*1–8 are connected in series with a changeover *dk*2, itself connected to earth. The terminals VD are connected to the respective terminals VD of the radio channel circuits and are intended for the marking of the service radio channel.

The changeover *dk*2 is connected through a terminal OQT to a signalling device not shown, which can be a simple lamp for example. This device is intended to indicate the total busy condition of the radio channels.

The distributor comprises a circuit 136 called timing circuit of the signal of receipt of availability. This circuit 136 comprises a relay *dt* connected on one side to earth and on the other to battery through a resistance 137. The common terminal of the relay *dt* and the resistance 137 is connected to earth successively through a manual interrupter J1, contacts *di*3, *dk*1 and a changeover *ds*1. The circuit 136 comprises another relay carrying the reference *ds* and called relay of stopping timing. This relay is connected on one side to battery through the resistance 138 and on the other to the changeover *ds*1. The output terminals of the relay *ds* are connected through a changeover *dt*22, itself connected to earth.

The distributor comprises also a circuit 139 intended to indicate the total busy condition of the channels. This circuit 139 comprises a relay *dk* connected on one side to battery and on the other to earth through on the one hand contacts *dj*2–1, *dj*2—2, etc...*dj*2–8 connected in series. The common terminal of two adjacent contacts is connected to the common terminal of the two adjacent manual interrupters carrying the same indices.

The electronic part of a radio channel circuit is shown in FIGS. 8*a* and 8*b*. This electronic part is none other than one of the parts 27 shown in FIG. 1*a*.

This electronic part comprises a counter 140 intended to register the coded indication of the called mobile subscriber. To this end, the counter 140 is connected to the wires LE1, LE2, LE3 etc...LE16 and LEX coming from the electromechanical part corresponding to the radio channel circuit considered. The counter 140 comprises a first connection 141 with a separator circuit 142, a second connection 143 with a delay circuit 144 constituted by a simple flip-flop of the monostable type, and a third connection 145 with an oscillator 146 capable of delivering pulses at very low frequency: 20 cycles per second.

The oscillator 146 is connected to a register 147 through a circuit 148 essentially made up of an AND gate which delivers pulses at the frequency of the coded number, solely during the continuance of this number. To this end, the circuit 148 comprises a connection 149 with an output 150 of the delay circuit 144.

The register 147 is intended to place into memory the coded number of the mobile subscriber when the latter is calling. To this end the register 147 is connected to the electromechanical part of the radio channel circuit by the wires LA1, LA2, LA3 etc...LA16.

The register 147, which is essentially made up of a shift register, is started by a flip-flop 151 with two inputs and two outputs. The two inputs of the flip-flop 151 are connected respectively to two identical circuits 152 and 153. The circuit 152 is intended to detect the guard frequency which has in the example considered the value of 2150 cycles per second, and delivers a continuous voltage which allows the flip-flop 151 to be polarized in one direction. Simultaneously, this voltage controls the relay *fg* situated in the electromechanical part of the radio channel circuit, FIG. 1*a*.

The circuit 153 is intended to detect the connection frequency which in the example considered has the value of 1633 cycles per second and delivers a continuous voltage which allows the flip-flop 151 to be polarized in the other direction and simultaneously the relay *fc* situated in the electromechanical part of the said radio channel circuit to be controlled.

The two inputs of the flip-flop 151 are controlled by the rest contacts SR*x*1 and SR*x*2 of a relay SR*x*. The winding of this relay is itself connected on the one hand to battery and on the other hand to a terminal SR of the electromechanical part of the radio channel.

The two outputs of the flip-flop 151 are connected to a set of gates 154 intended to start a delay circuit 155 which is none other than a flip-flop of the monostable type.

The set 154 comprises a third input which is connected to the terminal FI of the circuit 120 (FIG. 1*a*), this input being capable of transmitting information of the blocking of the gates 154.

With the detection circuits 152 and 153 is associated a third detection circuit 323 which is intended to detect the signal of replacement of the handset and to control the relay *ra* of the circuit 121, FIG. 7*b* in order to free the channel.

In the example considered, the signal of replacing the handset is a disconnection frequency of 1336 cycles per second, interrupted at the frequency of 20 cycles per second by the guard frequency.

The detection circuits 152, 153, 323, are all three fed by the low-signal frequency of the fixed receiver of the radio channel circuit and are for this purpose all three connected to the output D of the demodulator of the said receiver. In parallel, this output D is connected to an impedance adapter 156 connected to the terminals RE1 and RE2 of the termination 26, which characterize the receipt of the speech signal.

The oscillator 146 comprises a control circuit 157 one of the inputs of which is connected to the terminal CS of the circuit 120 and the other input of which is connected to an output 158 of the monostable flip-flop 155.

With the circuits 142, 144 and 155 is associated a bistable flip-flop 159 with two inputs. The first input is connected to the terminal LA0 of the circuit 120, this terminal transmitting information of placing into service solely when the mobile subscriber calls. The second input of the flip-flop 159 is connected to the output 150 of the monostable flip-flop 144 which delivers information of return to the initial state.

The circuits 142, 144, 155 and 159 control two gates 160 and 161 of the AND-type. These gates each comprise four inputs connected respectively to the outputs of the same rank of the said circuits.

The oscillator 146 controls a switching circuit 162 intended to control alternately two oscillators 163 and 164 at the frequency of the oscillator 146 to create the ringing signal. To this end the switching circuit 162 comprises a putting into service input connected to the terminal AR of the circuit 120.

The oscillator 164 delivers the availability frequency which, in the example considered, has the value of 1500 cycles per second. The oscillator 163 delivers the signalling frequency which in the example considered has the value 600 cycles per second.

The control of the oscillator 164 is carried out through a gate 165 of the OR-type. This gate presents three inputs connected respectively to the output of the gate 160, to a first output of the switching circuit 162 and to the terminal FI of the circuit 120.

The control of the oscillator 163 is carried out through a gate 166 of the OR-type. This gate presents two inputs connected respectively to the output of the gate 161 and to the second output of the switching circuit 162.

The oscillators 163 and 164 feed an amplifier 167 through a transformer 168. This amplifier 167 is connected on the one hand to the inputs M1 and M2 of the modulator of the fixed transmitter of the radio channel circuit, and on the other hand to the terminals EM1 and EM2 of the termination 26, FIG. 7*a*.

A bistable flip-flop 169 is connected to the register 147 to allow the sending by the wires LA1, LA2 etc...LA 16 of the coded number registered. For this purpose the flip-flop 169 comprises a first input connected to an output of the circuit 144 and a second input connected on the one hand to the terminal LA0 of the circuit 120 and on the other hand to the terminal LE0 of the said circuit 120.

A circuit 170 essentially made up of a gate of the AND-type presents a first input connected to the terminal LE0 and a second input connected to the output 171 of the circuit 144, this output 171 feeding simultaneously the circuits 160, 169 and 170. The circuit 170 comprises an output which is connected to the input 172 of the circuit 155, this input corresponding to setting into service of the monostable flip-flop constituting the circuit 155. The latter comprises a second input 158*a* connected to the terminal TT of the circuit 120 and able to receive from it blocking information.

The electronic part of the radio channel circuit also comprises a carrier detector 362 the input D' of which is connected to the receivers of the radio channel circuit, and the output of which is connected to the terminal FC. This detector 362 is subject to delay and is intended to deliver a polarity on the terminal FC to cause the relay *fo* to energize, when the carrier signal has disappeared for a relatively important duration, for example 30 seconds in order to free the radio channel circuit.

An embodiment example of a station equipment for a mobile subscriber is shown in FIGS. 10*a*, 10*b*, 11*a* and 11*b*. This equipment is suitable for use with the other parts of the network described previously.

This equipment essentially comprises:

a channel switch 173 (FIG. 10*a*) which is made up of a simple ring counter associated with a impulse generator. By way of example in no way limiting this switch is equipped for a radio telephone network with eight channels, an "auto-manual" relay 174 which is made up of a simple two position switch; a manual position and an automatic position, a detector of transmission 175 fed at its input 176 by the transmitter, not shown, of the mobile equipment, a detector of ringing signal 177, a busy indicator 178 which can be a simple luminous mark for example, a detector 179 of the signalling frequency 600 cycles per second, a detector 180 of the availability of service frequency 1500 cycles per second, a calling oscillator 181 delivering a ringing signal when the mobile subscriber is called, a delay circuit 182 the delay of which has a value of about 10 milliseconds. This delay circuit can be constituted by a simple monostable flip-flop, for example, a relay 183 made up essentially of a double changeover 184, 185. The changeover 184 is intended to switch the low-frequency signal coming, by its input 186, from the receiver, not shown, of the mobile equipment, either by its output 187 towards the receiver of the telephone handset, or by its output 188 towards the filters 189 and 190 intended to detect respectively the availability frequency 1500 cycles per second and the signaling frequency of 600 cycles per second. The changeover 185 is intended to switch, by its output 191, towards the modulator of the transmitter of the mobile equipment, either by its input 192, the microphone of the handset, or by its input 193 the signalling coming from a low-frequency amplifier 194, a bistable flip-flop 195 called flip-flop of search for a free channel, a bistable flip-flop 196 which comes to the working state after the recognition of the coded number, a bistable flip-flop 198 which comes to the work state at the first impulse of receipt of the coded number, a bistable flip-flop 199 which allows the sending of the coded number, a detector 200 (FIG. 11*a*) fed, via its input 201, by the receiver of the mobile equipment, this circuit 200 being intended to detect the presence of the carrier signal and being delayed at the opening in order that a provisional disappearance of the carrier signal does not entail a stoppage of the operation of the apparatus. This circuit 200 is like the detector 362 situated in the electronic part of the radio channel circuit, but its delay is slightly less, for it is intended to release the mobile equipment in the case of the prolonged absence of the carrier signal, and the release of the mobile equipment ought to take place before the release of the radio channel, a circuit 202 intended to indicate the position of the telephone handset and essentially made up of a simple switch associated with a continuous current source, a delay circuit 203 made up of a monostable flip-flop with 350 milliseconds delay, a delay circuit 204 identical with the delay circuit 203, a delay circuit 205 constituted by a monostable flip-flop of 100 milliseconds delay, a delay circuit 206 constituted by a monostable flip-flop of 750 milliseconds delay, a delay circuit 207 identical with the delay circuit 206, a circuit 208 intended for the control of a low-frequency generator 209 of 20 cycles per second, the circuit 208 presenting a delay of its own of about 1 second, a circuit 210 associated with the telephone dial of the station and made up essentially of a contact associated with an impulse generator, a circuit 211 essentially constituted by a counter to explore a diode matrix, for example, on which is stored the coded number of the mobile subscriber, an oscillator 212 delivering the guard frequency of 2150 cycles per second, an oscillator 213 delivering the connection frequency of 1633 cycles per second, an oscillator 214 delivering the connection frequency or that of replacing the handset 1336 cycles per second, a circuit 215 made up essentially of a comparator intended to compare the received number with the number individual to the mobile subscriber, and of a counter of comparison impulses, and lastly, a circuit 216 intended to return to their initial states the circuits 211 and 215.

The different circuits which have just been enumerated are connected amongst themselves by gates of the OR and of the AND-type. The inputs of each gate transmit the states corresponding to the functions to be compared.

The switch 173 of a free channel is controlled by a gate 217 of the AND-type. This gate has two inputs connected respectively to the "work" output of the flip-flop 195 and to the "automatic position" output of the relay 174.

The detector 177 is controlled by a gate 218 of the AND-type. This gate has three inputs connected respectively to the "transmission"output of the detector 175, to the "work" output of the delay circuit 182 and to the "handset replaced position" of the circuit 202 (connection 219).

The busy indicator 178 is controlled by a gate 220 of the AND-type. This gate has two inputs connected respectively to the "handset lifted position" of the circuit 202 (connection 221) and to the "rest" output of the flip-flop 197. The "handset lifted position" output of the circuit 202 is connected to the "handset replaced position" output through a changeover.

The detector 179 is fed by the output of the filter 190 (connection 222). In the same way, the detector 180 is fed by the output of the filter 189 (connection 223).

The calling oscillator 181 is controlled by a gate 224 of the AND-type. This gate has four inputs connected respectively to the output of the detector 180 through a changeover, to the "-work" output of the flip-flop 196, to the "handset replaced position" output of the circuit 202 (connection 219), to the output of a gate 226 of the OR-type. This gate 226 has two inputs connected respectively to the "work" output of the detector 177 and to the "manual position" of the relay 174.

The delay circuit 182 is controlled by a gate 227 of the OR-type. This gate has two inputs connected respectively to the two outputs of detectors 179 and 180.

The relay 183 is controlled by a gate 228 of the AND-type. This gate has five inputs connected respectively to the "handset lifted position" output of the circuit 202 (connection 225), to the "rest" output of the delay circuit 204 (connection 229), to the "rest" output of the delay circuit 203 (connection 230), to the "work" output of the flip-flop 196 and to the "dial not operated" of the circuit 210 (connection 231).

The "dial not operated" output is connected to the "dial operated" output of the circuit 210 through a changeover.

The flip-flop 195 comprises a "work" input and a "rest" input. The "work" input is controlled by a gate 232 of the OR-type. This gate has two inputs connected respectively to the "rest" output of the flip-flop 197 and to the output of a gate 233 of the AND-type. This gate has four inputs connected respectively to the "handset replaced position" output of the circuit 202 (connection 219), to the "rest" output of the delay circuit 182, to the "rest" output of the delay circuit 205 (connection 234), and to the "rest" output of the flip-flop 197. The "rest" input of the flip-flop 197 is controlled by a gate 235 of the AND-type. This gate has two inputs connected respectively to the "handset replaced position" output of the circuit 202 (connection 219) and to the output of the detector 180.

The flip-flop 196 comprises a "work" input and a "rest" input. The "work" input is controlled by a gate 236 of the OR-type. This gate has three inputs connected respectively to the outputs of three gates 237, 238 and 239 of the AND-type. The gate 237 has two inputs connected respectively to the "transmission" output of the detector 175 and to the output of the decoder 215 (connection 240). The gate 238 has two inputs connected respectively to the "manual position" output of the relay or switch 174 and to the output of the decoder 215 by the connection 240. The gate 239 has two inputs connected respectively to the "work" output of the detector 177 and to the "rest" output of the delay circuit 206 (connection 241).

The "rest" input of the flip-flop 196 is controlled by a gate 242 of the OR-type. This gate has two inputs connected to the output of a gate 243 of the AND-type and to the "rest" output of the delay circuit 207 (connection 244). The gate 243 has three inputs connected respectively to the "handset replaced position" of the circuit 202 (connection 219), to the "transmission" output of the detector 175 and to the "manual position" of the switch 174.

The flip-flop 197 comprises a "work" input and a "rest" input; the "work" input is controlled by the gate 245 of the OR-type. This gate has four inputs connected respectively to the outputs of the gates 246, 247, 248 and 249 of the AND-type. The gate 246 has three inputs connected respectively to the "-manual position" output of the switch 174, to the "work" output of the flip-flop 196 and to the "handset lifted position" of the circuit 202 (connection 250). The gate 247 has three inputs connected respectively to the "manual position" output of the switch 174, to the "absence of carrier" output of the detector 200 (connection 251) and to the "handset lifted position" of the circuit 202 (connection 250). The gate 248 has three inputs connected respectively to the "handset replaced position" output of the circuit 202 (connection 219), to the output of the decoder 215 (connection 240) and to the "automatic position" output of the switch 174 (connections 252 and 253). The gate 249 has three inputs connected respectively to the output of a gate 254 of the OR-type through a changeover, to the "automatic position" output of the switch 174 (connections 252 and 253) and to the "handset lifted position" output of the circuit 202 (connection 250).

The gate 254 expresses the condition in which the mobile equipment is found. In a general way, this gate is in the "-work" state when the mobile is sought by a call or when the switch of a free channel is in search position. Thus, when the gate 254 is in the work state the mobile cannot deal with a call. The presence of the changeover following the output of the gate 254 has simply the purpose of delivering a signal coherent with those appearing at the other inputs of the gate 249 to make the latter pass to the work state when the gate 254 is at rest.

The gate 254 has three inputs connected respectively to the outputs of the gates 255, 256 and 257 of the AND-type. The gate 255 has three inputs connected respectively to the "-work" output of the flip-flop 195 and to the "absence of transmission" output of the detector 175 and to the "work" output of the flip-flop 198. The gate 257 has two inputs connected respectively to the "absence of transmission" output of the detector 175 and to the "wor" output of the delay circuit 205 (connection 258).

The "rest" input of the flip-flop 197 is controlled by a gate 259 of the OR-type. This gate has four inputs connected respectively to the "rest" output of the delay circuit 207 (connection 244) and to the outputs of the gates 260, 261 and 262 of the AND-type. The gate 260 has three inputs connected respectively to the "rest" output of the delay circuit 205 (connection 263) to the "rest" output of the flip-flop 196 and to the output of the detector 180. The gate 261 has three inputs connected respectively to the "rest" output of the delay circuit 203 (connection 264), to the "rest" output of the flip-flop 196 and to the output of the changeover associated with the detector 180. The gate 262 has two inputs connected respectively to the "rest" output of the detector 177 and to the "rest" output of the delay circuit 206 (connection 241).

The flip-flop 198 comprises a "work" input and a "rest" input. The "work" input is controlled by a gate 265 of the OR-type. This gate has two inputs connected respectively to the outputs of the gates 266 and 267 of the AND-type. The gate 266 has two inputs connected respectively to the "absence of transmission" output of the detector 175 and to the output of the detector 179. The gate 267 has two inputs connected respectively to the output of the detector 179 and to the "-handset lifted position" output of the circuit 202 (connection 268). The "rest" input of the flip-flop 198 is connected directly to the "rest" output of the delay circuit 182. The flip-flop 199 comprises a "work" input connected to the output of a gate 269 of the AND-type and a "rest" input connected to the output of a gate 270 of the OR-type. The gate 269 has three inputs connected respectively to the "rest" output of the flip-flop 196, to the "transmission" output of the detector 175 and to the "rest" output of the delay circuit 204 (connection 229). The gate 270 has two inputs connected respectively to the "handset replaced position" output of the circuit 202 (connection 219) and to the output of the translator 211 which delivers the last code impulse (connection 271).

The carrier detector is controlled by the "work" output of the flip-flop 197 (connection 272). This "work" output of the flip-flop 197 also controls a relay 273 called transmission relay and which is intended to put into service the transmitter of the mobile equipment.

The delay circuit 203 is controlled by a gate 274 of the OR-type. This gate has two inputs connected respectively to the outputs of the two gates 275 and 276 of the AND-type. The gate 275 has two inputs connected respectively to the "handset lifted position" output of the circuit 202 and to the "transmission" output of the detector 175 (connection 277). The gate 27 has two inputs connected respectively to the "handset lifted position" output of the circuit 202 and to the output of the decoder 215.

The delay circuit 204 is controlled by a gate 278 of the OR-type. This gate has two inputs connected respectively to the outputs of the gates 279 and 280 of the AND-type. The gate 279 has two inputs connected respectively to the "handset lifter position" output of the circuit 202 and to the "rest" output of the delay circuit 205. The gate 280 has two inputs connected respectively to the "handset lifted position" output of the circuit 202 and to the "work" output of the flip-flop 196 (connection 281).

The delay circuit 205 is controlled by a gate 282 of the OR-type. This gate has three inputs connected respectively to the outputs of the gates 283, 284 and 285 of the AND-type. The gate 283 has two inputs connected respectively to the "rest" output of the delay circuit 182 (connection 286) and to the "rest" output of the flip-flop 197 (connection 287). The gate 284 has two inputs connected respectively to the "rest" output of the flip-flop 196 (connection 288) and to the "rest" output of the delay circuit 203. The gate 285 has two inputs connected respectively to the "work" output of the flip-flop 196 (connection 281) and to the "rest" output of the detector 177 (connection 289).

The delay circuit 206 is controlled by a gate 290 of the AND-type. This gate has two inputs connected respectively to the "transmission" output of detector 175 (connection 277) and to the "handset replaced position" output of the circuit 202.

The delay circuit 207 is controlled by a gate 291 of the OR-type. This gate has three inputs connected respectively to the "absence of carrier" output of the detector 200 and to the outputs of the gates 292, 293 of the AND-type. The gate 292 has three inputs connected respectively to the "rest" output of the delay circuit 205, to the "handset replaced position" output of the circuit 202, and to the "automatic position" output of the switch 174 (connection 253). The gate 293 has two inputs connected respectively to the "handset replaced position" output of the circuit 202 and to the "transmission" output of the detector 175 (connection 277).

The circuit 208 for control of the generator 209 of 20 cycles per second has three inputs 294, 295 and 296. The input 294 is connected to the detector filter 190 and is intended to send a control signal starting from the receipt of the coded number coming from the radio channel. The input 295 is connected to the "work" output of the flip-flop 199 (connection 297) and is intended to transmit a control signal for the sending of the coded number of the mobile towards the radio channel. The input 296 is connected to the "work" output of the delay circuit 207 and is intended to send at the end of all the operations a signal of hanging up intended to release the channel.

The translator 211 comprises a putting into service input fed by the generator 209 and an input for the control of the return to zero connected to the circuit 216.

The decoder 215 comprises two inputs connected respectively to the outputs of the filters 189, 190, these two inputs being intended to send the coded number coming from the radio channel. The decoder comprises two inputs connected to the same output of the translator 211 and intended to send the coded number belonging to the mobile subscriber, these two inputs being connected by a changeover. The decoder 215 comprises a fifth input connected to the output of the generator 209 and intended to send impulses for the control of the comparison between the number received from the radio channel and the number belonging to the mobile subscriber. The decoder 215 comprises lastly a sixth input connected to the circuit 216 and intended to send the control of return to zero of the decoder.

The return to zero circuit 216 comprises a putting into service input connected to the output of the control circuit 208 and a blocking input intended to send the last impulse of the number delivered by the translator 211. This circuit 216 can be made up essentially of a simple monostable flip-flop.

The oscillator 212 is controlled by a gate 298 of the OR-type. This gate has five inputs connected respectively to the "-work" output of the delay circuit 206, to the "work" output of the delay circuit 203 and to the outputs of the gates 299, 300 and 301 of the AND-type. The gate 299 has two inputs connected respectively to the output of the translator 211 through the associated changeover, and to the "work" output of the flip-flop 199 (connection 297). The gate 300 has two inputs connected respectively to the "work" output of the delay circuit 204 and to the "rest" output of the flip-flop 196 (connection 288). The gate 301 has three inputs connected respectively to the "dial in use" output of the circuit 210, to the "-work" output of the flip-flop 196 (connection 281) and to the "reversed dial impulses" output of the circuit 210.

The oscillator 213 is controlled by a gate 302 of the OR-type. This gate has four inputs connected respectively to the outputs of the gates 303, 304, 305 and 306 of the AND-type. The gate 303 has three inputs connected respectively to the "-handset lifted" output of the circuit 202, to the "work" output of the flip-flop 196 (connection 281) and to the "work" output of the delay circuit 204. The gate 304 has three inputs connected respectively to the "rest" output of the flip-flop 196 (connection 288), to the "work" output of the delay circuit 205 and to the "handset lifted position" output of the circuit 202. The gate 305 has two inputs connected respectively to the output of the translator 211 and to the "work" output of the flip-flop 199 (connection 297). The gate 306 has three inputs connected respectively to the "dial in use" output of the circuit 210, to the "work position" output of the flip-flop 196 (connection 281) and to the "direct dial impulses" output of the circuit 210, the "direct impulses" output being connected to the "inverse impulses" output through a changeover.

The oscillator 214 is controlled by a gate 307 of the AND-type. This gate has two inputs connected respectively to the "-work" output of the delay circuit 207 and to the output of the generator 209 through a changeover.

The oscillators 212, 213, 214 feed the amplifier 194 through a circuit 308 which is comprised of a gate of the OR-type.

In the embodiment example of the terminal section shown in FIG. 13, there is recognized the multiselector 366 serving 104 subscribers with line wires *a* and *b*, metering wire *c*, wire *d* of hold of the radio channel, and the wire *t* of connection of the selectors and of holding the latter. These wires are on the side of the bracket 367 connected to the primary section of FIG. 5. On the other side the pairs of wires *c* and *d* are individually connected to each subscriber line circuit 363. On the other hand on the same side the set of wires *a*, *b*, *c*, *d* is multiplied normally which allows by a well-known process operator of the exchange to listen-in on an established connection.

There are two sets of six connection electromagnets 1 to 6 *tv* or 7 to 12 *tv*, each set of six serving a group of 52 subscribers. Each wire *t* can be connected to two electromagnets of the same rank in the sets of six, i.e. 1 and 7, or 2 and 8, etc. By way of example the wire *t* of the first rank will be considered. This wire *t* can be connected to the electromagnet 1*tv* by the contacts *tkb*2, *tka*2, 7*tv*2 and 1*tv*7 or to the electromagnet 7*tv* by contacts *tka*2, *tkb*2, 1*tv*2 and 7*tv*7. The electromagnet 1*tv* holds by contacts 1*tv*1 and 7 *tv*6 on the wire *t* while 7*tv* holds by 7*tv*1 and 1*tv*6.

A distributor 368 connects the terminals *ca*1 to *ca*4 of the primary section to the pairs of rest contacts of the relays 1 and 7tv4, 2 and 8tv4, etc. indicating the availability of a rank, by work contacts tn2 to tn7.

The availability relay tn of a selector is on the one hand connected to battery and on the other hand to earth by contacts 1ta2 to 8ta2 in parallel, contacts 7tv5 to 12tv5 in parallel and contacts 1tv5 to 6tv5 in parallel.

The multiselector comprises also two relays of sixes tka and tkb. A relay of a set of six is connected between battery and earth by the rest contact of the relay of the other set of six and contacts 1 to 4ta3.

A piloting circuit 369 comprises the eight relays of sets of thirteen of the 104 subscribers. The first group of 52 subscribers corresponds to the four relays 1ta, 2ta, 3ta and 4ta, the second to 5ta, 6ta, 7ta and 8ta. The relays 1ta and 5ta correspond to the thirteen horizontal terminals in low position with the fourteenth dividing bar in high position; the relays 2ta and 6ta correspond to the horizontal bars in low position; the relays 3ta and 7ta to the bars in high position with the dividing bar in high position and the relays 4ta and 8ta to the bars in low position with the dividing bars in low position. Each relay ta is connected between battery and thirteen cells giving access individually to thirteen contacts of the changeover c01 of the subscriber line 363.

On the other hand the circuit 369 comprises also eight relays 1tz to 8tz arranged in the same way as the relays ta save that the decoupling cells have access to the work contacts of the changeovers c01. Moreover, they are connected to the corresponding cells of the relays ta by the work contacts of the tz relays:
1tz1 to 13...8tz1 to 13. The relays tz are fed through the terminal tz by the marker.

The decoupling cells of the relays tz are also connected individually to the electromagnets of the corresponding bars of the circuit 370 by contacts of the relays tb of the circuit 371.

Each electromagnet 1B to 13H has one side of its winding connected to the cells of 369 and the other to battery by a work contact of relay te or by one of its work contacts. The electromagnet 14B is connected to the rest contacts 1tb1, 3tb1, 5tb1 and 7tb1 while 14H is connected to the contacts 2tb1, 4tb1, 6tb1 and 8tb1. The circuit 370 comprises also a relay te connected between earth by contact tn10 and battery by contacts te4 and tc16.

The circuit 371 comprises 8 relays 1tb to 8tb auxiliaries of the relays 1ta to 8ta. Each relay tb can be connected on the one hand to earth by the work contact of the associated relay ta and a contact tng and ok the other hand to battery by a chain of rest contacts 2tb16 to 8tb16. Contacts 1tb1 to 8tb1 are connected to the contact tn9.

A verification relay te is on the one hand connected to the terminal ST by contacts tn8 and tc1 and a resistance, and on the other hand to battery by the contacts of the dividing bar in parallel and those of the other bars also in parallel.

The circuit 372 of category of the subscriber comprises a tree decoder made up of the third contacts of the electromagnets 1B to 14H allowing each terminal (representing a subscriber) of a distributor 373 to be connected to battery by the contacts 1ta4 to 8ta4, te1 and tn1. The terminals situated on the other side of the distributor represent categories of subscribers, they are connected to the terminals CAT of the marker shown in FIG. 6b.

The subscriber's line circuit 363 comprises a busy relay c0 between the wire d and earth, a special meter SMR between earth and the wire d by the contact c02 and an ordinary meter SM between earth and the wire c by the contact c03.

After this geographical description of all the circuits comprising the automatic radiotelephone network, object of the invention, the operation of this network will be described. Two examples of use will be set out. The first example concerns the case of a call of a mobile subscriber by a fixed subscriber. The second example treats the case of a call of a fixed subscriber by a mobile subscriber.

When the network is waiting, the distributor 40 shown in FIG. 1b designates the service channel intended for the flow of the first call which will be presented. This designation is carried out from the placing of the network (and in particular of the distributor) under voltage. As soon as current appears, the relay ds of the circuit 136 operates. The operation of ds causes the opening of the short circuit of the relay dt which energizes. The relay ds is then short-circuited and falls back slowly. The contact dt21 closes, which allows the energization of the relay dv1 or of the first dv relay corresponding to a channel neither blocked nor busy. The corresponding contact dv of the circuit 135 closes, which entails the energization of the relay vd of the corresponding radio channel circuit. This relay vd is none other than that shown in circuit 133 of FIG. 7b. The corresponding radio channel then receives availability or according to the expression indicated previously is placed into service. The contact vd3 of the circuit 133 closes and entails the energization of the relay di of the circuit 135. The contact di1 of the circuit 134 comes into work position and cuts the energization of the relay dv which holds by the chain of changeovers dv3.

Simultaneously the contact vd1 closes (circuit 120) and applies earth to the terminal FI of the electronic part, shown in FIG. 8, of the radio channel circuit. This has for effect to place in service the oscillator 164 which delivers the availability frequency.

At the placing under voltage of the equipment of the mobile shown in FIG. 10, the detector 180 places into service the delay circuit 182. At the end of the delay, the signal given by the delay circuit places the flip-flop 195 in the work state. The channel switch 173 is placed in service and is locked on the channel or path, affected by the availability frequency. This locking is produced by the detection of the frequency of 1,500 cycles per second by the detector 180 which delivers a signal returning the flip-flop 195 to the state of rest, this passage to the state of rest of the flip-flop 195 entailing through the gate 217 the stoppage of the search carried out by the switch 173.

The network is then ready to deal with an incoming call (fixed subscriber towards mobile subscriber) or outgoing call (mobile subscriber towards fixed subscriber). The first example of use dealt with will be the case of an incoming call. It will be supposed that the primary section, the marker and also a radio channel are available. This availability is translated by the application of earth on the terminal i of the circuit 83 of FIG. 3. The relay ci is energized and the contact cl1 of the incoming junction 22 is closed. The application of earth on the wire m allows of the setting into place of the bars of the group selector 44. When the fixed subscriber has lifted his handset, there is seizure of a register at the exchange and the wires a, b, c, t (side of bracket 68) are taken respectively to earth to battery, to earth and to earth. There is then produced a test of the primary section in order to verify that the said section is really available. This is realized by the energization of the relay cd of the circuit 76 and of its auxiliary cdx. The rest contact cd1 of the circuit 84 changes position and cuts the energizing circuit of the relay cr, which forbids the seizure of the primary section for an outgoing call.

The closure of the contact cdx25 entails the energization of the relay cg, which characterizes the seizure of the primary section. The contact cg2 of the circuit 85 closes and, by application of earth through the relay c1 to the terminal PRP of the circuit 103 of FIG. 6, entails the energization of the relay mn and of the relay cl which characterizes the seizure of one of the markers. It is to be noted that, if there are two markers, the choice is made by exclusion by the relays cl (shown) and clx (not shown). Three contacts clx are shown for the understanding of the drawing: a rest contact in the circuit of cl, circuit 85, a work contact in the holding circuit of the relay ce (circuit 80) and a work contact in the holding circuit of the relay ch (circuit 76). The closure of the contact cg1 of the circuit 76 causes the energization of the relay ch which holds by ch1 and cl10 (or clx10). The changeover ch2 changes position and cuts the energization of the relay cg which causes the fall of the relay cd. The energization of the relay mn is assured by the position of the changeover ch3 of the circuit 85. The closure of the contact *ch*5 allows the application through *cl*4 of earth to the terminal PE and the energization of the relay *mc* of the circuit 101 (FIG. 6). The contact *mc*1 closes and allows the application of earth coming from wire *c* of the incoming junction 22 to a terminal IF of the connector bundle. The closure of the contact *mc*3 of the circuit 100 causes the seizure of one of the paths of the connector bundle by applying battery to the terminal FI. A corresponding indication to the chosen path is sent by the connector bundle through the terminal IF. There is thus a first seizure of the connector bundle to receive immediately the indication of the number of the wanted mobile.

On the groups of wires B, C, D, the register sends to the marker, through the connector bundle, the indications coded in "two out of five" of the three last digits of the number of the wanted mobile subscriber. The receipt of these indications has been previously prepared by the closure of the contact *mn*1 of the circuit 104, which has allowed the application of earth to the general terminal 90. The energization of the relay *dh* of the circuit 102 has caused the closure of the contacts *dh*2, *dh*3, *dh*4, *dh*5, *dh*6 of the group of wires B. Two of the relays *mx* of 1 to 5 are energized and held on the general earth through their corresponding contact and resistance 89. In the same way, two relays of the circuit 87 and two relays of the circuit 88 are energized. Simultaneously the marker receives on the wire 4 of group A an earth which energizes the relay *dl* of the circuit 99. The earth on the relay *dl* is withdrawn but it holds by its contact *dl*1. The relay *dm* energizes by contact *mw*1 or *mux*1, circuit 362. The relay *dk* operates in series with *di* (characteristic of a called mobile subscriber) by contact *dm*3. The opening of contact *dk*1 allows the sending of the indication of a first seizure of the bundle.

The number of the wanted mobile subscriber being registered on the group of relays *lm*, *mx*, *my* and *mz*, these relays by their respective contacts close the circuits of the decoder 362 which marks the circuit of the subscribers line 363. This supposes that the called subscriber is a subscriber having a contract in the exchange, that is to say that a relay *mv* has been energized, then a relay *mw*.

There will be considered the case of a free subscriber belonging to the exchange. Earth placed on the wire *co*, FIG. 13, actuates by the break contact *co*1 one of the pilot relays *ta*. By its contact *ta*5 battery is applied to the terminal *oc*. In the marker the relay *mp* operates by *oc* to battery and *dk*2 closed. By the contact *mp*1 open, the busy relay *mo* is unshort-circuited. By the contact *mo*2 the attraction circuit of the verification relay *df* is prepared.

Previously, the energization of the relay *mox* of the circuit 110 has entailed the energization of the relay *mq* of the circuit 105 by closure of the contact *mox*22. The contact *mq*22 of the circuit 94 is then closed in such a way that the verification of the "two out of five" code of each of the indications placed in storage by the circuits 86, 87 and 88 entails the energization of the relay *df* of the circuit 94. The contact *df*1 of the circuit 101 changes position and cuts the energization of the relay *mc*. The contact *mc*3 of circuit 100 opens and controls the freeing of the connector bundle.

The closure of the contact *df*2 of the circuit 105 entails the application of earth on the terminal LE of the radio channel circuits (FIG. 7*b*). Only the radio channel circuit in which the relay *vd* is energized sees its relay *tm* of the circuit 119 pass to the work state. The contact *tm*2 of the circuit 116 closes and allows the energization of the relay *to* which closes its contact *to*1. The relay *tn* is energized, which characterizes the connection of the radio channel circuit to the marker. If the wanted subscriber is busy, the relay *mo* remains at rest, which forbids the verification of the number by *cf* and the engagement of the radio channel. On the other hand, the indication of subscriber busy is sent back to the register by the connector bundle, the contact *mo*1 remaining at rest. The register releases the circuits engaged and the busy tone is sent to the caller as for a normal call.

The case will now be considered of an unused number. Either *mvx* is operated or the terminal *cox* is connected to one of the relays *dp*. By *mvx*2 and *mvy* or by *cox* the corresponding relay *dp* is operated. By work contact *dp*1 the relay *mc* of seizure of the connector bundle is operated. By the contact *dp*2 the information of unused number is sent to the register of the exchange by the connector bundle. The register communicates then with the caller by means of an appropriate speaking machine. It is to be noted that in this case also the relays *mo* and *df* remain at rest and the radio channel is not engaged.

There will now be considered the case of a wandering wanted subscriber. In the same way as previously a particular relay *dp* is energized. The information sent to the register causes the connection of the caller to an operator. The latter having the number of the wanted subscriber, makes a note of it and pushes her offering key, which has the effect of placing an earth on the wire *c* side 6, FIG. 3. This earth by contacts *cv*4, *cdx*25, *ch*2, *cdx*27, *ce*7 causes the operation of the relay *cgx*. The relay *cgx* is locked by the wire *des*. In the marker, the relay *de* of the circuit 111 is energized and the opening of the contact *de*1 (circuit 110) causes the operation of the relay *mo*. There follows an operation similar to that of a free subscriber as concerns the connection of the radio channels. The operator keeps the supervision of the communication and acts consequently, she eventually establishes tickets for the wanted and calling subscribers.

A return will now be made to the case of the free called mobile subscriber. Earth applied on the corresponding wire *co* (FIG. 13, circuit 363) is sent to the relay *ta* of the set of thirteen subscribers which is operated. The availability relay *tn* is energized and by its contact *tn*10 closes the energizing circuit of *tc* which operates indicating that all the horizontal bars are at rest. The contact 1 of the operated relay *ta* closes to circuit of the relay *tb* of the same rank. By the contacts 2 to 14 of the operated relay *tb* the wire *co* is extended to its horizontal bar electromagnet which is operated. On the other hand by the contact 1 of the operated relay *tb* the circuit of an electromagnet of the dividing bar is closed. Thus the horizontal bars of the terminal section are in place; it will then suffice to operate one of the electromagnets of vertical bars (selectors) in order to connect the circuit of the wanted subscriber to the primary section of FIGS. 3 and 4. By contacts 2 of the horizontal bars the relay *te* is energized and causes by its contact *te*4 the relay *tc* to fall back. Moreover, by *te*1 and *tn*8 an earth is placed through the winding of the *te* on the wire ST causing the marker (FIG. 6) the operation of the relay *mf*. Contact *mf*1 extends the earth on the wire *vt* towards the radio channels; the radio channel available (contact *va*6 or *vb*6 closed) extends this earth by the wire *v* towards the holding wire *t* of the primary section (FIG. 3). The contacts 3 of the horizontal bars being closed in 372, one of the category wires CAT extends battery towards one of the category relays *da* of the marker. Contacts 3*ct*4 of *da* are connected to the connector bundle thus indicating the category of the wanted subscriber to the register which normally decides the sequence of operations.

On the other hand the contact 3 of the operated relay *ta* closes the circuit of *tka* or *tkb* to prepare the circuit for energization of the electromagnets TV.

By contacts *tn*2 to *tn*7 of 368, the terminal section sought sends on wires *da*/*df* in series with *ca*1 to *ca*4 earths characterizing the position of the available terminal selectors.

The pilot relays 1*ca*2–3–4 of 78, FIG. 4, represent the four pieces of principle information allowing the coordinates of the crossing points on the multiselector of the primary section to be established. These four pieces of information concern the "high" or "low" position of the horizontal bar involved and the "right" of "left" part of the divider of the vertical bars that the relays VA and VB control.

The connections realized between the wires *da*/*df* of each terminal section FIG. 13*a* and the marking wires ending in the pilot relays 1*ca* to 4*ca* use a decoupling diode and take account of the distribution of the terminal selectors.

In the example of marking on the wire of pilot relay 1*ca* this relay operates and establishes the circuit of the connection and mutual exclusion relay 1*cb* by: battery 77, work 1*ca*3, winding 1*cb*, rest 2*cb* to 4*cb*, earth.

By the opening of its rest contact 1*cb* cuts the circuit of the relays 2*cb* to 4*cb*, which prevents the mixture of marking in the case in which several terminal selectors are available in a calling frame.

The closure of the work contacts 1*cb*2/*n* connects the electromagnet seized among the selection electromagnets 1B to *nh* to the marking wire chosen.

The relay *cc* has verified that these electromagnets are all at rest in operating by: battery 77, rest 1B1 to rest *n*H1, rest *ce*5, winding *cc*, work 1*ca*1, to earth.

The relay *cc* by its work contacts feeds the horizontal bar electromagnet and locks by *cc*14.

In the example chosen the electromagnet 1B is operated by; battery 77, work *cc*3, electromagnet 1B, work 1*cb*2, wire *ca*1, work T*n*2 of 368, FIG. 13*a*, rest 7TV4 and 1TV4 and earth.

The electromagnet 1B locks by its own work contact, it cuts the operating circuit of the following electromagnets, which prevents the simultaneous setting of several selection bars.

The "Y" branching (FIG. 13*a*) of the called radio channel is assured by the horizontal bars 12B to 14H. To realize this branching shown in FIG. 2, each radio channel, FIG. 7, is connected by one of the two parts, "high" or "low" of each bar. Thus the radio channel sought by the connection V (circuit 84) 84) which corresponds to its sets into operation an electromagnet among the six of the three bars reserved to the connection.

The connection on the right division part of the vertical bar is assured by the relay V*a* of 22 and the relay V*ax* of 115 (radio channel) which receives under the control of the work contact 1*cb*21 the corresponding operation order from the primary section. The relay *ce* is operated to control the operation of an electromagnet of the terminal section. It causes by *co*5 *cc* to fall back and assures holding battery of 1B.

The opened relay *cc* establishes the connection of the wire *sp* giving to the marker the indication of the end of setting into place of the horizontal bars: relay *mn* of the marker, wire *sp*, work *cl*9, rest *cc*1, work 1B3, earth.

In the radio channel, at the operation of V*ax*, contact V*ax*6 has extended earth from the marker (*cct*105) by work *mf*5, wire VT, work V*ax*6, wire V and in the primary section: winding of the electromagnet *12*B chosen e.g., work of 1*ch*2 and battery 77.

The marker receives the indication of the setting into place of the bar 12B by the relay *mk* which operates: relay *mk*, wire *spx*, work *cl*11, set of the contacts proving that there is only a single connection bar of the radio channel operated, rest *cc*1, work 1B3, earth.

Thus the selection electromagnets are in place in the primary and terminal sections, the connection order by the selection electromagnets will be given by the register on the wire *m* of 68, FIG. 4, as soon as the radio channel will have received the acknowledgement of reception from the mobile.

The calling operations will be described below.

The indication of the called mobile which has been coded in "two out of five" and stored in the circuits 69, 86, 87 and 88 of the marker is transformed into an indication in binary code by means of circuits 98. This indication is then transmitted by the closure of the contacts *tn*5/37 of the circuit 120, towards the register counter 140 of FIG. 8, by means of the wires LE1, LE2...LE16, LEx. The closure of the contact *tn*4 of the circuit 119 entails the energization of the relay *tf*. The contact *tf*2 of the circuit 123 closes. The relay *tl* is energized and entails the closure of the contact *tl*2 of the circuit 133.

The corresponding relay *dj* of the circuit 135 of FIG. 9 is energized. The contact *dj*3—1 opens and cuts the energization of the relay *vd* of circuit 133. The relay *di* of circuit 135 falls back. The changeover *dj*1—1 changes position and allows the energization of the relay *dv*2 of circuit 134. The wire *vd*2 of circuit 135 is placed to earth and sends the availability marking to the second radio channel. The relay *di* is energized again while the relay *dv*1 falls back. The radio channel distributor thus designates, among the other unoccupied radio channels, a new service channel intended for the flow of the call which will be presented.

Simultaneously the changeover *tf*1 of the circuit 120 changes position and cuts the earth on the terminal FI to apply it to the terminal LEO. This disappearance of polarity on the terminal FI of FIG. 8 leads through the gate 165 to the suppression of the permanent transmission of 1,500 cycles per second by the oscillator 164. This disappearance of polarity on the terminal FI moreover energizes oscillator 146. This disappearance of polarity on the terminal FI moreover energizes oscillator 146 through circuit 154 by the monostable flip-flop 155 and the control circuit 157. The oscillator 146 starts the register counter 140. This is the instant 309 of the timing diagram shown in FIG. 14. This diagram indicates the different stages of signalling from the establishment of communication for a call coming from a fixed subscriber and being directed towards a mobile subscriber. This signalling is carried out on two groups of frequency 310 and 311. The group 310 comprises two frequencies 312 and 313 which are none other than the frequency of availability of 1,500 cycles per second and the signalling frequency 600 cycles per second, the conversation signal being represented by 314. The second group 311 comprises three frequencies 315, 316 and 317 which are none other, respectively, than the frequency of disconnection 1,336 cycles per second, the connection frequency 1,633 cycles per second and the guard frequency 2,150 cycles per second. The conversation frequency is shown at 318. The first group of frequencies is sent by the electronic part of the radio channel circuit, while the second group of frequencies is sent by the mobile equipment.

Prior to the instant 309, only the frequency of availability 312 is sent. The start of the counter 140 has the effect of the deliverance by the latter of impulses which are a function of the polarities applied on the wires LE1, LE2, etc., i.e. function of the indication formed by the fixed subscriber and stored in the circuits 86, 87, 88 of the marker. The impulses delivered by the counter 140 are applied to the flip-flop 142 which controls alternately the gates 160 and 161. These gates control the oscillators 164 and 163 respectively through gates 165 and 166. These oscillators feed the inputs M1 and M2 of the modulator of the fixed transmitter of the radio channel circuit through the amplifier 167. The coded indication of the called mobile subscriber is then broadcast to all the mobile equipment in service. The duration 319 of the transmission of this indication is controlled by the monostable flip-flops 144 and 155. The instant 309 corresponds more particularly to the start of 155, while the instant 320 corresponding to the end of the transmission of the indication is controlled by the start of the monostable flip-flop 144, this start being controlled by the last impulse delivered by the counter 140 (connection 143).

The transmission of the coded indication of the called mobile subscriber is received by all the mobile equipments in service. This detected indication is sent to the input 186 of the relay 183 of FIG. 10, to be directed towards the detectors 189 and 190 (FIG. 11*b*) which feed the circuit 215. The first impulse of 600 cycles per second received by the detector 190, request the circuit 208 which controls the 20 cycles per second oscillator 209. The impulses delivered by the latter seek the circuit 211 which delivers the indication belonging to the mobile at the frequency of 20 cycles per second. This own indication is compared in the circuit 215 with the received indication.

If the two indications are not identical, no signal is delivered by the circuit 215 and the different elements of the mobile equipment which have been put into service return to their initial position.

If the received indication and the indication belonging to the mobile equipment are identical, a signal is sent by the circuit 215. This signal controls the flip-flop 197 through gates 245 and 248. This flip-flop passes from the rest state to the work state and controls the relay 273 in order to place the transmitter of the mobile equipment into service.

Between the instant 309 and the instant 320, all the mobile equipments in service are locked. In fact the gate 254 is in the work state through the gate 256 the two conditions of which are satisfied, i.e. absence of transmission coming from the detector 175 and flip-flop 198 in the work state. In fact, this flip-flop has passed to the work state from the receipt of the first impulse of 600 cycles per second detected by 179, the detector 175 being in the "absence of transmission" position (gate 266). At the instant 320, the transmitter of the mobile equipment which has received its indication is placed in service. The gate 256 passes to the state of rest and the gate 254 does the same. The equipment of this mobile is no longer blocked. The rise of the voltage of the emitter, detected by the circuit 175, places in service the delay circuit 206 through the gate 290. This delay circuit places in service the oscillator 212 through the gate 298. The transmission from this oscillator, which delivers the guard frequency of 2,150 cycles per second, will last during all the delay, that is 750 milliseconds, as the line 321 of FIG. 14 shows.

As concerns the mobile equipments which have not recognized their indication, their flip-flop 197 is returned to the state of rest at the end of the receipt of the indication, while the circuit 182 indicates the disappearance of the 600 and of the 1,500 cycles per second. The delay circuit 205 is placed in service through the gate 282 and the gate 283 and keeps the gate 254 in the work state through the gate 257. Thus the equipments of these mobiles will remain blocked during the 100 milliseconds of the delay of the circuit 205, up to the instant 322 shown in FIG. 14. Starting from this instant the change of state of the delay circuit 205 puts the flip-flop 195 into the work state through the gates 232 and 233. The switch 173 is then in the "search" position and according to the process previously indicated is locked on the new channel or the new path assigned by the availability frequency, that is 1,500 cycles per second.

The transmission of the guard frequency of 2,150 cycles per second, carried out by the mobile equipment which has recognized its indication, has been detected by one of the receivers 32*a*, 32*b* etc...32*n* of the radio channel circuit considered (FIG. 1). This signal has been sent to the input D (FIG. 8) of the electronic part of the radio channel circuit and is detected by the circuit 152 which delivers a continuous voltage controlling the relay *fg* of the circuit 121 (FIG. 7*b*). The energization of this relay constitutes in some way the "acknowledgement of reception" of the mobile station which has recognized its indication. The relay *mpx* of 109 is energized by battery, its winding, contact *df*5, wire Mp, contact *tn*3, *fg*4 and earth. This relay is locked by its second winding and its contact *mpx*7.

By *mpx*5 and *mk*2, both in the work state, the relay *mc* is energized. There is thus a new seizure of the connector bundle by *mc*3 of the circuit 100, which allows the sending of the category to the register. The register thus receives the order of the connection that it is going to give by connecting the wire *b* of the incoming junction 22 to earth. The relay V*a* operates. By *va*1, it prevents the locking of V*b*, by V*a*2, it closes the chain of energization of the chosen electromagnet *cv*. The closure of the contacts *cv*2, *cv*3, *cv*4, *cv*5 extends the metallic connection between the exchange and the chosen radio channel of the other hand.

By *cv*5, earth on the wire *t* is extended towards the terminal section and the chosen connection electromagnet 1 to 6TV or 7 to 12TV operates and in known manner extends the wires *c* and *d* towards the imaginary subscriber's line, the wires *a* and *b* stopping at the normal multiplying.

The change of position of the changeover *cv*4 entails the cutting off earth from the terminal MFC and in consequence from the terminal IF of the connector bundle. This change is sent to the register which puts the feeder into service. The latter sends ringing current in the direction of the radio channel by feeding at the same time the conductors *a* and *b*. This current is detected by the bridge of cells 124 and allows the energization of the relay *ac*. The relay *ac* is energized in the rhythm of the ringing trains. At the first train, the relay *ad* is energized by closure of *ac*2 and holds during all the duration of ringing by closure of *ad*22. Previously from the energization of the relay *tt*, the relay *ar* of the circuit 122 has been energized by closure of *tt*5. By closure of *ar*22 of the circuit 120, earth is applied to terminal AR. This earth is applied to the switching circuit 162, FIG. 8*b*, which starts off the oscillator 163 through the gate 166. This is the instant 324 of FIG. 14.

Contact *ar*23 of the circuit 120 being closed, earth is applied to the terminal CS at the rhythm of the ringing trains by the closure in tune of *ac*3. This rhythmic earth is applied to the control circuit 157, FIG. 8, and starts the oscillator 146 which controls the switching circuit 162. This is the instant 325 of FIG. 14. Starting from this instant, the oscillators 163 and 164 are going to be placed alternately in service at the rhythm of 20 cycles per second delivered by the oscillator 146 as the line 326, FIG. 14, shows. This alternate setting into service is going to be effective during all the duration of the train of impulses, that is, in the example considered, about 1 second and 7 tenths. The transmission of the frequencies of signalling 600 cycles per second and of availability 1,500 cycles per second is going to be sent to the mobile equipment by the transmitter 30, FIG. 1*a*, through the amplifier 167 which feeds the inputs M1 and M2 of the modulator of the said transmitter 30.

Between the instant 320 and the instant 324, there elapses about 200 to 600 milliseconds, this being necessary in order that all the switching operations indicated previously can be carried out. During all this time, the transmitter of the mobile equipment delivers the guard frequency 2,150 cycles per second, line 321. This sending out is regulated by the timing of the oscillator 206, which is of 750 milliseconds. At the end of this timing, that is at the instant 327, the return to the state of rest of this delay circuit places the flip-flop 196 in the work state through the gates 235 and 239. Starting from this instant, three inputs of the gate 224 controlling the call oscillator 181 are energized. From receipt of the ringing signal coming from the fixed part, the fourth input of the gate 224 which is connected to the detector 180, is going to be energized at the rhythm of 20 cycles per second. The call oscillator 181 is then going to deliver a ringing signal indicating to the mobile subscriber that he is called.

At the end of the first ringing train, that is at the instant 328, there is produced a delay of about 3.3 seconds before the second ringing train which starts at the instant 329. This second train is identical with the first and sets in motion the same operations during the 1.7 seconds of its duration.

When the mobile subscriber takes up his telephone handset, the gate 280 is energized and places in service the delay circuit 204 of 350 milliseconds through the gate 278. The signal delivered by the delay circuit 204 puts into service the oscillator 213 the frequency of which is 1,633 cycles per second, connection frequency, through gates 303 and 302. This connection frequency is sent by the amplifier 194 and the relay 183 to the transmitter of the mobile equipment. This frequency is then transmitted to one of the receivers 32*a*, 32*b*, etc. 32*n* of the fixed part and is detected by the circuit 153 which delivers a continuous voltage feeding the relay *fc* of the radio channel circuit, FIG. 7*b*. This is the instant 330 of FIG. 14.

The energization of the relay *fc* entails the falling back of the relay *ar*, circuit 122, by closure of *fc*2 which short-circuits it. The contacts *ar*22 and *ar*23 of the circuit 120 open and cut the earths applied to the control circuit 157 and the switching circuit 162, FIG. 8. The oscillator 163 is then put out of service and the transmission of the signalling frequency 600 cycles per second ceases. This is the instant 331 of FIG. 14.

The energization of the relay *fc*, FIG. 7*b*, entails the energization of the relay *mg* circuit 122 by closure of *fc*3. The relay *mg* holds by closure of *mg*22. The contacts *mg*2 and *mg*3 close and extend the metallic connection of the wires *a* and *b* towards the termination 26. The closure of *mg*4 of the circuit 122 has entailed the energization of the relay *ttx*. The contact *ttx*3 of circuit 120 closes and allows the application of earth to the terminal TT. This earth is applied to the input 158*a* of the delay circuit 155, FIG. 8*b*, and blocks it. This allows any seeking which can come from another eventual call to be avoided.

Figure 11A:
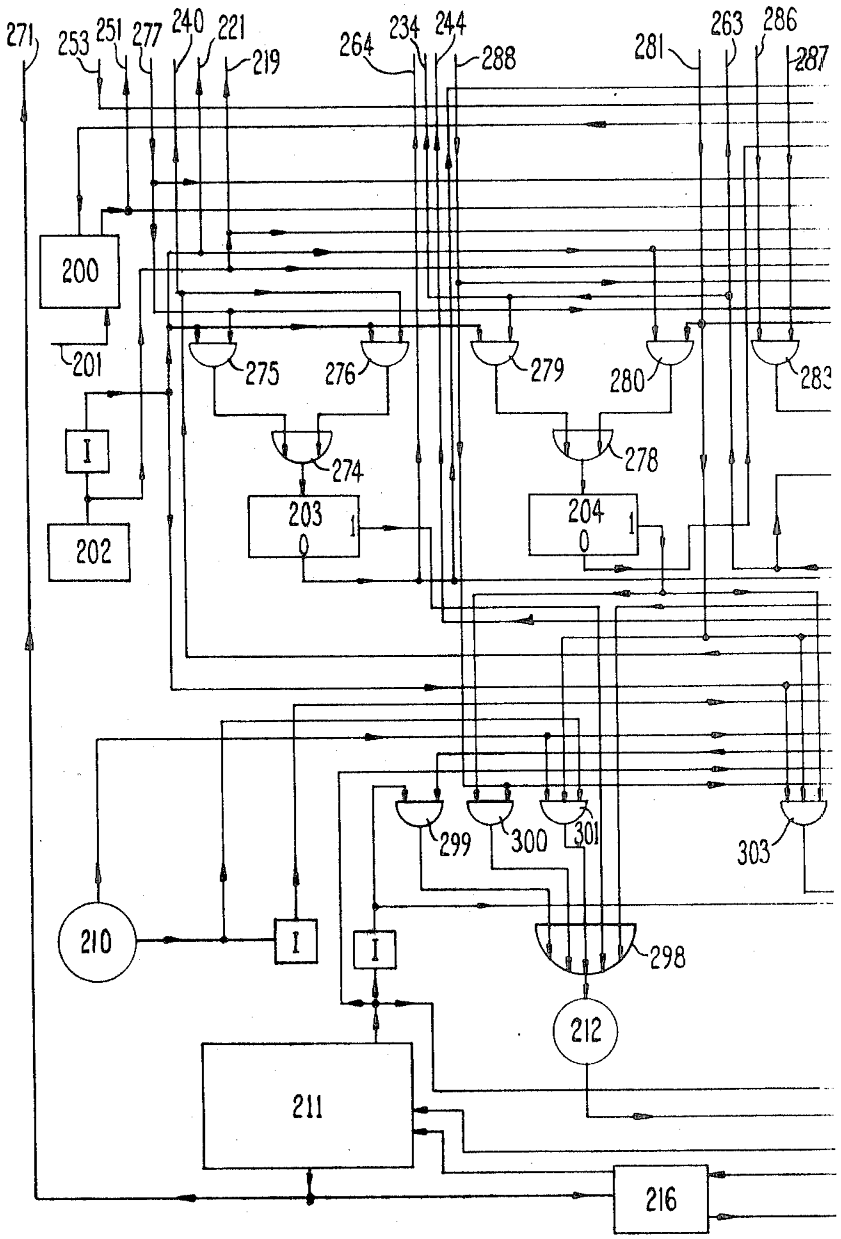
Figure 11B:
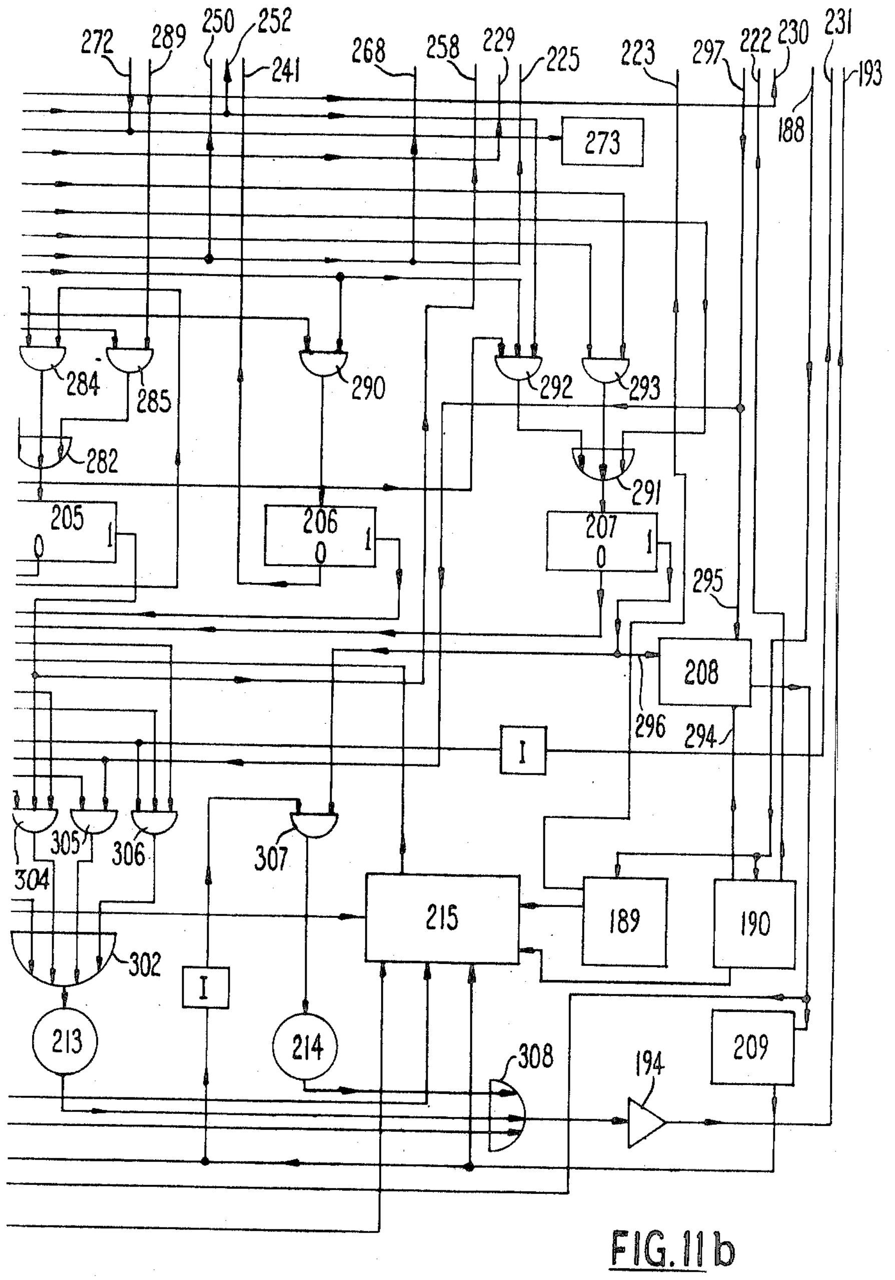

At the end of the delay of the circuit 204, FIG. 11*a*, the gate 303 is no longer energized and the transmission of the connection frequency by the oscillator 213 ceases. This is the instant 332 of FIG. 14. The falling back of relay *fc*, circuit 121, entails the energization of relay *mf*, circuit 123 by closure *fc*1. The wires *a* and *b* are in fact connected through a winding of the relay *mf*, a cell R*da*, the winding of S*x*, resistance 129 and contact *fc*l. This loop towards the feeder of the exchange entails the suppression of the ringing signal. The relay *mfx* energized by closure of *mf*l and by closure of contacts *mfx*1 and *mfx*2, finally establishes the metallic connection between the group selection stage corresponding to the fixed subscriber and the termination 26 of the service radio channel circuit. This the instant 333.

The different relays of the marker are returned to their initial state as soon as the electromagnet *cv* has operated (in well-known manner); *cv*4 open, the relays of the primary section are also in rest position, except the electromagnet *cv*.

On the other hand, the return to initial state of the delay circuit 204 has entailed the changing of position of the relay 183 through the gate 128.

The transmitter-receiver of the mobile equipment is then in service, its microphone is fed and conversation can take place. Starting from this instant only the conversation signals 334 and 335 are exchanged between the mobile equipment concerned in the call and the network properly so-called.

The relay *sx* has operated at the same time as *mf*. By *sx*l, it makes the relay *sr* operate which registers the replay of the mobile and holds it by its contact *sr*3. The contact *sr*4 closed short-circuits *sx* which falls back. By *sr*6 in the wire *sr*, earth is extended towards a relay *srx*, FIG. 8*a*. This relay operates and opens its contacts *srx*1 and *srx*2 thus isolating the detection circuit of the frequencies 312, 313 and 314 (FIG. 14). Thus the circuits of the radio channel are no longer sensitive except to the disconnection frequency.

On the other hand, on the guard wire *d* a battery is applied through the rest contact 212, the work contact *vax*5 towards the subscriber circuit 363, by the primary section and the terminal section and mainly, the relay *c*0 to earth. In 363 a derivation is formed by *c*02 towards the meter SMR.

By contacts *sr*5 and *ra*1, there are applied to the wire *d* overvoltage impulses issued from a generator 127. The meter SMR only operates at instants of application of these impulses; it has for its function to give special taxation to conversation with called or calling mobile subscribers.

At the end of conversation, the release of the line can be produced in two different ways, according as the called or calling subscriber who first hangs up.

In the case of a release started by the called subscriber, that is the mobile subscriber, the replacement of the handset is detected by the circuit 202 and the latter puts into service the delay circuit 207 the delay of which is 750 milliseconds. This is the instant 336 of the timing diagram of FIG. 14. The relay 183 returns to its initial position, that is that shown in FIG. 10. The setting into operation of the delay circuit 207 puts into service the generator 208 of 20 cycles per second, and also entails the putting into service of the oscillator 214 which delivers the disconnection frequency of 1,336 cycles per second. This disconnection frequency interrupted at the frequency of 20 cycles per second is transmitted by the relay 183 to the transmitter of the mobile equipment. This signal is detected by one of the receivers 32*a*, 32*b*...32*n* and is sent by the input D to the detection circuit 323, FIG. 8*a*.

This circuit 323 delivers a continuous voltage to the terminal RA, which allows the energization of the relay *ra* of the circuit 121, FIG. 7*b*. The relay *rl* is energized and is held on a group of contacts of relays charged with controlling the falling back. The relays *mg*, *ttx* fall back, which entails the cutting of the metalic connection by opening mainly of *mg*2 and *mg*3. Moreover, the contact *ra*1 opens and cuts the connection towards the generator 127, which stops the special metering. The relays *sr*, *lp*, *mf* and *mfx* fall back. The energization of the relay of the incoming junction 22 is cut by 212 on the wire *d*, the junction cuts the earth from the wire *t* and the relay *tt* falls back. On the other hand, the electromagnets connected to the wire *t* in the primary and terminal sections fall back. The connection on the side of the caller is broken as is well known in an ordinary telephone exchange.

Between the instant 336 of triggering off the delay circuit 207 and the instant 337 which corresponds to the energization of the relay *ra*, there is produced a certain interval of time shown by 338, which is due to a time constant belonging to the detector 323. At the end of the delay of the circuit 207, that is at the instant 339, the relay *ra* falls back and causes *rl* to fall back which cuts the energization of the relay *tl* by *rl*4 which restores the radio channel circuit to the unoccupied state.

In the case in which the release is set going by the calling subscriber, the hanging up of the latter is detected by the feeder which suppresses the earth on the wire *t*. The relay *tt* of circuit 115 falls back followed by the relays *vax* then *mf* of the circuit 123. By opening of *tt*24 and of *mf*1, the energizing circuit of the relay *mfx* is broken and the changeovers *mfx*1 and *mfx*2 take the position shown in FIG. 7*a*.

The opening of the contact *tt*22 of circuit 122 causes the energization of the relay *fa* in series with the relay *ttx*. Contacts *fa*1 and *fa*2 of the circuit 130 close and the generator 131 delivers a busy tone, side of the radio channel, to invite the mobile subscriber to replace his handset.

As soon as the mobile subscriber has replaced his handset, the relay *ra* of the circuit 121 is energized according to the process indicated previously. When the relay *ra* falls back, that is at the end of the delay of the circuit 207, the energization circuit of the relay *tl* is broken and release is given to the network as has been previously explained.

In the case of a called nomad mobile subscriber and having no line circuit in the exchange of the network considered, the process will be the same as previously, up to the moment at which the wanted number will have been stored in the circuits 69, 86, 87, 88 of the marker FIGS. 6*a* and 6*b*. This number is decoded in the circuit 363. Either the thousands digit is not that of the local numbering and *mvx* is operated entailing the operation of a relay *dp*, or else the hundred, the ten or the unit is not equipped and according to the category, one of the *dp* is operated to start a connection between CO*x* and REN.

By 1/5*dp*1 the seizure relay of the connector bundle is operated and by 1/5*dp*2, circuit 99, the category information is sent by the connector bundle to the register. This latter then returns the call either towards an operator or to a talking machine.

In the case of a busy mobile subscriber, the contact CO1 of the circuit 363 is in work condition, the pilot relay *ta* is not operated, battery is not applied to the wire *oc*., relay *mp* of 365 does not operate as also *mo* of 110 the short circuit of which is not removed by *mps*. In the circuit 99, the wire 40of the connector bundle, kept engaged by the rest contact *mo*5 feeding the relay *mc* (circuit 101), is connected to earth: wire 4, work contact *dk*3, rest contact *mo*1. On receiving this indication the register circuit causes the return into rest position of all the circuits engaged in the call and the busy tone is sent to the calling subscriber as for a call between two ordinary subscribers.

When the wanted mobile subscriber is found busy by a call coming from an interurban operator, the connection is not released by the interurban register. On receiving the busy tone, the operator lowers an over-riding listening key which connects a free earth to the wire *c*, side 68 of the function 22 (FIG. 4). This earth by the rest contact *cv*4, work contact *cdx*25, rest contact *ch*2, work contact *cdx*27, rest contact *ce*7 and the winding of the relays *cgx* and *cg* to battery, operates the relay *cgx*. This relay connects earth to the wire *des* by its contact *cgx*1, through its second winding and the work *cl*6.

The relay *de* of the circuit 111 (FIG. 6*b*) operates to this earth and locks itself by its second winding and its contact 3 to the general earth connection 90. The relay *de* opens the short circuit of the relay *mo* by its contact *de*1 and connects battery to the wire TZ by its contact *de*2. This battery allows the operation of a relay *tz* (relay 1*tz* for example) by earth on the wire OC, the work contact CO1 of the relay *co* of the busy wanted subscriber. The relay 1*tz* closes its contacts 1*tz*1/13 allowing the corresponding relay *ta* to operate. From the operation of the relay *ta*, the operation of the circuit for a call towards a free subscriber is restored up to the point at which the operator is found connected to the wires *a, b, c, d* of the subscriber to whom the operator offers the conversation.

The connection of the operator to the busy subscriber then proceeds in the following manner: in the marker, FIG. 6, the relay *de* has removed the short circuit from the relay MO, the relay *mm* has operated by the wire SP, work *c*19, rest *ccl* and the contact *cs*3 (circuit 80 of FIG. 4) and the necessary indications have been furnished to the radio channel (FIGS. 7*a* and 7*b* by the contacts *cs*4 (circuit 79) and *cs*1 (circuit 78). A category relay *da* has been operated by the distributor of the circuit 372 (FIG. 13*a*) and the connection order has been passed to the register by the connector bundle as for a free subscriber.

In the case in which the call towards a subscriber not attached to the exchange (operation of the relay *dp* of the marker) has been sent back towards an operator, the latter can establish through its position the call towards the wanted subscriber by renumbering the wanted subscriber and by depressing her offering key. In fact the routing of the call is carried out as previously up to the relay *dp* operating. There is recall of the connector bundle but without effect on the register from the operator's position. The relay *cgx*, circuit 76, is operated by the offering key and as previously *de* is operated. On the other hand, the contact 1/5*dp*5 extends the earth from the wire RO towards the relay *cs*, circuit 76. By *cs*3, earth is extended on the one hand towards the relay *ce* and on the other hand towards *mm* by the wire SP. Thus the contact *cs*3 has replaced the contacts 1B/*n*H3 since there is no terminal section connected. On the other hand the contact *csl* extends battery towards the relay *vb* of 22 and *vbx* of the radio channel. Lastly the contact *cs*4 extends battery towards the wire V towards the radio channel. There is then a return to the operation described. As usual the operator supervises the conversation and establishes a metering ticket.

The absent subscriber service is also assured to the mobile subscribers in the following manner: when a mobile subscriber wishes to be connected to the absent service, he calls the information operator and signals his wishes to her. Manually or automatically, according to the equipment of the exchange considered, a relay such as *ab* shown in 372, FIG. 13*a*, particular to the calling subscriber, is operated and it connects the terminal side 373 of the distributor representing the number of the calling subscriber asking for his connection to the absent service to a particular relay *da* (circuit 365, FIG. 6*b*). From this moment, every call for this number will be directed towards an operator of the absent subscriber service who will inform the caller. To return to the automatic service, it will be sufficient for the subscriber in question to lift up his handset to be connected to a service operator without operating his dial. In touch with the operator, he will be able to ask for his return to the automatic service, which will take place by the manual or automatic release of the relay *ab* previously operated.

If the register of the connection exchange has not foreseen this automatic operation, it would then be able to treat the absent calling subscriber as an ordinary subscriber, who, receiving the dial tone, will be able to set up on the dial the number of the wanted operator.

Another example of use of the automatic radiotelephone network, object of the invention, concerns the case of a call of a fixed subscriber by a mobile subscriber (outgoing call). The process of operation of the network during this example of use is illustrated by the timing diagram shown in FIG. 15.

The triggering off of this process is started by the lifting of the handset of the calling mobile subscriber. This is the instant 340 of the timing diagram of FIG. 15. This lifting entails the setting into operation of the flip-flop 197, FIG. 10*a*, and in consequence the setting into service of the transmitter of the mobile equipment. However the setting into operation of the flip-flop 197 can only be produced if the gate 254 is at rest, which expresses on the one hand that the mobile equipment is not in course of receiving a coded indication and on the other hand that the channel switch 173 is not in search position.

In this double condition, the transmitter of the mobile equipment can be in service. At the increase in voltage of the transmitter, the transmitter detector 175 triggers off the time delay circuit 203 of 350 milliseconds. The latter puts into service the oscillator 212 and delivers during all this delay the guard frequency 2,150 cycles per second, as the line 341 of FIG. 15 shows. During all the time of transmission of this frequency, the detector 152 delivers a polarity on the terminal FG, FIG. 8*a*, which entails the energization of the relay *fg* of circuit 121, FIG. 7*b*.

The changeover *fg*4 of the circuit 119 changes position and breaks the energization circuit of the relay *tm* in the case in which the network is not already sought by an incoming call. In fact, if the change of position of the changeover *fg*4 takes place after the energization of the relay *tm*, due to an incoming call, this relay holds by *tm*5 and cannot fall back. In this case, the energization of the relay *tm* entails that of the relay *tn* then that of the relay *tf. The changeover tf*1 of the circuit 120 changes position and, as explained previously, suppresses the permanent transmission of the frequency of 1,500 cycles per second delivered by the oscillator 164 and triggers off the sending of the coded indication, by the alternation of the frequencies of 600 cycles per second and 1,500 cycles per second delivered respectively by the oscillator 163 and 164. At the end of the delay of the circuit 203, that is at the instant 342 of the timing diagram of FIG. 15, the flip-flop 197 returns to rest condition and controls the busy indicator 178 which lights. The mobile subscriber is then warned that he cannot obtain his correspondent and is invited to replace his handset. In the case in which the current call is intended for him, the connection is established following the process indicated previously.

TIn the normal case, that is when the network is not simultaneously sought by an incoming call, the relay *tm* is not energized and the permanent transmission of the frequency of 1,500 cycles per second is not suppressed. The passage to the state of rest of the delay circuit 203 puts in service the delay circuit 205 of 100 milliseconds of delay. The latter triggers the oscillator 213 which delivers during this delay the frequency of 1,633 cycles per second. This frequency is detected by the circuit 153, FIG. 8, which delivers a polarity intended to energize the relay *fc* of circuit 121.

Prior to the instant 342, the energization of relay *fg* has entailed that of the relay *fgx*, by change of position of relay contact *fg*1. At the instant 342 the feed of the relay *fg* is broken while the relay *fc* is fed. Relay *fgx* short-circuited by contact *fg*1 falls back more slowly, in such a way that during this falling back period of the relay *fgx*, relay *lp* of circuit 122 is energized by closure of the contacts *fc*4, *fg*7, *fgx*3 and holds by *lp*3. During this short interval of time, shown by 342 in the timing diagram of FIG. 15, there is a possibility of a double seizure. In fact, *lp*1 of circuit 119 has not yet changed position in such a way that the relay *tm* can be fed following an incoming call. In this case neither the incoming call nor the outgoing call can be served and the two subscribers are invited to hang up.

In the normal case, the outgoing call is pursued, the relay *lp* is energized and, by opening of *lp*6, circuit 120 controls the suppression of the permanent transmission of the frequency of 1,500 cycles per second. This is the instant 344 of the timing diagram of FIG. 15. The changeover *lp*1 changes position and directs the energizing circuit of the relay *tm* towards the marking wire LA for an outgoing call. By closure of *lp*23, circuit 122, the relay *mg* is energized and holds by *mg*22. By closure of *lp*21, circuit 123, relay *tl* is energized and by closure of *tl*2, circuit 133, puts into operation according to the process which has been previously indicated the service channel distributor 40. The latter proceeds to break the energization of the relay *vd* and to designate, among the other unoccupied radio channels, a new service channel intended for the flow of the next call which will present itself. By closure of *lp*4, circuit 115, earth is applied to terminal P of the circuit 84. The relay *cr*, circuit 84, is energized and successively the relays *ct*, *cv* and *cy* are also. By *cv*3 the relay *cvx* operates.

The energization of the relay *ct* is due to the presence of an earth on wire *d*. The presence of this earth indicates that there exists at least one free register in the exchange, that a register junction is free and that the associated outgoing junction 23 is also free, since the contact AU6 is at rest. The energization of the relay *cy* entails, by closure of *cy*1/6, the application of earth to the wire *t* towards the marker relays of the register finder of the exchange. This causes the operation of a register finder which carries out the choice of a register and connects it to the outgoing junction 23. There is then seizure of the primary section which is effected by applying an earth to the wire *c* side of the bracket 74.

The relay *cg* is energized and the relay *mn*, circuit 103, is equally so by closure of *cg*2, circuit 85. Simultaneously, by closure of *cv*5, earth is applied to terminal PA and allows the energization of the relay *mu* of circuit 104. Contact *mu*25 closes and allows the application of earth to the terminal LA of the circuit 119, which entails the energization of the relay *tm*. The connection to the radio channel circuit is made by the relay *to*, as indicated previously. The relay *tn* is fed and connects the marker to the radio channel circuit.

All these switching operations intended to carry out the seizure of an outgoing junction 23, of the primary section, of the marker and of a radio channel circuit are carried out between the instant 344 and the instant 345 of the timing diagram of FIG. 15, i.e. during about 400 milliseconds. During this latter time, the time delay circuit 205 which has started at the instant 342, is returned to the rest condition at the instant 346 and there stops the transmission of the connection frequency 1,633 cycles per second by the oscillator 213. The passage to the rest condition of the delay circuit 205 has placed into service the delay circuit 204 of 350 milliseconds, which has itself put in service the oscillator 212 of 2,150 cycles per second. At the end of these 350 milliseconds, that is at the instant 345, the delay circuit 204 returns to the rest condition and sets to work the flip-flop 199. The latter puts into service simultaneously the oscillators 212 and 213 and the generator 209 of 20 cycles per second. The latter proceeds to put into service the translator 211 which is going to deliver the indication belonging to the calling mobile subscriber. This indication is going to be applied alternately to the gates 299 and 305, corresponding to the oscillators 212 and 213 respectively. There is thus transmission between the instant 345 and the instant 347 of the coded indication belonging to the mobile subscriber, in the form of a signal rhythmic at the frequency of the changing over of the indication, each of the states of this rhythmic signal being transmitted either at the guard frequency of 2,150 cycles per second, or at the connection frequency 1,633 cycles per second, as shows the line 348 of the timing diagram of FIG. 15.

This rhythmic signal is received by the detectors 152 and 153 which feed the register 147 through the flip-flop 151. The coded indication of the mobile subscriber is then stored in the register 147 and presents itself in the form of earths applied to the terminals LA1, LA2, LA3, etc...LA16. These earths are applied through contacts *tn*5 to 29, to the relays *za* to *zd*, *ca* to *cd*, *da* to *dd* and *ua* to *ud* of the circuit 108 of the marker. This indication in binary code is translated in the circuits 69, 86, 87 and 88 and the number is found stored in the same form as for the called mobile. The relay *df* is energized and is followed by the relay *dfx*.

The indication of the number of the mobile subscriber is retransformed into binary code by the circuit 98. This indication is then transmitted through contacts *tn* of the circuit 120, towards the register counter 140 of FIG. 8, by means of the wires LE1, LE2, etc...LE*x*.

The relay *tf* of circuit 119 is energized. The changeover *tf*l, circuit 120 changes position and applies earth to the terminal LEO of the gate 170. The latter puts into service the monostable flip-flop 155 which, through the control circuit 157 of the oscillator 146, triggers the scanning of the register-counter 140. This is the instant 349 of the timing diagram of FIG. 15. Between the instant 347 and the instant 349 there elapses a delay of 0.5 to 1 second, about, in the course of which no frequency is transmitted.

Starting from the instant 349, the coded indication of the calling mobile subscriber is sent back to him by swinging over between the availability frequency 1,500 cycles for second and signalling frequency 600 cycles per second, as the graph 350 of FIG. 9 shows.

The first impulse of the received coded indication triggers off the generator 209 of 20 cycles per second which puts into service the translator 211 which delivers for the second time the indication belonging to the mobile subscriber. This own indication is compared in the circuit 215 with the received indication. If the two indications are identical, that is if the indication of the mobile subscriber is recognized, the comparator 215 controls the setting into service of the delay circuit 203. This is the instant 351 of the timing diagram of FIG. 15. The setting into operation of the delay circuit 203 entails the transmission, during 350 milliseconds, of the frequency of 2,150 cycles per second delivered by the oscillator 212.

This transmission entails the energization of the relay *fg* of circuit 121. By closure of *fg*6 of circuit 119, earth is applied to the terminal MP and entails the energization of the relay *mpx* of circuit 109 of the marker. By closure of *mpx*5, relay *mc*. is energized and closes its contact *mc*1. Wire *c* of the outgoing junction 23 is then connected through terminal NFC to terminal IF of the connector bundle. There is seizure of one of the channels of the connector bundle to transmit an indication characterizing the chosen channel. This is the instant 352 of the timing diagram of FIG. 15. As soon as the register is connected to the connector bundle, that is at the instant 352, the register receives the indication of the category on the group of wires B, by the application of earths coming from the circuit 91.

As in the case of the called mobile subscriber, the number registered in the marker is decoded in the circuit 362. Either this is a subscriber of the exchange and the terminal section is brought into place as previously, or this is a wandering subscriber and an operated *dp* relay proceeds to cause it to be sent back towards an operator. On the other hand, the relay *dm* is operated and closes the circuit of the relays *dk* and *di*.

In the case of a subscriber of the exchange earth on the wire O of the set A disappears by *dk*l open. The availability relays *mp* and *mo* operate and the busy earth disappears from the wire 4. The category of the caller defined by the relays *da* is sent to the set B by the contacts of *di*. The selection horizontal bars of the primary section have been set into place as for the call for a mobile subscriber. A relay Ua (or Ub) and a relay *vax* (or *vbx*) have been chosen; the register which has received all the information gives the connection order by an earth on the wire *t*, entailing the operation of the chosen electromagnet AU.

The metallic connection is extended between the exchange and the radio channel. In particular, the relay *tt* of the radio channel circuit is energized. The relay *mf* is energized and entails the energization of the relay *mfx*. The changeovers *mfx*1 and *mfx*2 change position and finally establish the metallic connection between the exchange and the termination 26. Starting from this moment, the register sends the dial tone on wires *a* and *b* to the radio channel destination and that of the mobile subscriber. This is the instant 352 of the timing diagram of FIG. 15.

During this latter time, the delay circuit 203 of 350 milliseconds is returned to the rest condition and has entailed the falling back of the relay *fg* of circuit 121. This is the instant 354 of the timing diagram of FIG. 15.

The instant 354 is prior to the instant 353 and, preferably, should be prior to the instant of energization of the relay *tt* of circuit 115, in such a way that the relay *rh* of circuit 123 may not be energized by the closure of *tt*2 and does not entail the breaking of the metallic connection of the wires *a* and *b* by the opening of *rh*21 and *rh*22.

In the case in which the instant 353 should be prior to the instant 354 it would be necessary to wait for the falling back of the delay circuit 203 and that of the relay *fg* for the energization of relay *rh* to be broken in order that the relay *mfx* may be energized and, is establishing the metallic connection allow the sending of the dial tone towards the mobile subscriber.

As soon as the mobile subscriber perceives the dial tone, he can start to compose the number of the called subscriber.

From the start of the movement of the dial, that is from the instant 355, the oscillator 212 delivering the frequency of 2,150 cycles per second is put into service through the gates 298 and 301. During each of the impulses of the dial characterizing the first digit of the number of the wanted subscriber, the oscillator 213 delivering the frequency of 1,633 cycles per second is put into service through gates 302 and 306, while the transmission of the oscillator 212 ceases. This is what is shown by the line 356 of the diagram of FIG. 15. At the end of the dial impulses of the first digit, that is at the instant 357, the oscillators 212 and 213 cease to transmit.

From the instant 355, the transmission of the guard frequency entails the energization of relay *fg* which entails the energization of relay *rh* by closure of *fg*3 and the falling back of relay *mfx* by opening of *rh*24. Contacts *rh*22 and *rh*21 pass into open position, in such way that the register is "looped" on the resistance 129 the value of which is about 250 ohms. Simultaneously the changeovers *mfx*1 and *mfx*2 loop the termination 126 by the resistance of 620 ohms. The start of the first impulse, that is the instant 358, is marked by the fall of relay *fg* and the energization of relay *fc* which, by *fc*1 of circuit 123, opens the "loop" towards the register. At the end of the impulse the relay *fc* falls back while the relay *fg* is excited afresh, which has the effect of reestablishing the branching of the resistance 129 between the wires *a* and *b* towards the register. From the start of the following impulse the relay *fc* is energized while the relay *fg* falls back, which entails the opening of *fc*1. And so on for each of the impulses of the train characterizing the first digit. The pulsation of *fc*1 is thus transmitted to the register through the resistance 129 and the winding of the relay *mf*. During all the length of the train of impulses, the relay *rh* will remain energized. It only falls back at the instant 357.

The process intended to transmit to the register the indication of the second digit of the number of the called subscriber is the same as that which has just been described. It starts at the instant 359 and finishes at the instant 360. An so on for each of the digits of the number of the called subscriber.

Between the instant 354 and 355, and also between of the impulses of one digit and the start of the operation of the dial for the following digit, no frequency is delivered by the mobile equipment. However, the relay 183 is in the position inverse to that shown in FIG. **10*b***, which means that the transmitter receives of the handset of the mobile equipment is in service and that the mobile subscriber can enter into conversation with a possible speaker. The case can occur for example when the mobile subscriber wishes to correspond with another subscriber to be found in a numbering zone distinct form his own, or attached to a special service the access prefix of which comprises only two, three or four digits.

At the end of the train of impulses corresponding to the last digit of the number of the called subscriber, that is at the instant 361, the relay *rh* falls back finally, the relay *mfx* is energized and the metallic connection between the exchange and the termination 26 is finally established. A ringing signal delivered by a feeder of the exchange is sent to the station of the called subscriber and conversation will take place as soon as the called subscriber picks up his handset.

In the circuit 363, the meter SMR operates as previously as soon as the wanted subscriber has replied. It is to be noted that, up to this instant the direction of feed of the wires *a* and *b* was inverted in relation to that considered in the case of the called mobile subscriber in order to avoid the premature operation of S*x*. On the other hand the meter SM is a meter operating normally by the impulses of the wire *c*. SM only operates when the mobile calls while SMR operates in both cases.

As in the case described previously of a call of a fixed subscriber towards a mobile subscriber, the release can take place either starting from the exchange, or starting from the mobile equipment, according to the subscriber who first replaces his handset. The processes of falling off in the two cases of release are identical with those which have been previously described.

In the case in which a wandering mobile subscriber has no subscriber circuit in the exchange, the operation of the relay *dp* of the marker automatically entails its sending back towards an operator's circuit who will deal with the call.

Thus, according to the invention, all the services obtained by normal subscribers of the public network are given to mobile subscribers.

The operation of the radiotelephone network, object of the invention, is not limited to the only examples of use which have just been described, viz: case of a call of a mobile subscriber by a fixed subscriber and the case of a call of a fixed subscriber by a mobile subscriber. In fact, this network can also deal with a call of a mobile subscriber by another mobile subscriber. The process of operation of the network in this case can easily be deduced form those which have just been described, with this difference only that two radio channels are necessary.

This process of operation breaks up into two parts; a first part which is none other than the process of operation which has just been described and which corresponds to the case of a call coming from a mobile subscriber, and a second part which follows the first directly and which corresponds to the case first treated, of a call coming from a fixed subscriber. Considering the timing diagram of FIG. 15, all the switching operations are identical with those which have been described prior to the instant 355. At this instant, the marker is free and also the primary section, save the relay AU of the multiselector 21 which is energized and which keeps a vertical bar in position, and save the relays of the junction 23 which are also energized. Between the instant 355 and the instant 361 the numbering phase is carried out, in the course of which the register triggers off the start of the selection inside the exchange with a view to establishing communication with the called subscriber. If the called subscriber is a fixed subscriber, these operations finish after the instant 361 and the register connects a feeder to the wires *a* and *b* in order that conversation may be established.

If the called subscriber is a mobile subscriber, the register, after having connected a feeder between the wires *a* and *b*, applies an earth to the wire *a* of an incoming junction 22 then to wire *c* and to wire *t*. This operation entails the energization of the relay *cd* and triggers off the process of operation which has been described for the call for a mobile subscriber. There is then produced a new seizure of the primary section and of the marker, which is carried out as has been previously indicated. The other phases of operation are those illustrated in the timing diagram of FIG. 14. Starting from the instant 333 of this diagram, the two mobile subscribers can converse. In the course of these different phases there is produced, mainly, the seizure of a second radio channel circuit and the energization of another relay *cv* which has triggered off a second vertical bar in the multiselector 21.

In the same way, the process of release can be easily deduced from the two examples of operation which have been previously described.

The invention is not limited to the sole methods of realization described and shown, but it covers, on the contrary, all variants, concerning in particular the details of realizing the elements of the circuits used, the number of radio channels, the type of transmitter and receiver used, the number of incoming junctions, that of the outgoing junctions, and the type of exchange to which this network can be connected.

I claim:

1. A radiotelephone system employing multiple radio channels for establishing radiotelephone connections, comprising: means responsive to a call on a line for seizing a register at an exchange, said register including means for testing a primary section assigned to the radio channels in order to verify that the said primary section is available, a marker assigned to the radio channels, said primary section including means for testing the marker assigned to the radio channels in order to verify that it is also available, a service radio channel circuit, means connecting the marker to the service radio channel circuit, means transmitting a signal incorporating a coded indication of a mobile subscriber concerned in a call to the marker, the marker including means for verifying the code of the indication and testing for the existence of a line circuit corresponding to the mobile subscriber considered, the marker relying on the result of the test to transmit or not transmit by the service radio channel to a plurality of mobile subscriber stations, means in each of said stations to compare the received indication with the indication belonging to the corresponding mobile subscriber, means in the station which recognizes its indication for sending an "acknowledgment of receipt" signal which causes seizure of the marker to be confirmed and seizure of the service radio channel circuit to be confirmed, means transmitting this confirmation to the register and triggering off the setting into place of switching elements giving access to the said radio channel circuit and thus giving access to the line circuit of the called mobile subscriber, means in the exchange for sending a ringing signal towards the station of the called subscriber, and means for establishing a connection between the line involved in the call and the termination of the service radio channel circuit.

* * * * *